United States Patent [19]

Girouard et al.

[11] Patent Number: 4,982,346
[45] Date of Patent: Jan. 1, 1991

[54] MALL PROMOTION NETWORK APPARATUS AND METHOD

[75] Inventors: Kenneth P. Girouard, Mendota Heights; Vinton J. Lewis; Robert J. Gross, both of White Bear Lake; Phillip R. Brooks, Richfield, all of Minn.

[73] Assignee: Expertel Communications Incorporated, Fridley, Minn.

[21] Appl. No.: 286,511

[22] Filed: Dec. 16, 1988

[51] Int. Cl.[5] ........................ G06F 15/22; A63B 71/00
[52] U.S. Cl. ..................................... 364/550; 364/401; 273/138 A; 235/383
[58] Field of Search ............... 364/550, 401, 402, 405, 364/408; 235/383; 273/138 A, 139, 1 E

[56] References Cited

U.S. PATENT DOCUMENTS

| Re. 32,115 | 4/1986 | Lockwood et al. | 235/381 |
|---|---|---|---|
| 4,345,315 | 8/1982 | Cadotte et al. | 364/401 X |
| 4,569,421 | 2/1986 | Sandstedt | 364/401 |
| 4,652,998 | 3/1987 | Koza et al. | 273/138 A X |
| 4,669,730 | 6/1987 | Small | 273/138 A |
| 4,671,512 | 6/1987 | Bachman et al. | 273/139 |
| 4,674,041 | 6/1987 | Lemon et al. | 364/401 |
| 4,683,536 | 7/1987 | Yamamoto | 364/405 X |
| 4,703,423 | 10/1987 | Bado et al. | 364/401 X |
| 4,723,212 | 2/1988 | Mindrum et al. | 364/401 |
| 4,775,935 | 10/1988 | Yourick | 364/401 |
| 4,799,156 | 1/1989 | Shavit et al. | 364/408 X |
| 4,815,741 | 3/1989 | Small | 273/138 A |
| 4,817,949 | 4/1989 | Bachman et al. | 273/139 |
| 4,825,045 | 4/1989 | Humble | 235/383 |
| 4,833,308 | 5/1989 | Humble | 235/383 |
| 4,906,826 | 3/1990 | Spencer | 273/138 A X |
| 4,910,672 | 3/1990 | Off et al. | 364/405 |

FOREIGN PATENT DOCUMENTS

| 8603310 | 6/1986 | PCT Int'l Appl. | 364/401 |
|---|---|---|---|
| 2105075 | 3/1983 | United Kingdom | 364/401 |

OTHER PUBLICATIONS

Hoke et al., "Comp-u-Store System Could Change Retail Economics", Direct Marketing, p. 101-107, Jul. 1983.

Gatty, "Setting Up Shop on Computer Screens", Nation's Business, pp. 57-58, Mar. 1984.

"Touchcom Interactive Videodisc Catalog Markets Furniture at Dayton's", News and Notes—Video and Optical Disk, Oct. 1985, vol. 5, No. 5, pp. 343-345.

Crane News Service, "Retailers Beginning to Tune in Video Displays", Advertising Age, vol. 56, No. 90, Nov. 18, 1985, pp. 66-67.

Laurie Petersen, "These Instant-Win Games Talk Back", Adweek's Promote, May 1, 1989, p. 4.

Paul W. Corliss, Jr., "Cardmarketing ... Your Way to a Powerful Database", Dynamic Controls, Inc.

"Reach 18.5 Million Sports and Travel Targetet Consumers", The Sports Vacation Network.

"Your name the need, and Intermark will design and produce the High-Tech Marketing Solution to meet it", Intermark Corp.

"Vision 1000-The Total Promotion Delivery Vehicle", Advanced Promotion Technologies.

"Which Way to Go with Interactive Video?", Interact Corporation, 1987.

"Interactive Video Merchandising", ByVideo, Inc., 1988.

"The Right Medium—The Right Moment", Advanced Interactive Video, Inc.

"Exhibit Source, Inc.", Exhibit Source, Inc.

"Food Chain Employs Scanning Technology in Instant Win/Prize Drawing Promotion", Incentives in Action, Premium/Incentive Business, Apr. 1989, pp. 22-24.

Primary Examiner—Joseph L. Dixon
Attorney, Agent, or Firm—Kinney & Lange

[57] ABSTRACT

A computer system automates advertising and promotional campaigns. The computer system includes a magnetic stripe card reader, bar code reader, monitor, printer, keyboard, and touchscreen input device. Software executing on the computer manages the operations of these devices. The system displays advertisements and product or store locator maps, dispenses coupons, accepts product orders, and manages customer surveys. Customers are attracted to the system by promotional sweepstakes, thereby enhancing the effectiveness of the advertising and surveys. A frequent shopper campaign also attracts customers to the system.

9 Claims, 63 Drawing Sheets

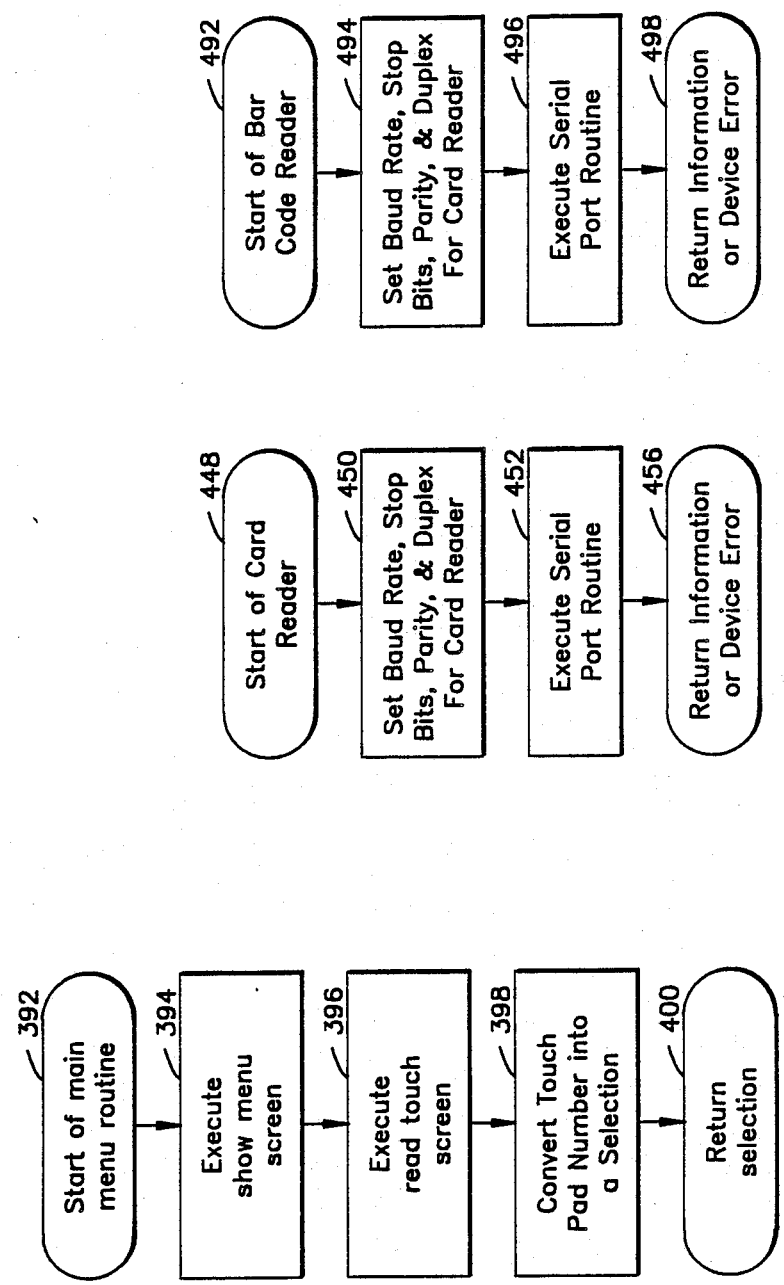

Enrollment File

Orders File

Events File

Specials File

Player Log File

Order Processing

Survey Question

Coupon File

Coupon/Text
Directory Listing

Store File

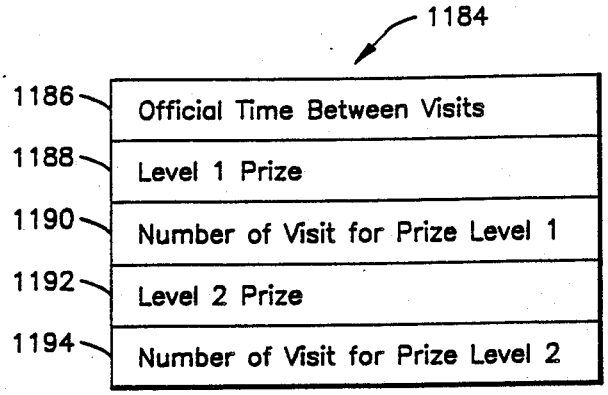
Frequent Shopper Prize File
FIG. 60
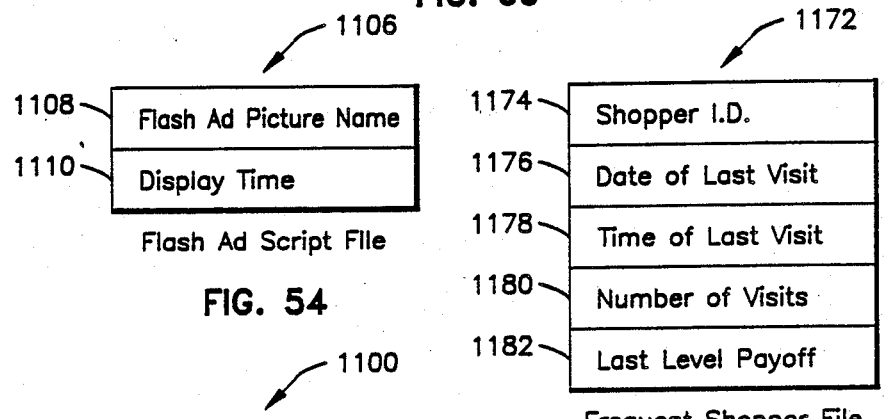
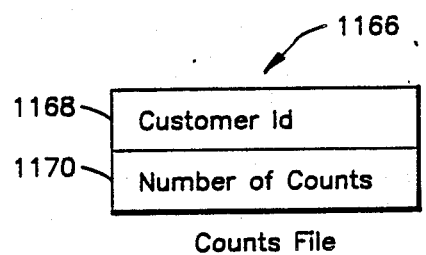
Frequent Shopper File
FIG. 59
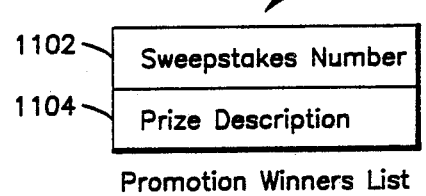
Promotion Winners List
FIG. 53
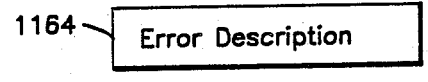
Counts File
FIG. 58
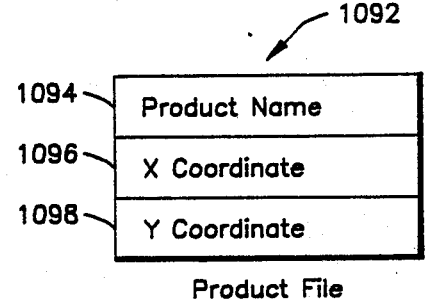
Product File
FIG. 52
1164 — Error Description
Error
FIG. 57

System Pictures

Ad Pictures 4,982,346

MALL PROMOTION NETWORK APPARATUS AND METHOD

FIELD OF THE INVENTION

The present invention pertains generally to a computer apparatus and method facilitating marketing promotions.

BACKGROUND OF THE INVENTION

Retailers, manufacturers, and others use a number of marketing methods to attract customers to their products. Typical marketing campaigns include advertising promotion, contest and prize give-aways, discount coupons, and an array of similar techniques. Managing such promotional campaigns is a costly and labor intensive undertaking.

SUMMARY OF THE INVENTION

A computer system and method are disclosed for automating advertising and promotional campaigns. The computer system of the present invention includes a magnetic stripe card reader, bar code reader, monitor, printer, keyboard, and touchscreen input device. Software executing on the computer manages the operations of these devices. The present invention provides means for displaying advertisements on the monitor. The software also comprises means for attracting customers to the computer system thus enhancing the effectiveness of the advertisements. The means for attracting customers is comprised of means for managing promotional sweepstakes, displaying product or store locator maps, dispensing coupons, accepting product orders, and managing customer surveys. The computer system of the present invention can communicate with a centralized site thereby providing centralized control of remote installations. Files, programs, and other data may be electronically transmitted from the central site to the computer system. In addition, player logs, consumer surveys, enrollment files, product ordering files, in error logs, and other data may be electronically transmitted from the computer system of the present invention to the central site.

BRIEF DESCRIPTION OF THE DRAWINGS

In the drawings, where like numerals referred to like elements throughout the several views:

FIG. 19 is a flow chart describing the main menu routine;

FIG. 21 is a flow chart describing the card reader routine;

FIG. 23 is a flow chart describing the bar code routine;

FIG. 52 is a block diagram describing the product file;

FIG. 53 is a block diagram describing the promotion winners list file;

FIG. 54 is a block diagram describing the flash ad script file;

FIG. 57 is a block diagram describing the error file;

FIG. 58 is a block diagram describing the counts file;

FIG. 59 is a block diagram describing the frequent shopper file;

FIG. 60 is a block diagram describing the frequent shopper prize file;

DETAILED DESCRIPTION OF THE PREFERRED EMBODIMENT

Figure 1:
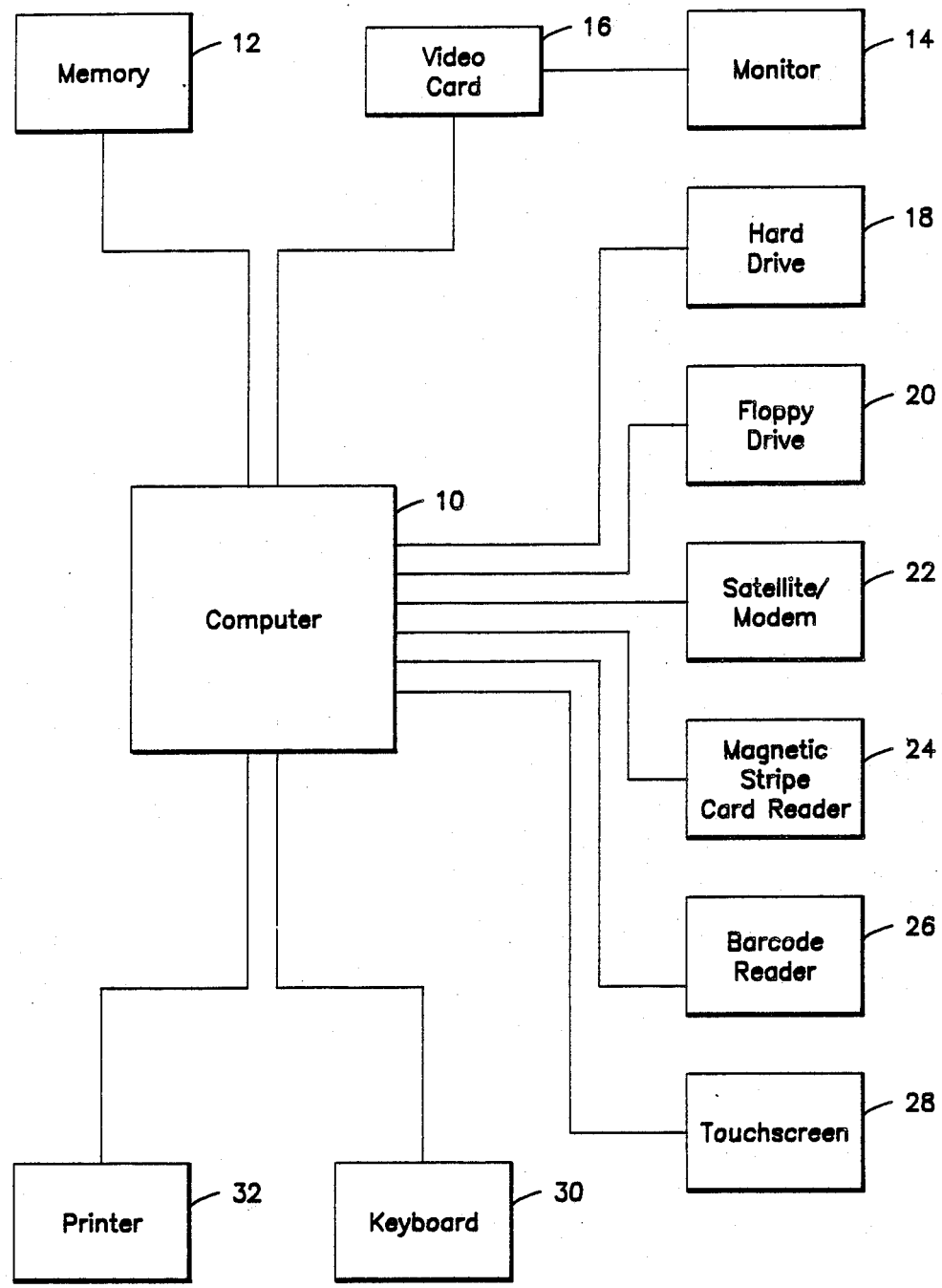
FIG. 1 is a block diagram describing a computer system and associated peripheral devices according to the present invention.

In the following detailed description of the preferred embodiment, reference is made to the accompanying drawings which form a part hereof and in which is shown by way of illustration a specific embodiment in which the invention may be practiced. It is to be understood that other embodiments may be utilized without departing from the scope of the present invention.

The present invention is a Mall Promotion Network Computer System and Method. The Mall Promotion Network automates marketing campaigns and advertising. When located in a mall, or similar retail area, the Mall Promotion Network will control sweepstakes, frequent buyer and other similar frequency programs, discount coupons, prizes, give-aways, rebates, and, of course, visual advertising.

In national sweepstakes promotions, national "Fortune 500" companies and other organizations would use the Mall Promotion Network to distribute prize notifications and advertise to attract customers to their products. A direct mail campaign distributes magnetic or bar code cards (similar to credit cards) to selected customers in the geographic vicinity of a retail mall or similar shopping area. These customers would bring the cards to the Mall Promotion Network kiosk located at a mall and scan their cards through a card reader. If the customer has a winning number, they would be awarded a prize. If the customer doesn't win a prize, they might still be awarded a coupon or discount for merchandise.

Stores or manufacturers could prepare promotions. Buyers of products would be given a "chit" (which is a receipt or "playing card") with a bar code printed thereon. This chit would be scanned by the present invention and a customer could win a prize as a result. Again, if the customer doesn't win a prize, they could still be awarded a coupon or some type of discount (although not necessarily from the store running the promotion).

It is envisioned that the Mall Promotion Network could award coupons or prizes based on the number of visits the amount of the purchases the customer makes to the mall or retail outlet where the present invention is located. The Mall Promotion Network would track the frequency of the card scans and award coupons, discounts, rebates, or prizes based on a schedule and the number of visits. If the card is scanned at the same time that a chit is scanned, the Mall Promotion Network could track the number of visits or by the customer purchases and award prizes on this basis as well.

The Mall Promotion Network can dispense discount coupons at the customer's request. Retail outlets, manufacturers, and the mall management would pay to place their coupons on the system.

The Mall Promotion Network can dispense coupons which entitle a customer to free gifts given away by manufacturers, retail outlets, or the mall itself. The number of free gifts to be dispensed can be set at a predetermined number to limit the liability of the sponsor. Access to such prizes can also be controlled through the use of the magnetic cards and chits.

The Mall Promotion Network can issue rebate tickets to customers upon request. Thus, it is possible to electronically transmit the rebate to the manufacturers thereby eliminating the need for the user to mail the rebate form.

The Mall Promotion Network can issue discount tickets at a customer's request. These discount tickets typically permit a customer to purchase any item in a particular store at a price reduced by flat percentage.

Finally, the Mall Promotion Network permits the display of electronic advertisements. Sophisticated images can be displayed on the computer system's monitor. These displays would, of course, be paid for by the manufacturer or the retail outlet featuring the product.

FIG. 1 is a block diagram describing the preferred configuration of the computer hardware components of the present invention. Shown in FIG. 1 is a computer 10 with some amount of memory 12. The computer 10 includes a monitor 14 interfaced to the computer 10 by means of a video card 16. The computer 10 has a number of associated peripheral devices, including a hard drive 18, floppy drive 20, modem or satellite interface 22, magnetic stripe reader 24, bar code reader 26, touch screen input 28, keyboard 30, and a printer 32. The modem or satellite interface 22 permits communications between the computer 10 and a centralized control site. This communications link permits centralized control of remote installations. Database files, programs, and other data may be downloaded to the computer 10. In addition, the communications link provides for centralized data gathering. Data from player logs, consumer surveys, enrollment files, product ordering, and error logs may be uploaded to the centralized control site. Although FIG. 1 describes the preferred embodiment, four alternative embodiments have also been developed.

Figure 2:
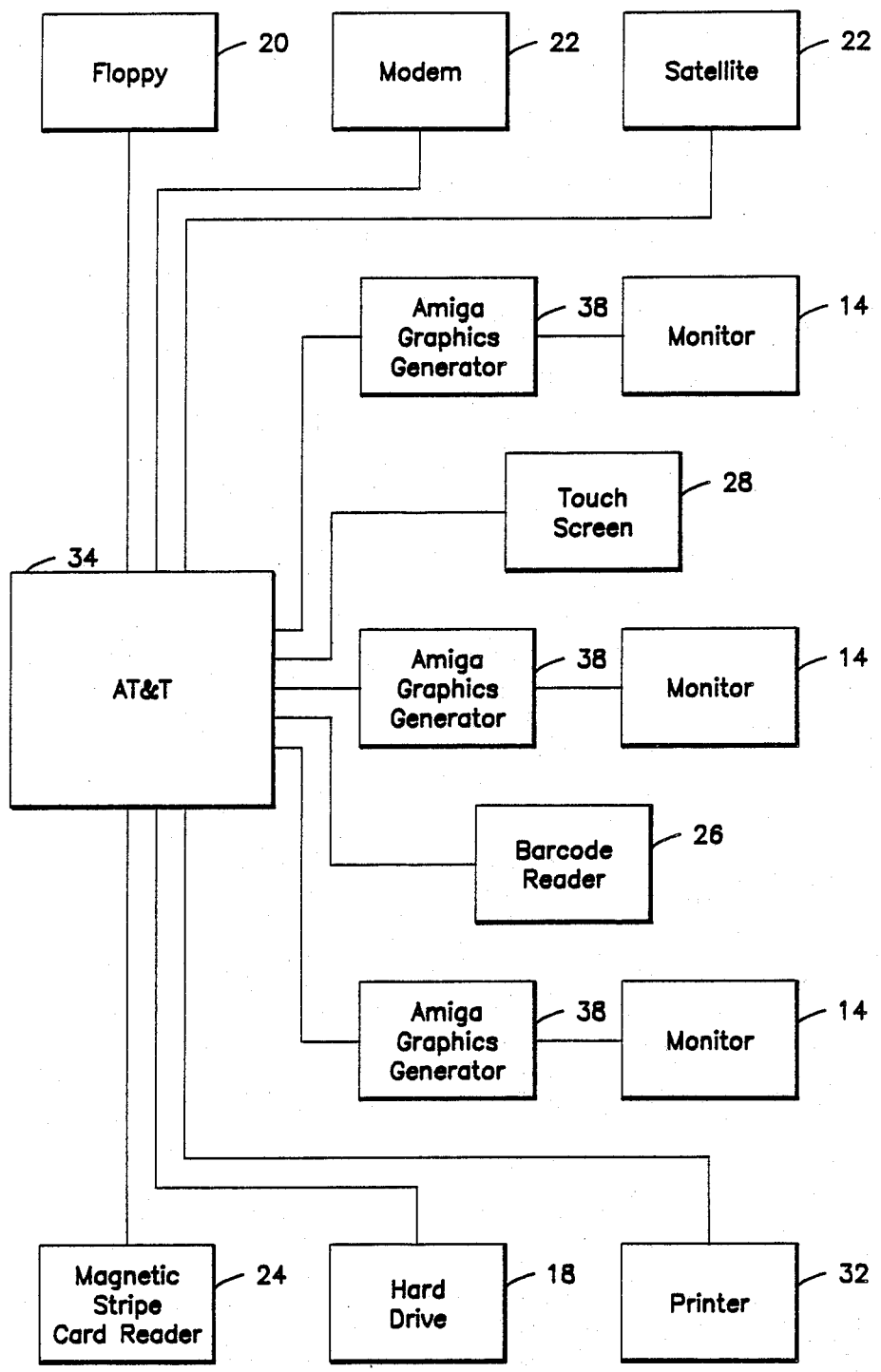
FIG. 2 is a block diagram describing a first alternative configuration for said computer system.

FIG. 2 is a block diagram describing a first alternative configuration of the computer system and associated peripherals. This first alternative is comprised of a centralized PC directly controlling the operations of a plurality of Amiga PCs 38. The Amiga PCs 38 generate the graphics for display on the monitors 14. Thus, this particular configuration permits the Mall Promotion Network software to reside on the centralized PC 34 and offload graphics generation to the Amiga PCs 38.

Figure 3:
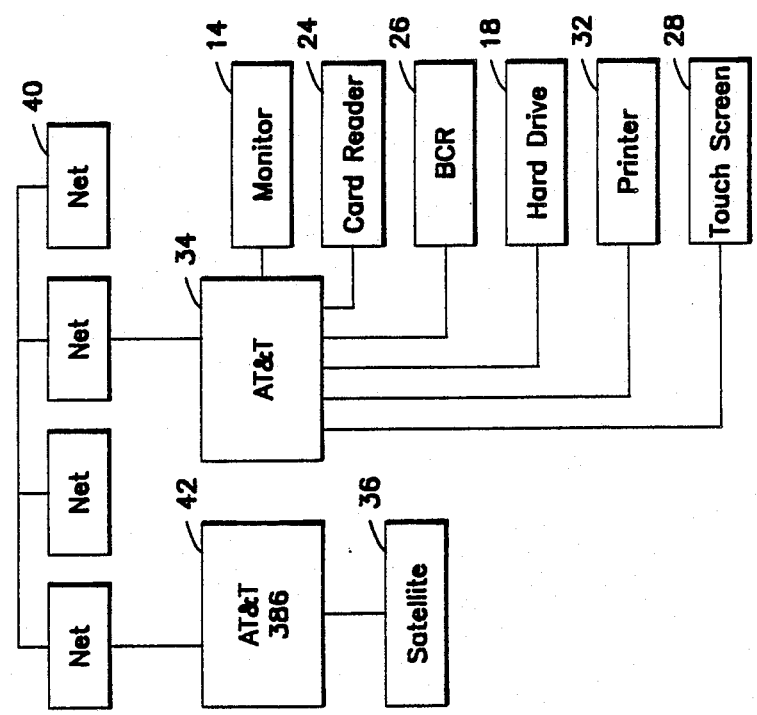
FIG. 3 is a block diagram describing a second alternative configuration for said computer system.

FIG. 3 is a block diagram of a second alternative configuration for the computer system and associated peripherals. In this configuration, computers such as those described in FIG. 2 or FIG. 1 communicate with a centralized PC 42 by means of a communications network 40.

Figure 4:
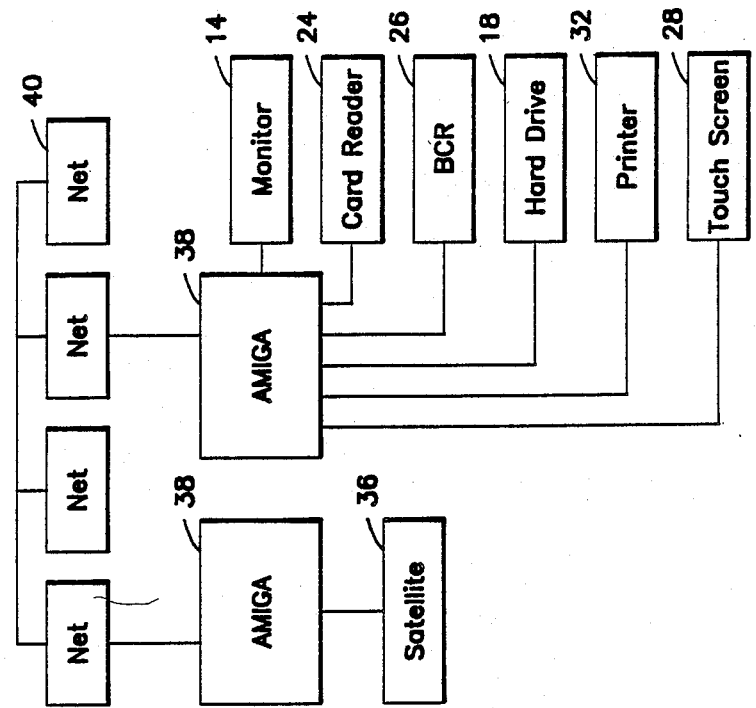
FIG. 4 is a third alternative configuration for said computer system.

FIG. 4 is a block diagram describing a third alternative configuration to the computer system and associated peripherals. In this configuration, the Amiga PCs 38 are used for both graphics generation and for executing the control program software. The Amiga PCs 38 are linked by means of a communications network 40, thus providing for the centralized control and data gathering.

Figure 5:
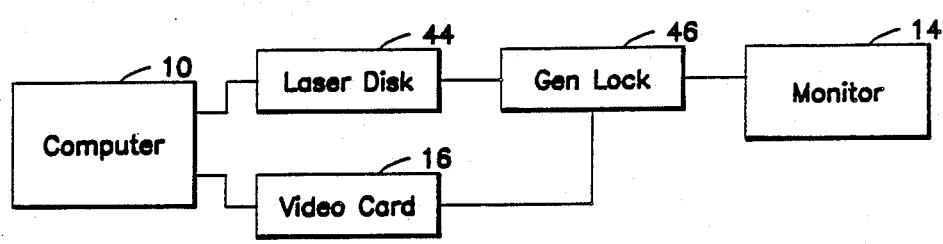
FIG. 5 is a block diagram describing a fourth alternative configuration for said computer system.

FIG. 5 is a block diagram describing a fourth alternative configuration for the computer system and associated peripherals. In this configuration, the computer 10 employs a laser disk 44 as a means of providing TV quality images. The laser disk 44 also permits the use of "rolling video", such as that seen on normal TV. The computer 10 can still generate graphics images and display them on the monitor 14 by means of the video card 16. The laser disk 44 is attached to the monitor 14 by means of a gen-lock device 46. The gen-lock device 46 accepts input from both the laser disk 44 and the computer 10 and combines the two into the appropriate image for display on the monitor 14.

Figure 6:
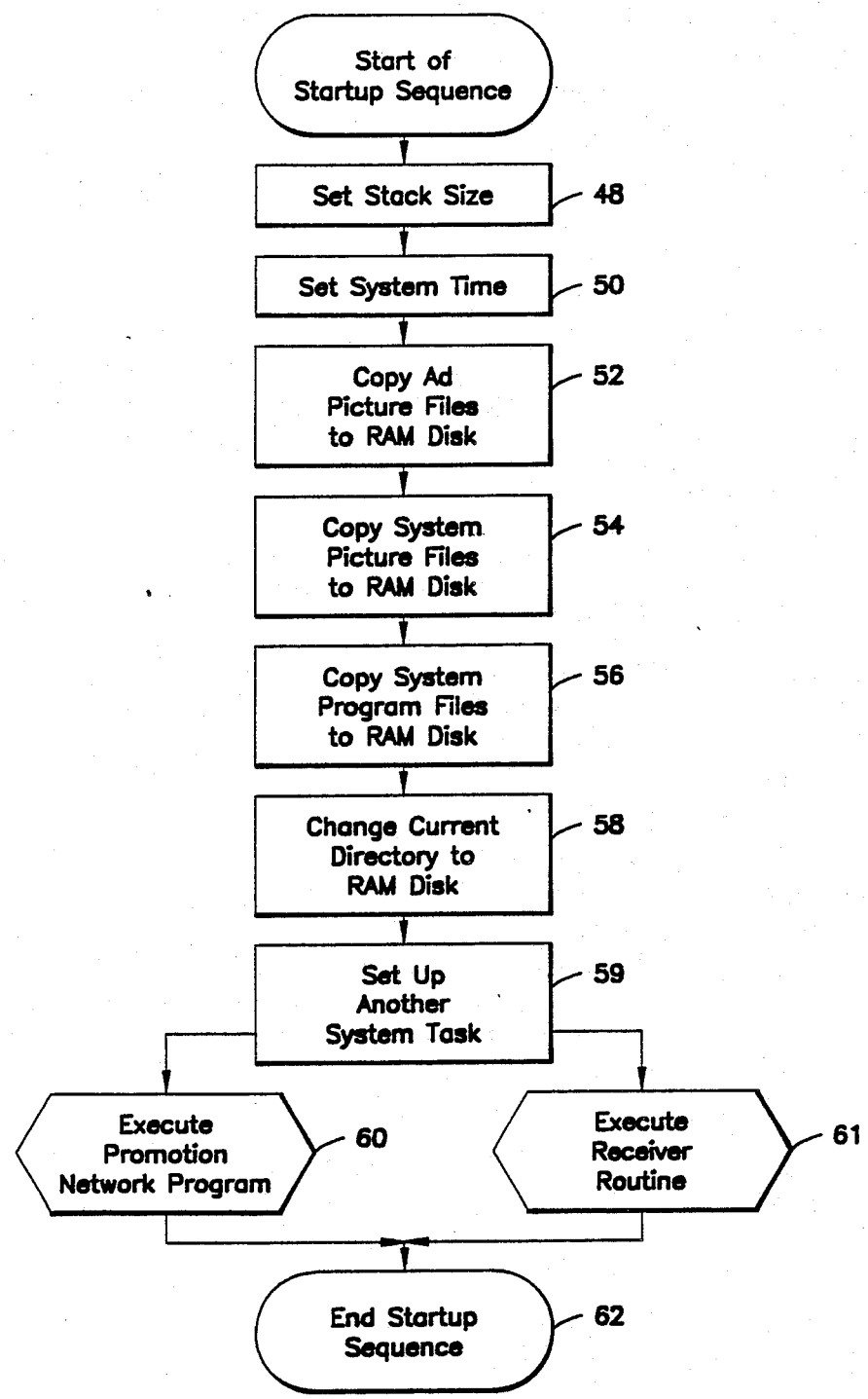
FIG. 6 is a flow chart describing the, startup sequence routine.
Figure 55:
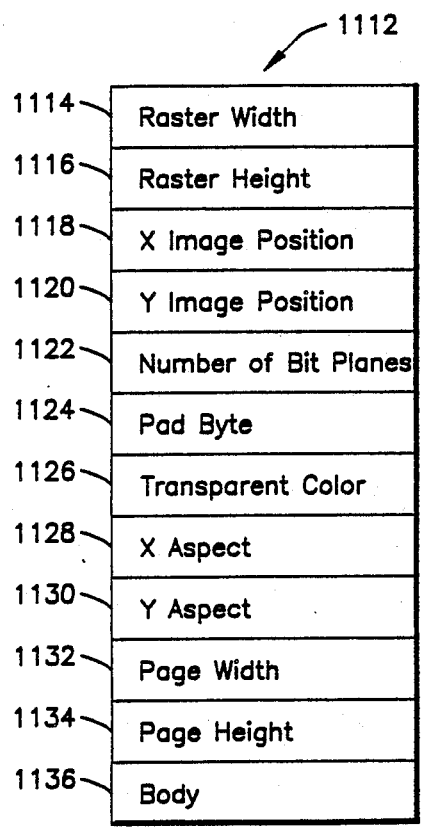
FIG. 55 is a block diagram describing the system pictures file.
Figure 56:
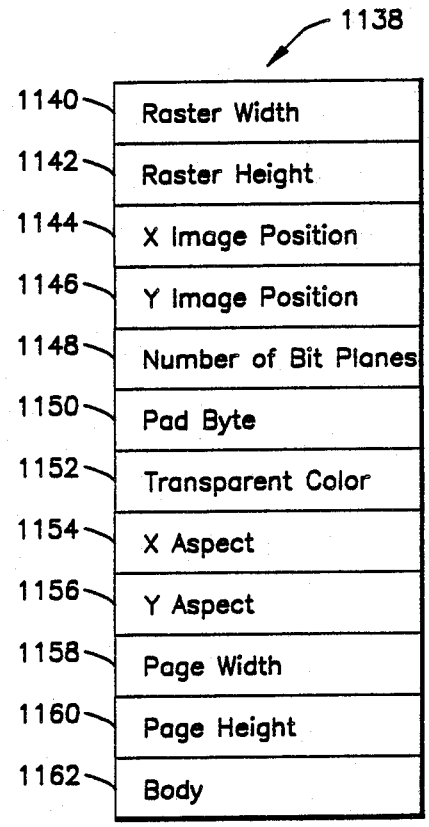
FIG. 56 is a block diagram describing the ad pictures file.

FIG. 6 is a flow chart describing the functions of the startup sequence routine. When the control program means on the computer 10 begins executing, the startup sequence routine is the first routine executed. The startup sequence sets the program stack size (48), the system time (50), and initializes the data base. The ad picture files are copied from either the floppy disk 20 or the hard disk 18 into a RAM disk within the memory 12 (52). The structure of the ad picture files is described in FIG. 56. In a similar fashion, the system picture files are copied to the RAM disk in the memory 12 (54). The structure of the system picture files is described in FIG. 55. All the necessary program files, described herein below, are also copied to the RAM disk (56). The current directory is changed to point at the RAM disk (58). The operating system is told to execute the promotion network program (60) or the receiver routine (61), and the startup sequence terminates (62).

Figure 7:
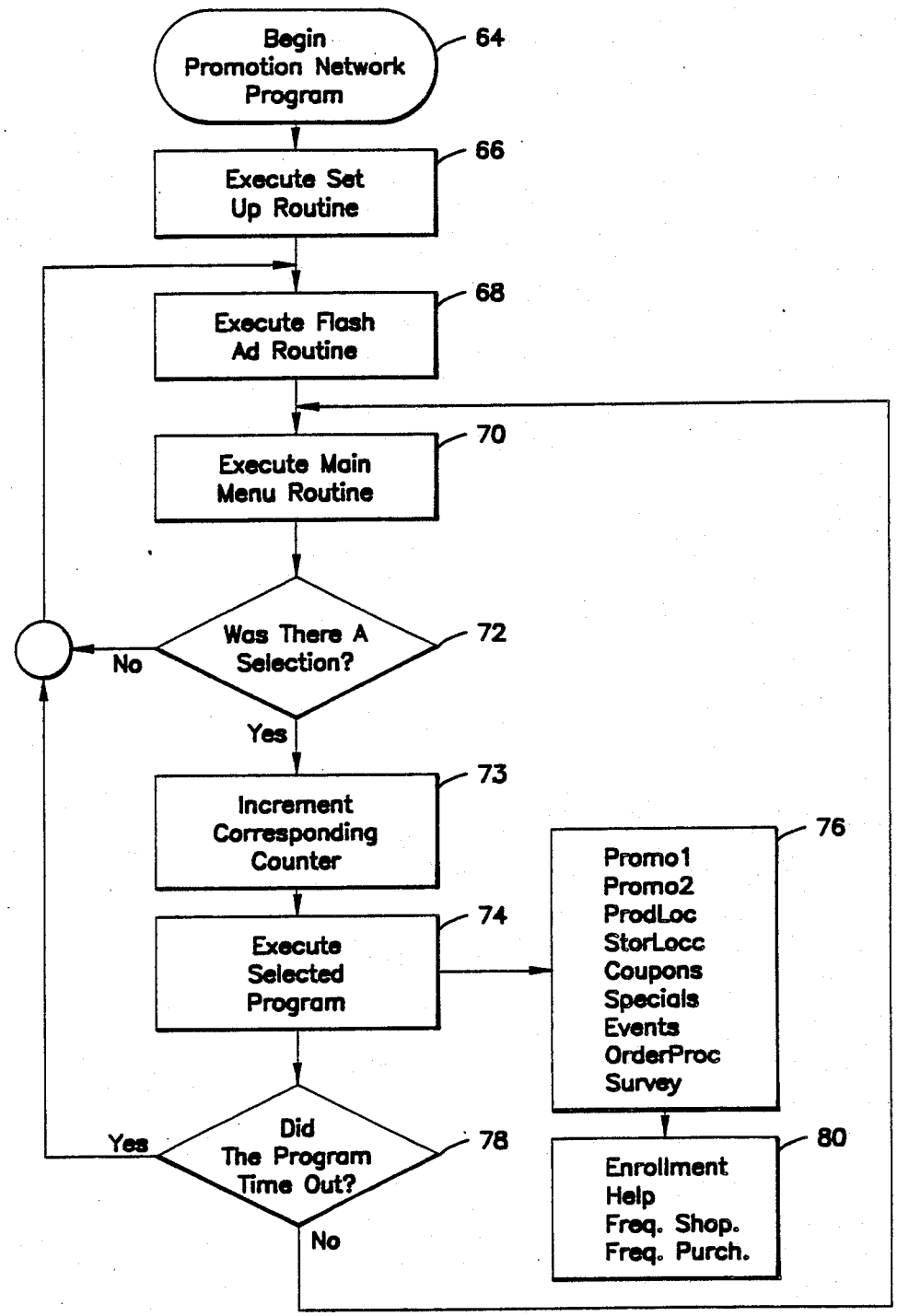
FIG. 7 is a flow chart describing the promotion network program.

FIG. 7 is a flow chart describing the functions of the promotion network program. This is the main routine in the Mall Promotion Network software. The promotion network program never terminates, it runs forever, or at least until the computer 10 is turned off. The promotion network program starts (64) when executed by the startup sequence as described in FIG. 6. First, it executes the set-up routine (66). Upon completion of the set-up routine, an "infinite" loop is entered. Within the loop, the first step is to execute the flash ad routine (68). After this routine completes, the main menu routine is executed (70). Control returns from the main menu routine when a customer enters a selection or if a timer expires (72). If a timer expires, control transfers back to the beginning of the loop to re-execute the flash ad routine (68). Statistics concerning the customer selection are gathered for later marketing or performance analysis (73). Statistics are gathered in the counts file described in FIG. 58. Each record 1166 in the counts file is comprised of a customer ID 1168 and an array of counters 1170. The frequency of customer selections is stored in the array of counters 1170. If a customer entered a selection, then the selected program is executed (74). The promotion network program determines which one of a plurality of programs has been requested (76 and 80). Upon completion, control transfers back to the main menu routine (70). If the customer does not exit from the selected program, the program will time-out (78). In the case of a time-out, control is not returned to the main menu program (70), but instead, the flash ad routine is reexecuted (68).

Figure 8:
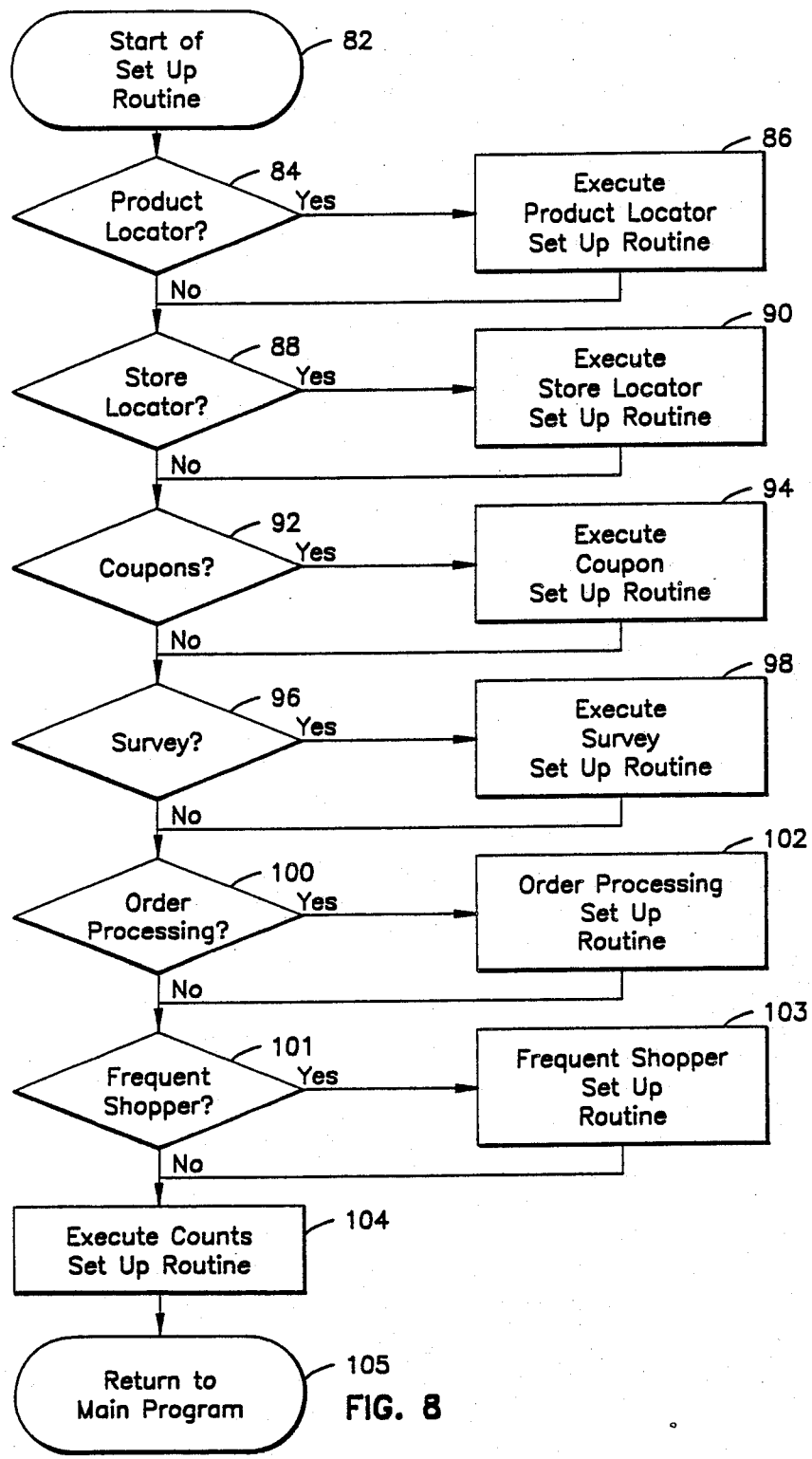
FIG. 8 is a flow chart describing the set-up routine.

FIG. 8 is a flow chart describing the functions of the set-up routine. The set-up routine starts (82) when executed by the promotion network program as described in FIG. 7 (66). If a product locator file exists (84), then the product locator set-up routine is executed (86). If a store locator file exists (88), then the store locator set-up routine is executed (90). If a coupons/text directory file exists (92), then the coupon set-up routine is executed (94). If a survey question file exists (96), then the survey set-up routine is executed (98). If an order processing file exists (100), then the order processing set-up routine is executed (102). If a frequent shopper file exists (101) then the frequent shopper set-up routine is executed (103). Finally, the counts set-up routine is executed (104). Upon completion, control is returned to the promotion network program (105).

Figure 9:
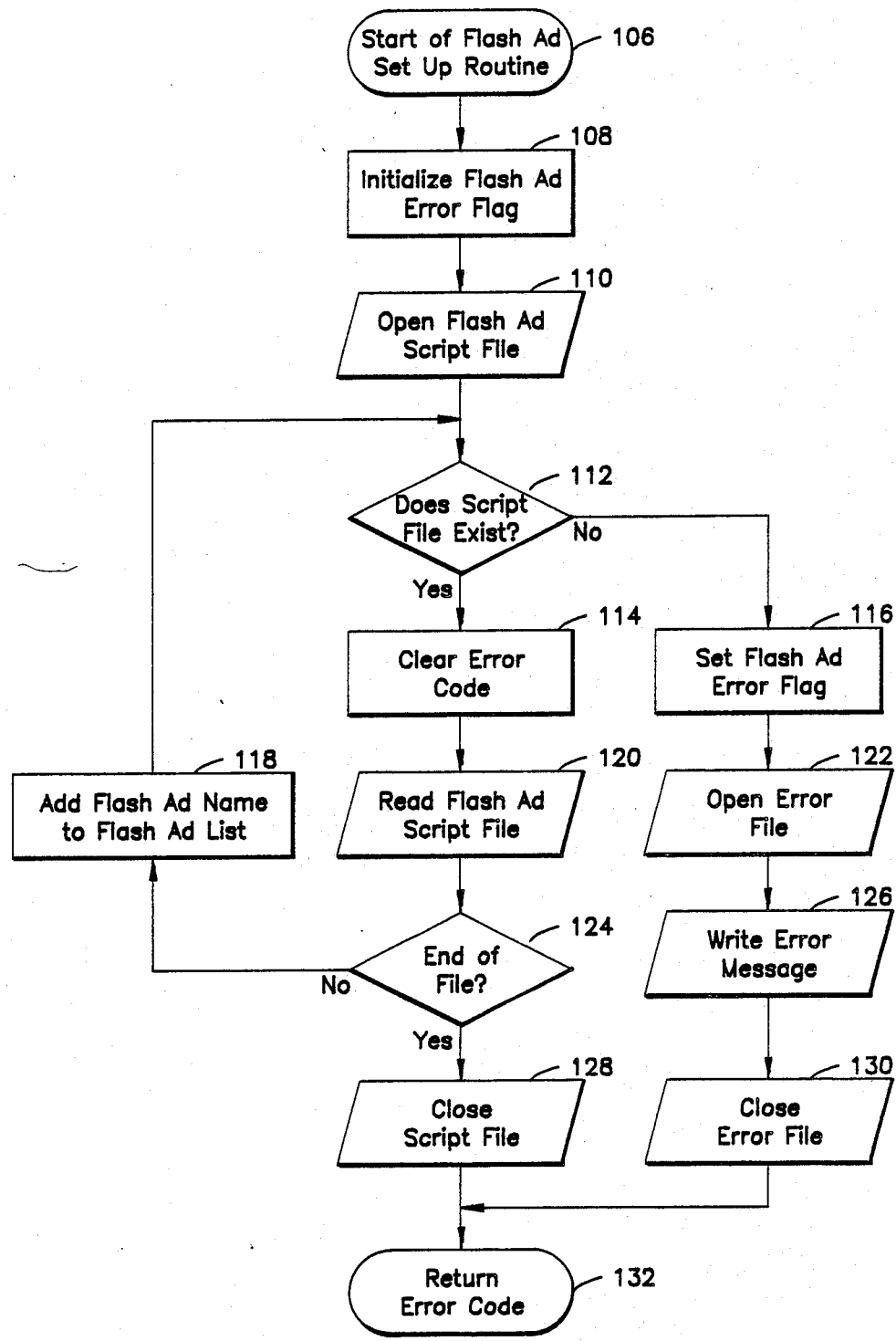
FIG. 9 is a flow chart describing the flash ad set-up routine.

FIG. 9 is a flow chart describing the functions of the flash ad set-up routine. The flash ad set-up routine starts (106) when executed by the flash ad routine as described in FIG. 16 (316). The flash ad set-up routine initializes the flash ad error flag (108) and the flash ad script file is opened (110). The structure of the flash ad script file is described in FIG. 54. If the script file does not exist (112), then the flash ad error flag is set (116), a message is written to the error file (122, 126, and 130) and the flash ad set-up routine terminates (132). If the script file does exist (112), then the error code is cleared (114), and a read is issued against the flash ad script file (120). If the read returns a record 1106, and not an end-of-file indicator (124), then the flash ad picture name 1108 and display time 1108 are added to the list in memory 12 (118), and the routine prepares to read the script file again (114). When an end-of-file indication occurs (124), the script file is closed (128), and the flash ad set-up routine (132).

Figure 10:
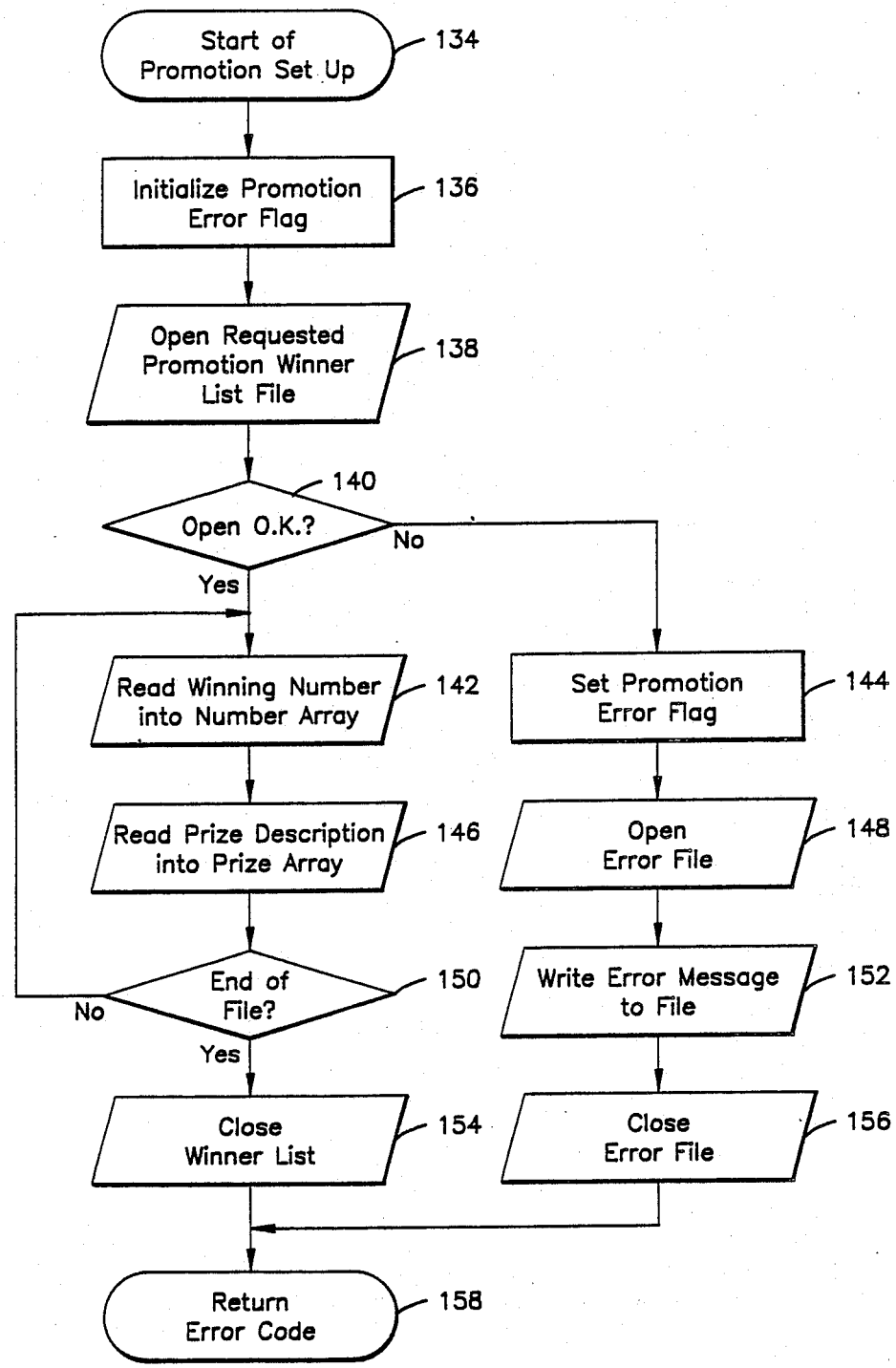
FIG. 10 is a flow chart describing the promotion set-up routine.

FIG. 10 is a flow chart describing the functions of the promotion set-up routine. The promotion set-up routine starts (134) when executed by the promotion program as described in FIG. 20 (404). The promotion error flag is initialized (136), and the requested promotion winners list file is opened (138). The structure of the promotion winners list file is described in FIG. 53. If the open operation fails (140), then a promotion error flag is set (144), a message is written to the error file (148, 152, and 156), the error file is closed and the promotion set-up routine terminates (158). If the requested promotion winners list file opened correctly (140), then a loop is entered whereby the winning numbers are read into an array in memory 12. A read is issued for each promotion winners list record 1100 (142). Each record 1100 contains a sweepstakes number 1102 and a prize description 1104 (146). All the sweepstakes numbers 1102 and prize descriptions 1104 are read until an end-of-file indication occurs (150). Upon the occurrence of this indication, the requested promotion winners list file is closed (154), and the promotion set-up routine terminates (158).

Figure 11:
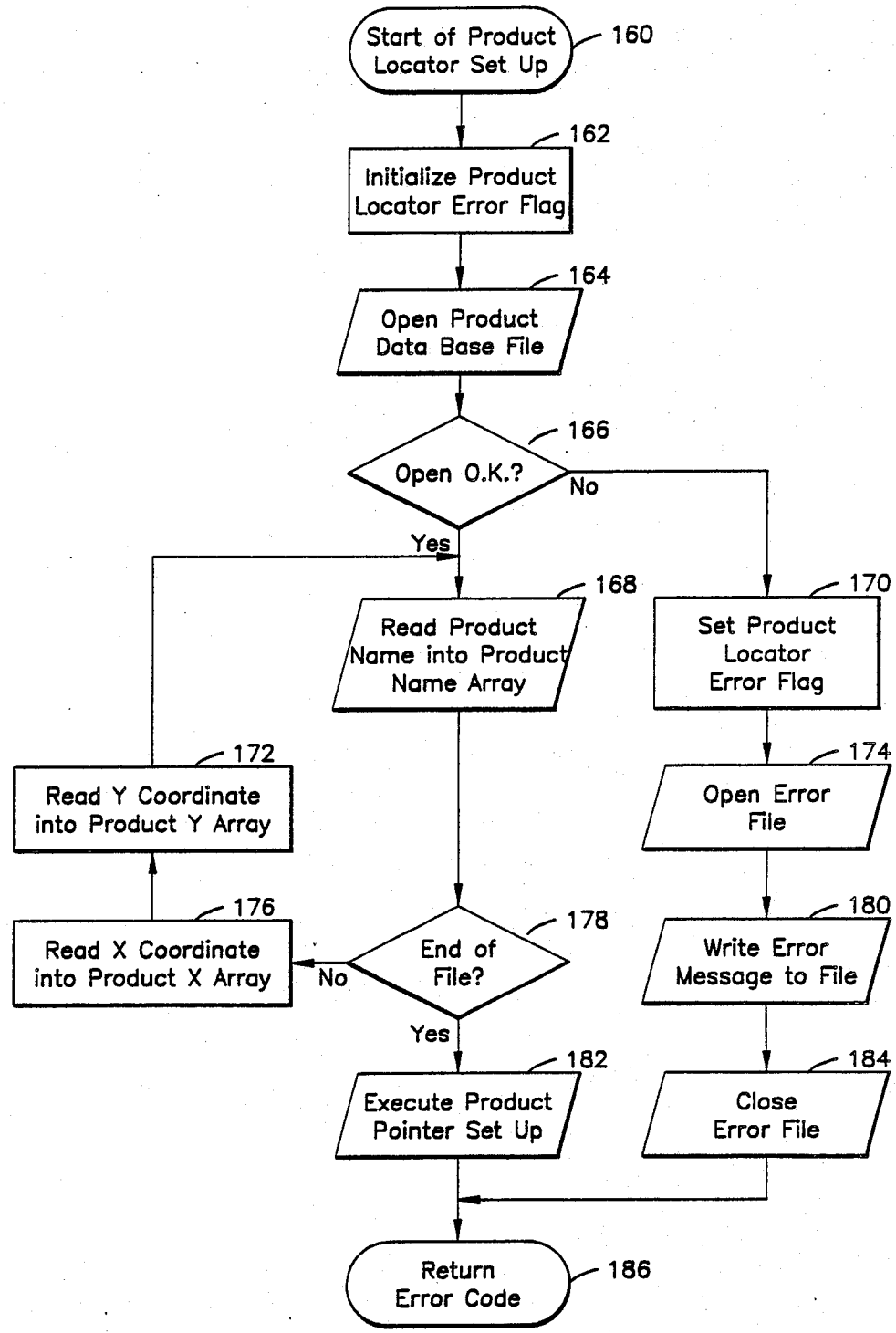
FIG. 11 is a flow chart describing the product locator set-up routine

FIG. 11 is a flow chart describing the functions of the product locator set-up routine. The product locator set-up routine starts (160) when executed by the set-up routine as described in FIG. 8 (86). The product locator error flag is initialized (162), and an open is attempted against the product file (164). The structure of the product file is described in FIG. 52. If the open operation fails (166), then the product locator error flag is set (170), a message is written to the error file (174, 180, and 184), and the product locator set-up routine terminates (186). If the open of the product file is successful (166), then a loop is entered to read records 1092 from the product file. Each record 1092 contains a product name 1094 (168) and the product image coordinates 1096 (176) and 1098 (172). The coordinates 1096 and 1098 indicate the placement of a pointer on a product locator map. All records 1092 in the product file are read until an end-of-file indication occurs (178). Upon this indication, the product pointer set-up routine is executed (182), and the product locator set-up routine terminates (186).

Figure 12:
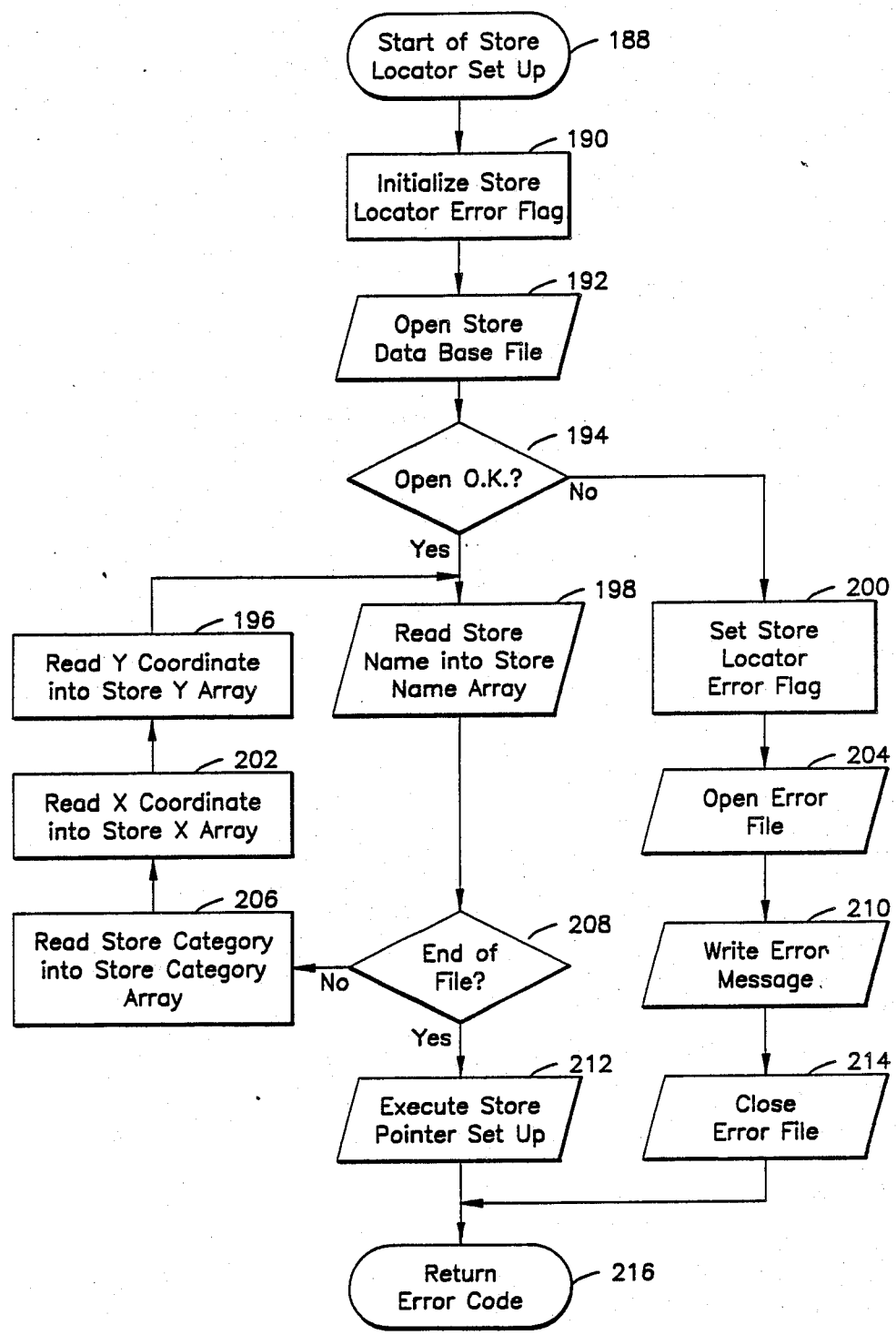
FIG. 12 is a flow chart describing the store locator set-up.
Figure 51:
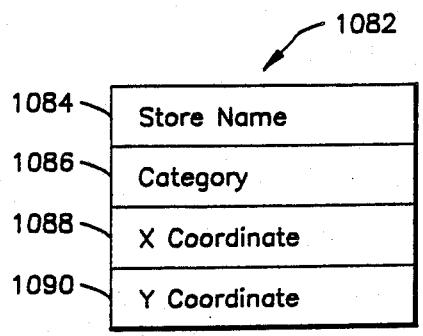
FIG. 51 is a block diagram describing the store file.

FIG. 12 is a flow chart describing the functions of the store locator set-up routine. The store locator set-up routine starts (188) when executed by the set-up routine as described in FIG. 8 (86). The store locator error flag is initialized (190), and an open is attempted against the store file (192). The structure of the store file is described in FIG. 51. If the open operation fails (194), then the store locator error flag is set (200), a message is written to the error file (204, 210, and 214), and the store locator set-up routine terminates (216). If the open of the store file is successful (194), then a loop is entered to read records 1082 from the store file. Each record 1082 contains a store name 1084 (198), store category 1086 (206), and the store image coordinates 1088 (202) and 1090 (196). The coordinates 1088 and 1090 indicate the placement of a pointer on a store locator map. All records 1082 from the store file are read until an end-of-file indication occurs (208). Upon this indication, the store pointer set-up routine is executed (212), and the store locator set-up routine terminates (216).

Figure 13A:
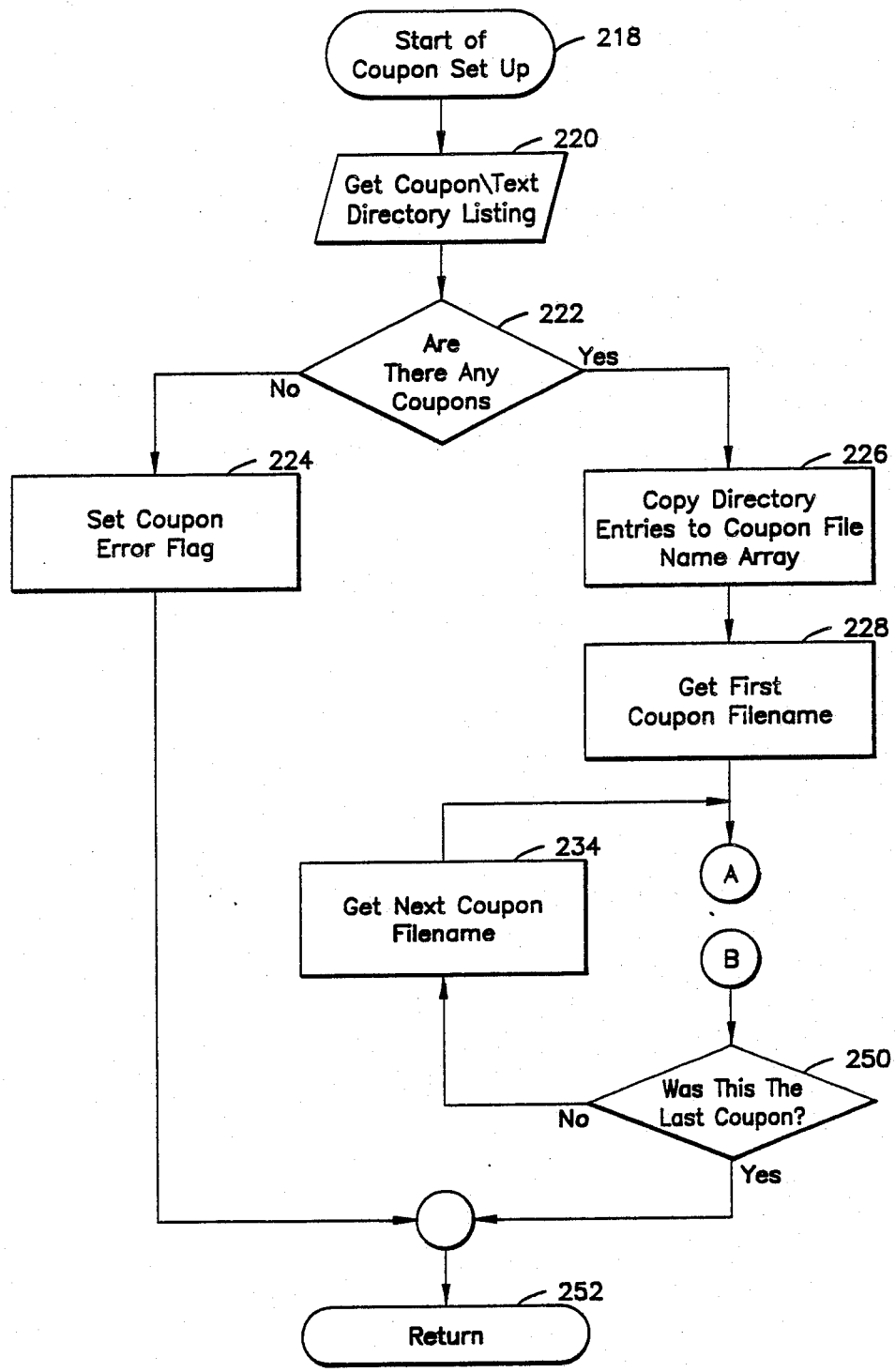
FIG. 13A and 13B combined are a flow chart describing the coupon set-up functions.
Figure 13B:
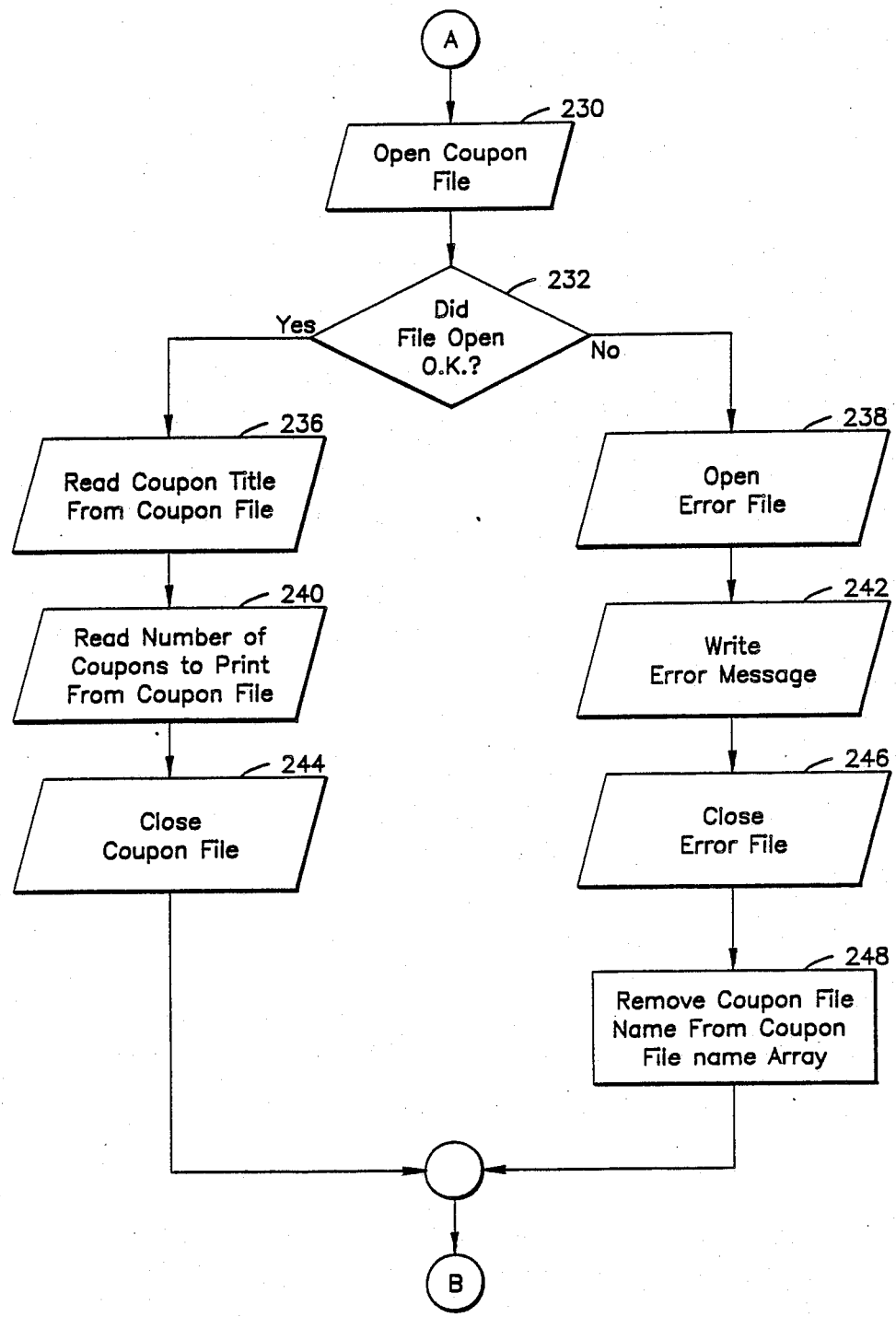
Figure 49:
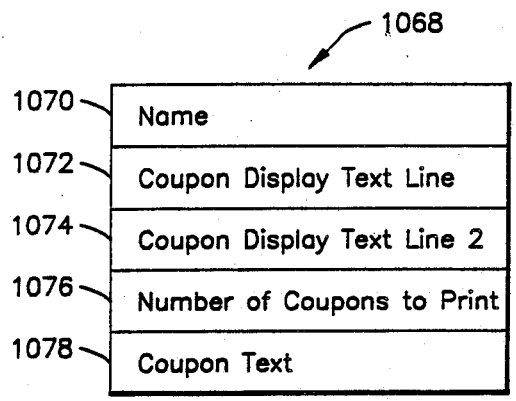
FIG. 49 is a block diagram describing the coupon file.
Figure 50:
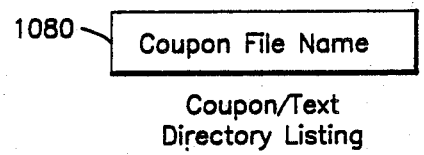
FIG. 50 is a block diagram describing the coupon/-text directory listing file.

FIGS. 13A and 13B combined are a flow chart describing the functions of the coupon set-up routine. The coupon set-up routine starts (218) when executed by the set-up routine as described in FIG. 8 (94). The coupon/text directory listing is accessed (220) and examined to determine if there are any coupons (222). The structure of the coupon/text directory file is described in FIG. 50. If there are no coupon file names 1080, a coupon error flag is set (224), and the coupon set-up routine terminates (252). If there are coupon file names 1080 (222), they are copied to memory 12 (226). The first coupon file name is accessed from the memory 12 (228), and a loop is entered to read each file in turn. As each file name is accessed from the memory 12, the corresponding coupon file is opened (230). The structure of the coupon file is described in FIG. 49. If the coupon file fails to open correctly (232), then a message is written to the error file (238, 242, and 246), and the coupon file name is removed from the memory 12 (248). If the coupon file opens correctly (232), then the coupon file is read for the coupon text 1072, 1074, and 1076 (236) and the number of coupons to print 1076 (240). After reading the coupon file record 1068, the coupon file is closed (244). This sequence is repeated for the next coupon file name in the memory 12 (234), until there are no more coupon file names to access (250). Following the last coupon file name (250), the coupon set-up routine terminates (252).

Figure 14:
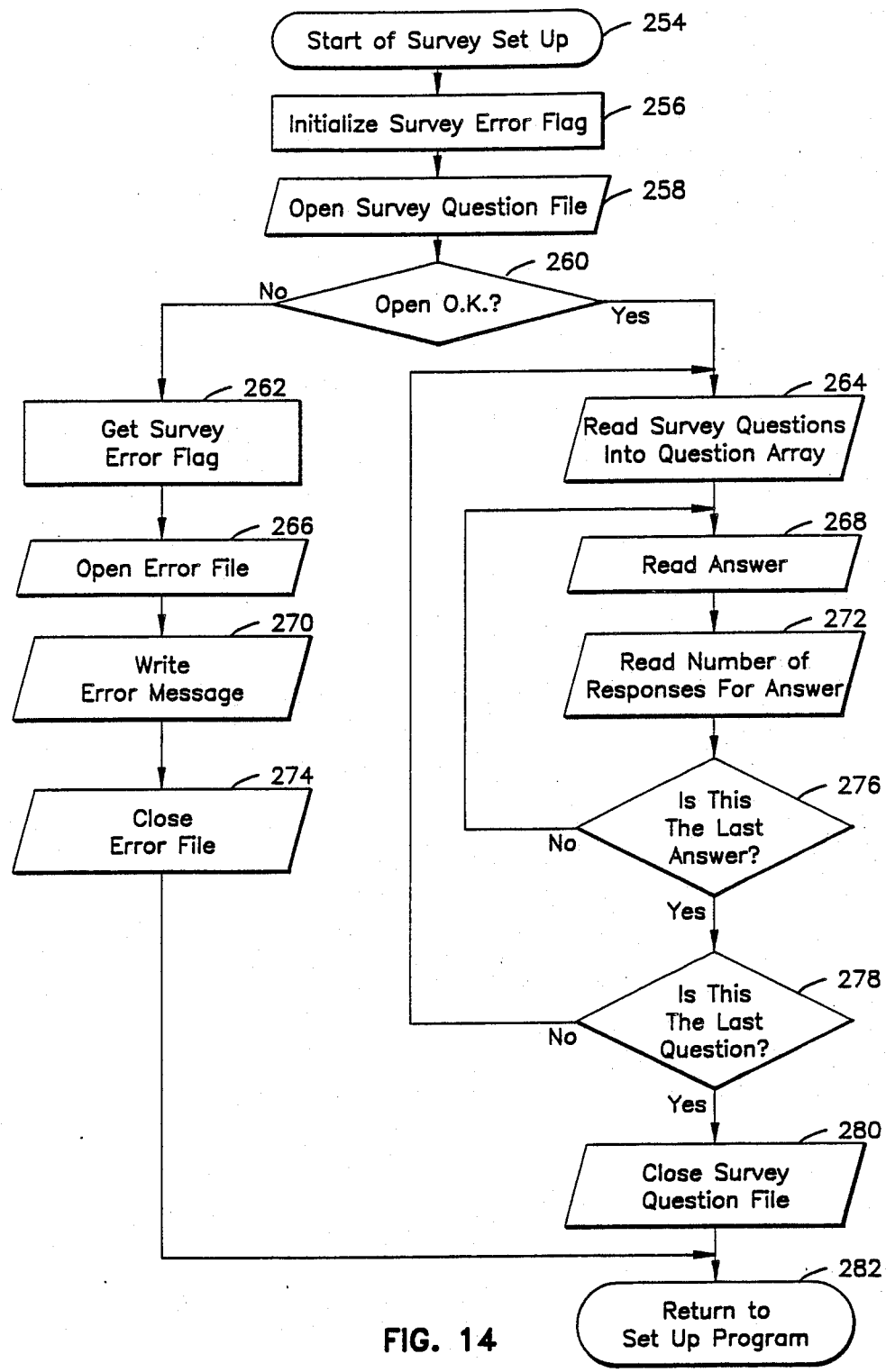
FIG. 14 is a flow chart describing the survey set-up routine.
Figure 48:
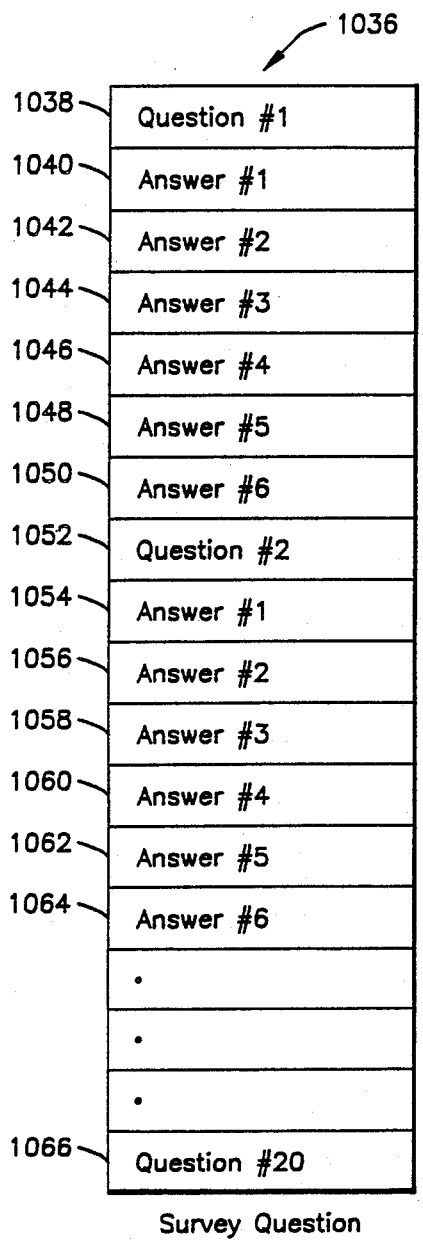
FIG. 48 is a block diagram describing the survey question file.

FIG. 14 is a flow chart describing the functions of the survey set-up routine. The survey set-up routine starts (254) when executed by the set-up routine as described in FIG. 8 (98). The survey error flag is initialized (256), and the survey question file is opened (258). The structure of the survey question file is described in FIG. 48. If the survey question file does not open correctly (260), then the survey error flag is set (262), a message is written to the error file (266, 270, and 274), and the survey set-up routine terminates (282). If the survey question file opened correctly (260), then a loop is entered to read the survey question records 1036 into the memory 12. The survey question file is read first for questions, for example, questions 1038, 1052, or 1060 (264). Immediately following each question 1038 and 1052 are multiple answers 1040–1050 and 1054–1064 (268). When all questions are read (278), the survey question file is closed (280), and the survey set-up routine terminates (282).

Figure 15:
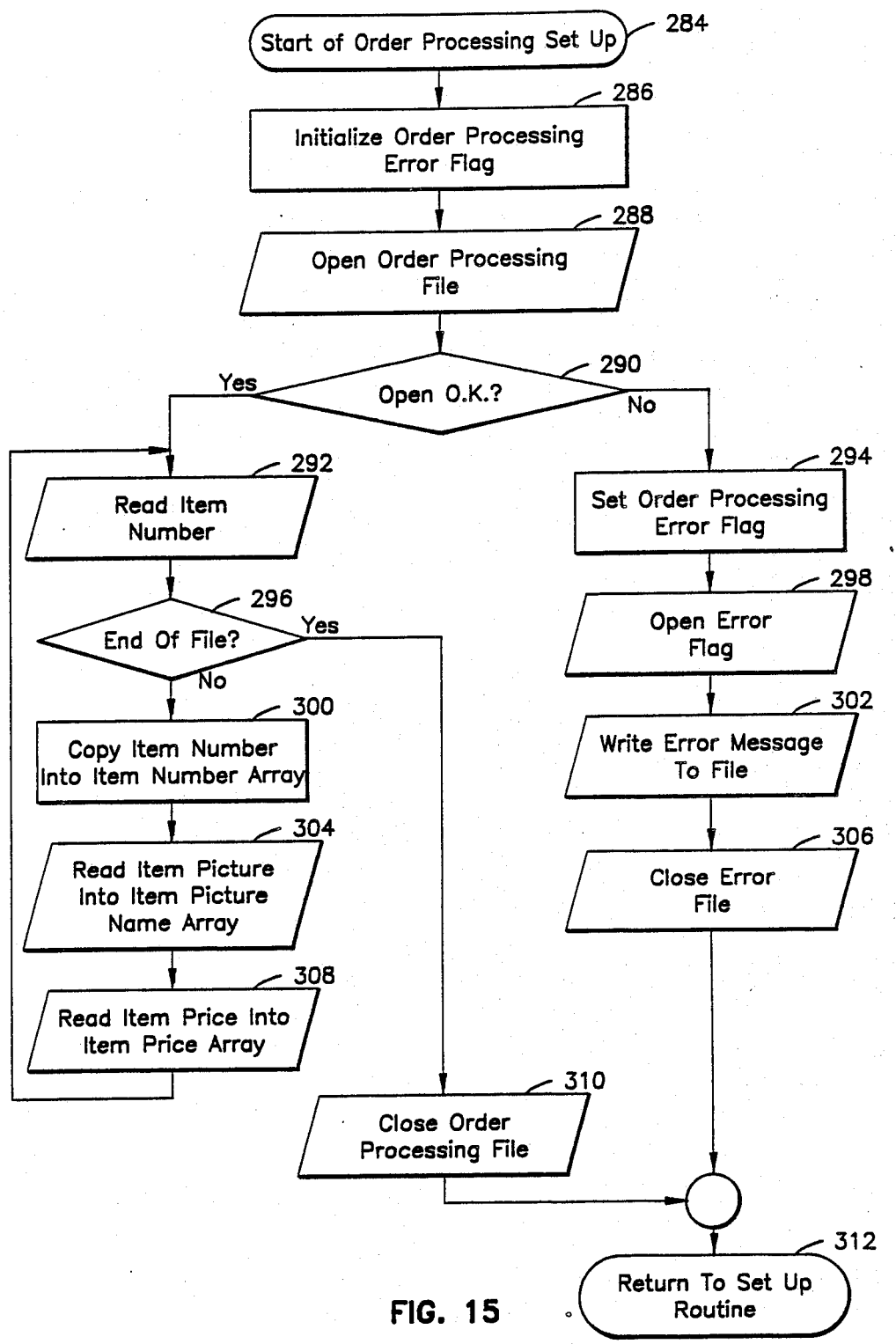
FIG. 15 is a flow chart describing the promotion network routine.

FIG. 15 is a flow chart describing the functions of the order processing set-up routine. The order processing set-up routine starts (284) when executed by the set-up routine as described in FIG. 8 (102). The order processing error flag is initialized (286), and the order processing file is opened (288). The structure of the order processing file is described in FIG. 47. If the order processing file does not open correctly (290), then the order processing error flag is set (294), a message is written to the error file (298, 302, and 306), and the order processing set-up routine terminates (312). If the order processing file opens correctly (290), then a loop is entered to read the records 1028 from the order processing file (292). Each record 1028 includes the item number 1030 (300), the item picture name 1032 (304), and the item price 1034 (308). All this information is stored in memory 12. When an end-of-file indication occurs (296) the order processing file is closed (310), and the order processing set-up routine terminates (312).

Figure 16:
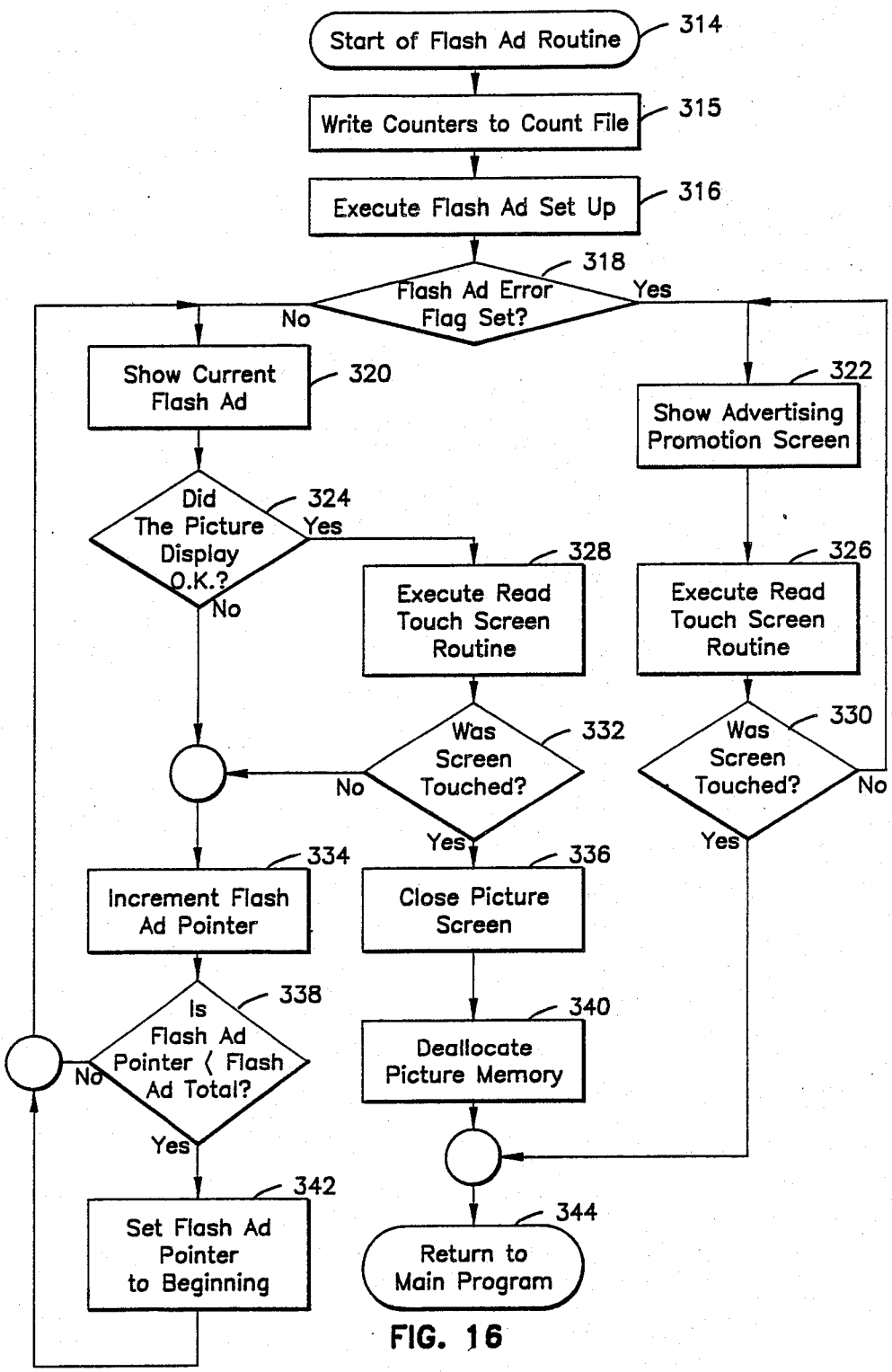
FIG. 16 is a flow chart describing the flash ad routine.

FIG. 16 is a flow chart describing the functions of the flash ad routine. The flash ad routine starts (314) when executed by the promotion network program as described in FIG. 7 (68). First, the current count file record 1166 (i.e. for the prior customer) is written to the counts file and a new counts file record 1166 is initialized (315). The flash ad set-up routine is executed (316). Upon completion, the flash ad error flag is examined to determine if an error occurred (318). If the error flag is set (318), then the show routine is executed to display the advertising promotion screen (322). Next, the read touch screen routine is executed (326). If the screen was not touched (330), then the show routine (322) and the read touch screen routine (326) are executed again. If the screen was touched (330), then the flash ad routine is terminated (344). If the flash ad set-up routine did not return an error (318), then the current flash ad is displayed on the monitor 14 (320). If the flash ad did not display correctly (324), then the flash ad pointer is incremented (334) to a new flash ad entry which displays on the monitor 14 (320). During this incrementing process, the pointer is reset to the first entry in the table (342) if it increments beyond the end of the table (338). If the picture is displayed correctly on the monitor 14 (324), then the read touch screen routine is executed (328). The return code from the read touch screen routine is evaluated to determine if an error occurred or if valid data was entered by the customer (332). If an error occurred, then the flash ad pointer is incremented (334) and the next flash ad is displayed in the monitor occurs (320). If valid data was entered by the customer (332), then the picture screen is closed (336), the picture memory is deallocated (340), and the flash ad routine terminates (344).

Figure 17:
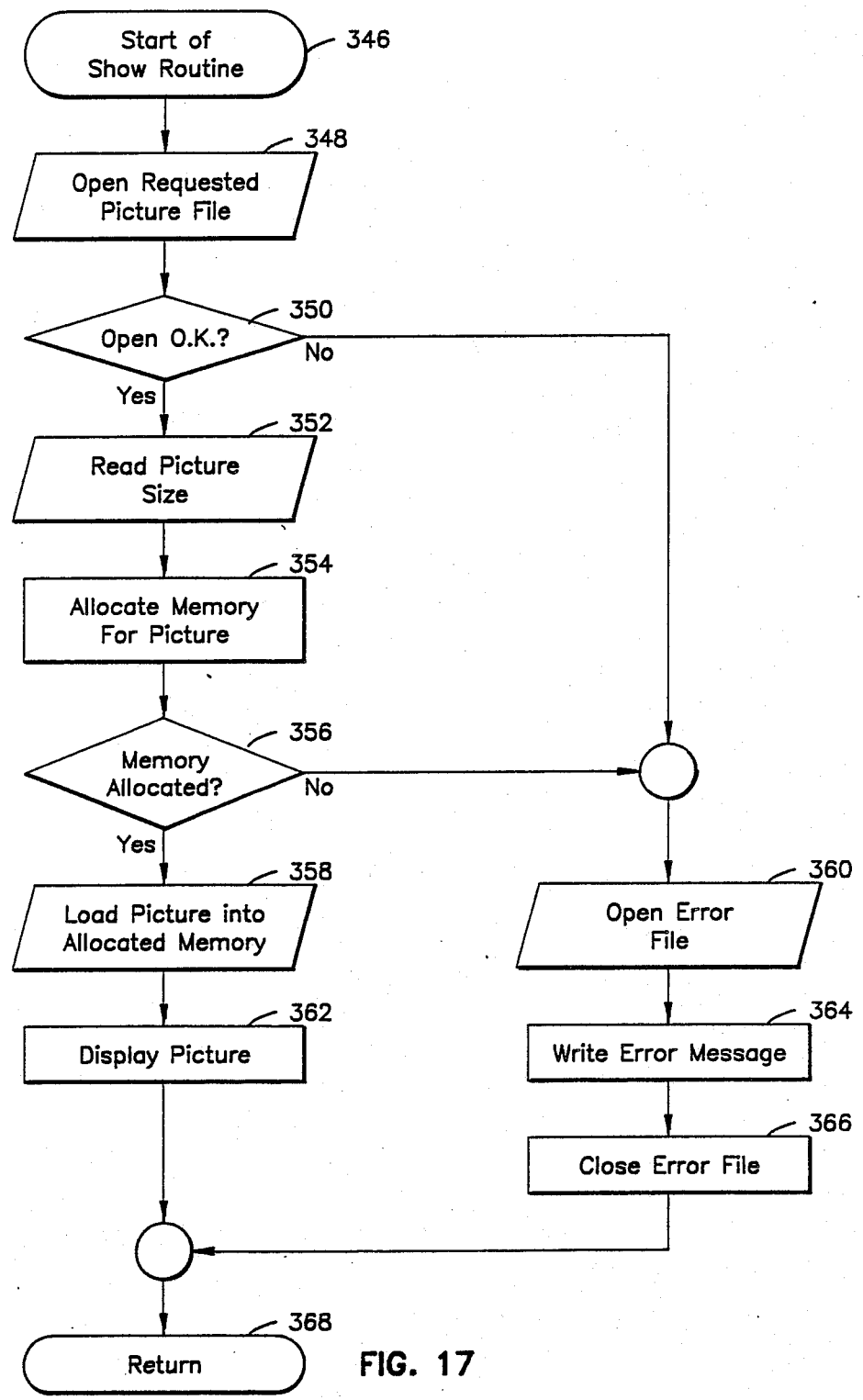
FIG. 17 is a flow chart describing the show routine.

FIG. 17 is a flow chart describing the functions of the show routine. The show routine (346) is executed to display pictures on the monitor 14 such as described in FIG. 16 (320). The picture file name is passed as a parameter to the show routine and the requested picture file is opened (348). The structure of the system and ad picture files are described in FIGS. 55 and 56 respectively. Each record 1112 in a picture file includes a raster width 1114, a raster height 1116, an x image position 1118, a y image position 1120, the number of bit planes 1122, a pad byte 1124, a transparent color 1126, an x aspect 1128, a y aspect 1130, the page width 1132, the page height 1134, and the body of the picture 1136. If an error occurs during the open operation (350), then a message is written to the error file (360, 364, and 366), and the show routine terminates (368). If the file opens correctly (350), then the picture size is determined (352) and a portion of the memory 12 is allocated for the picture (354). If the memory allocation step fails (356), then a message is written to the error file (360, 364, and 366), and the show routine terminates (368). If the memory allocation succeeds (356), then the picture image is loaded into the allocated memory space (358). Once in memory, the picture can then be displayed on the monitor 14 (362) and the show routine terminates (368).

Figure 18:
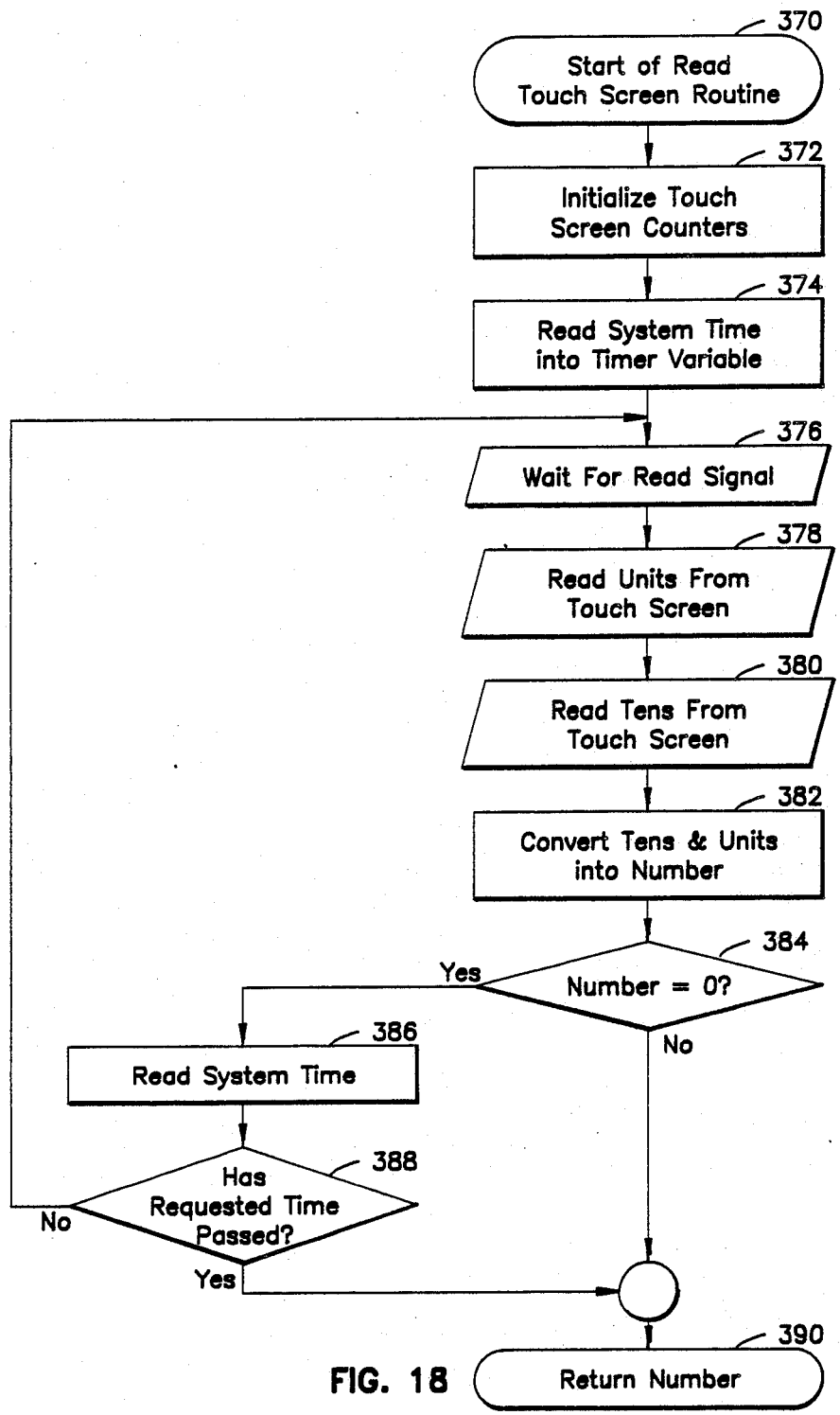
FIG. 18 is a flow chart describing the read touch screen routine.

FIG. 18 is a flow chart describing the functions of the read touch screen routine. The read touch screen routine starts (370) when user input is desired, for example, as described in FIG. 16 (326) and (328). First, the touch screen counters are initialized (372) and the system time is read into a timer variable (374). A loop is entered whereby user input is accepted during a timed read operation. The timed read operation begins by waiting for a read signal (376). Once the user input is accepted, or a timer indicates that the program has waited long enough for user input, the read touch screen routine terminates (390). When the read signal occurs, a units value is read from the touch screen (378) and then a tens value is read from the touch screen (380). The tens and units values are converted into a number (382) and that number is examined to determine if it has the value zero (384). If the value is non-zero, then valid user input was read, and the read touch screen routine terminates (390). If the number has the value of zero (384), then it must be determined whether the timer has expired. The system time is read (386) and the system time is compared to the prior system time read during initialization (388). If the comparison indicates that the timer has not expired, then the read touch screen routine transfers control to await another read signal (376). If the timer has expired (388), then the read touch screen routine terminates (390).

FIG. 19 is a flow chart describing the functions of the main menu routine. The main menu routine starts (392) when executed by the promotion network program as described in FIG. 7 (70). The main menu routine executes the show routine to display the menu screen on the monitor 14 (394). The read touch screen routine is executed to accept user input (386). The touch pad number value is converted into a selection (398), and the selection is returned to the calling program as the main menu routine terminates (400).

Figure 20A:
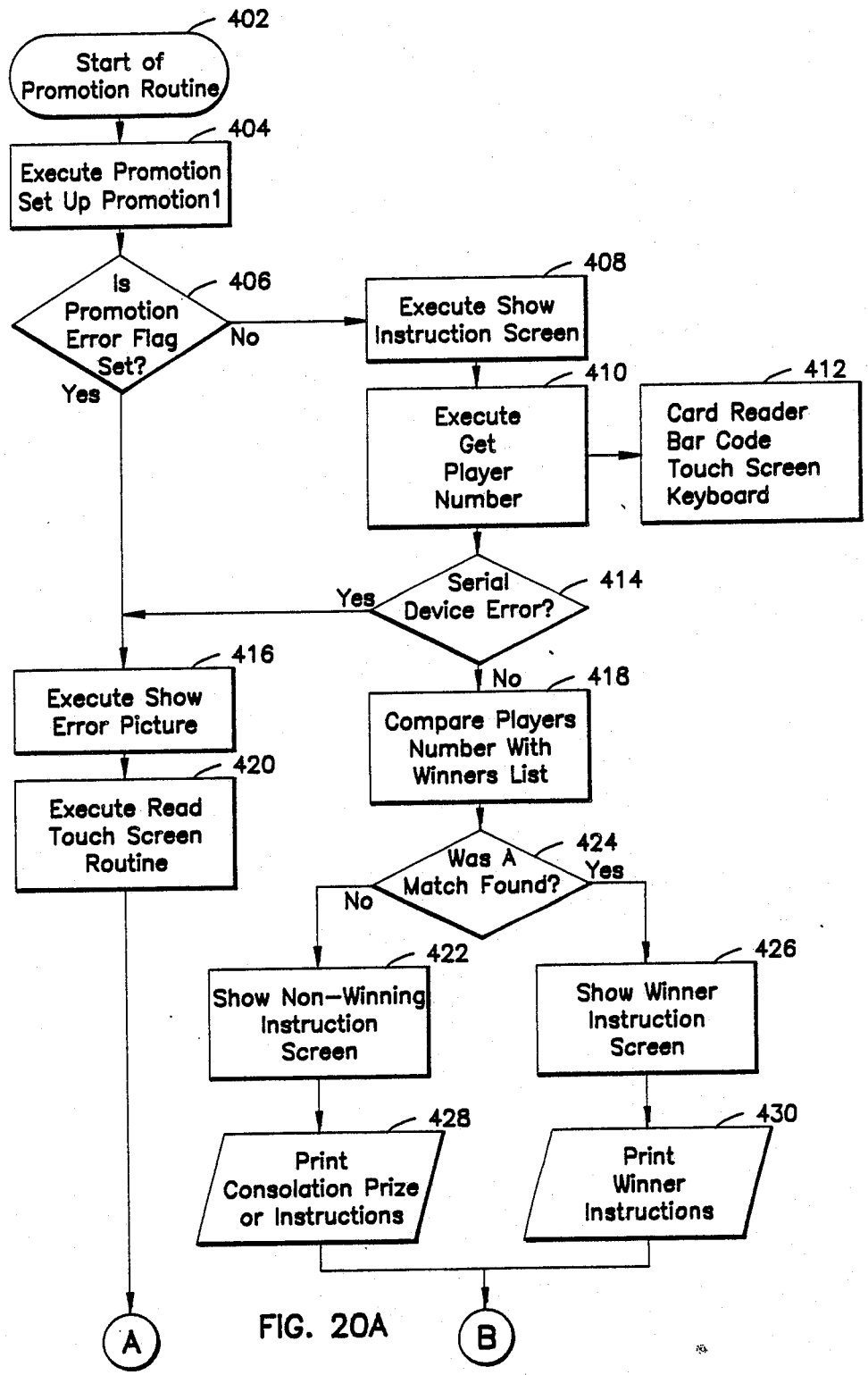
FIG. 20A and 20B combined are a flow chart describing the promotion program routine.
Figure 20B:
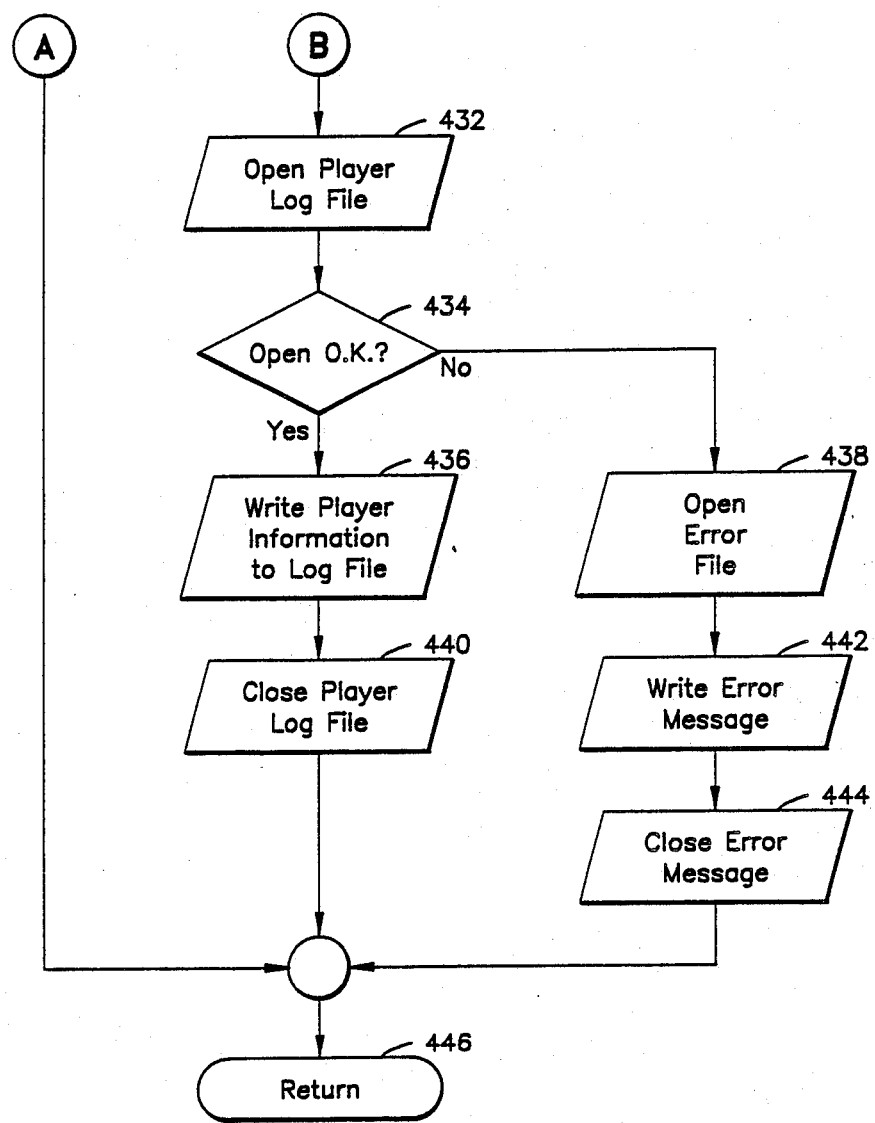
Figure 46:
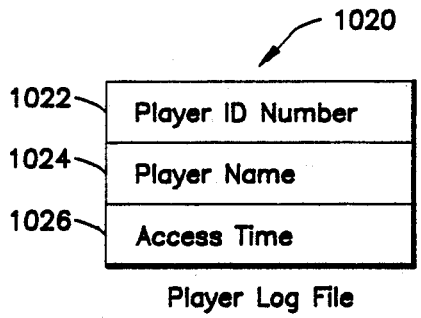
FIG. 46 is a block diagram describing the player log files.

FIGS. 20A and 20B combined are a flow chart describing the functions of the promotion program routine. The promotion program routine starts (402) when executed by the promotion network program as described in FIG. 7 (76). The promotion set-up routine is executed and the promotion1 winners list file name is passed as a parameter (404). Upon return from the promotion set-up routine, the promotion error flag is examined (406). If an error occurred (406), then the show routine is executed to display an error screen (416). The read touch screen routine is executed (420) to provide a timer for the error screen display, following which the promotion program routine terminates (446). If the promotion error flag is not set (406), then the show routine is executed to display the instruction screen (408). The user must input a player number (410) by means of a card reader 24, bar code reader 26, touch screen 28, or keyboard 30 (412). If a device error occurs during user input (414), then an error screen is displayed (416) for a predetermined amount of time (420) before the promotion program routine terminates (446). If no error occurs on the user input (414), then the player number is compared with the sweepstakes numbers 1102 in the promotion winners list (418). If a match is found, then the show routine is executed to display a winner instruction screen (426). A list of instructions are also sent to the printer 32 (430). If the player's number did not match any of the sweepstakes numbers 1102 in the promotion winners list (424), then the show routine is executed to display a non-winning instruction screen (422). It is possible for the system to send to the printer 32 a consolation prize or a different set of instructions (428). Immediately following the check of the promotion winners list, the player log file is opened (432). The structure of the player log file is described in FIG. 46. If the open fails for some reason (434), a message is written to the error file (438, 442, and 444), and the promotion program routine terminates (446). If the player log file is opened correctly (434), then the current player information, including the player id number 1022, the player name 1024, and the access time 1026, is written to the player log file (436). The player log file is then closed (440) and the promotion program routine is terminated (446).

FIG. 21 is a flow chart describing the functions of the card reader routine. The card reader routine starts (448) when executed by a higher level routine requesting input from a customer. The card reader routine sets the baud rate, the number of stop bits, the parity type, and the duplex mode for the card reader device 24 (450).

The read serial port routine is then executed (452), and the card reader routine terminates thereafter, returning either the user input or device error (456).

Figure 22:
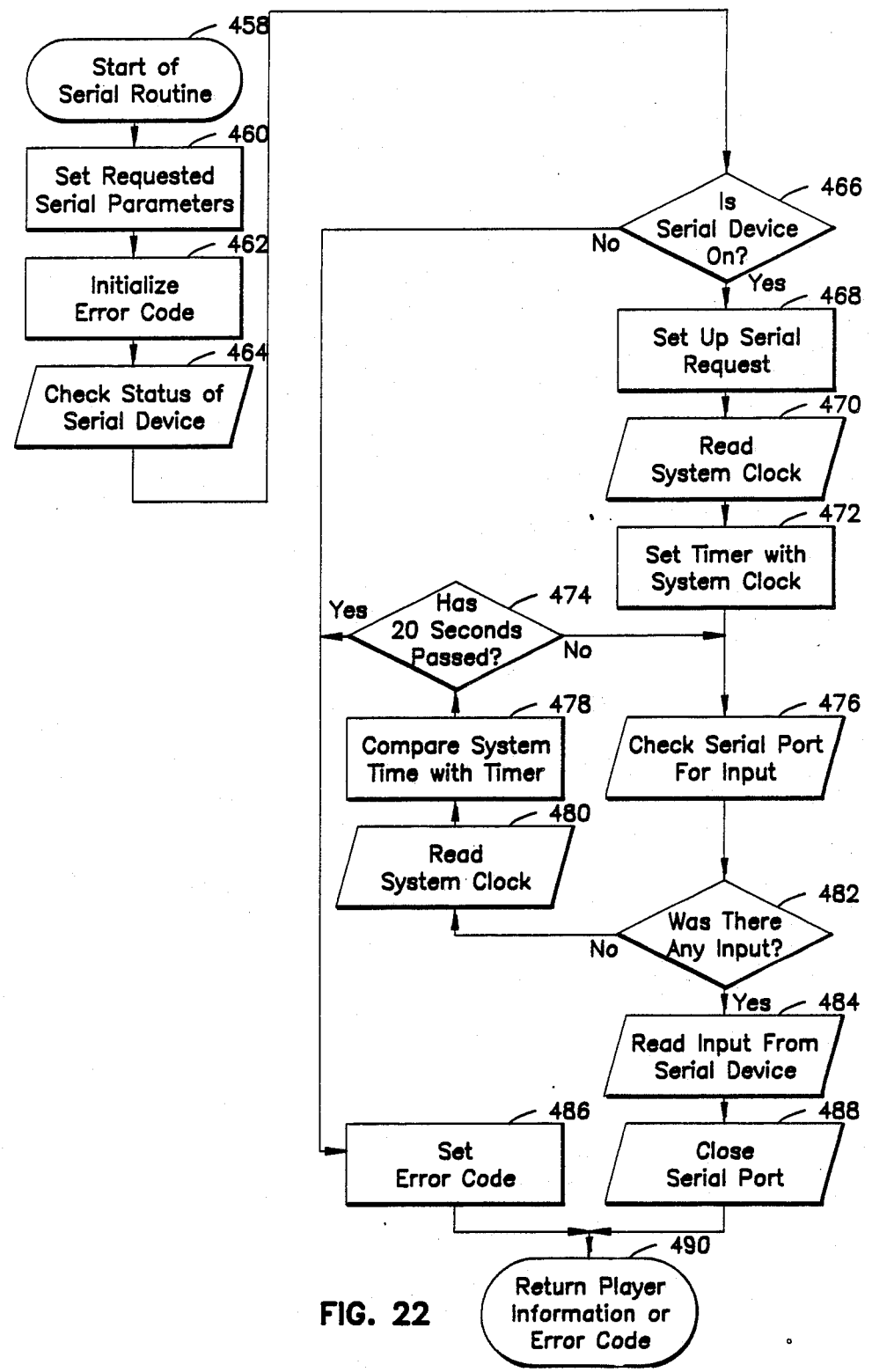
FIG. 22 is a flow chart describing the read serial port routine.

FIG. 22 is a flow chart describing the functions of the read serial port routine. The read serial port routine starts (458) when executed by a higher level routine, such as the card reader routine described in FIG. 21 (452). The requested parameters for the serial I/0 are set (460), and the error code is initialized (462). An initial check is made of the status of serial device (464). If the serial device is not on (466), then the error code is set (486), and the read serial port routine terminates (490). If the serial device is on (466), then the specific serial request is set-up (468). The system clock is read (470) to provide a timer for the I/0 operation (472). An I/0 loop is entered, whereby the serial port is checked periodically for user input (476). If there was no user input (482), then the system clock is read (480) and compared with the timer value set earlier (478). If 20 seconds, or some other pre-determined period, have passed (474), then the error code is set (486), and the read serial port routine terminates (490). If the 20 second period has not expired (474), then the serial port is checked once again for user input (476). When user input is finally signalled (482), then the input is read from the serial device (484), and the serial port is closed (488). The read serial port routine terminates and returns the user input (490).

FIG. 23 is a flow chart describing the functions of the bar code routine. The bar code routine starts (492) when executed by a higher level routine, such as the promotion program described in FIGS. 20A and 20B (412). The bar code routine sets the baud rate, the number of stop bits, the parity, and the duplex mode for the bar code reader 26 (494). The read serial port routine is then executed (496). Upon acceptance of the user input, the bar code routine terminates and returns the user input or a device error (498).

Figure 24:
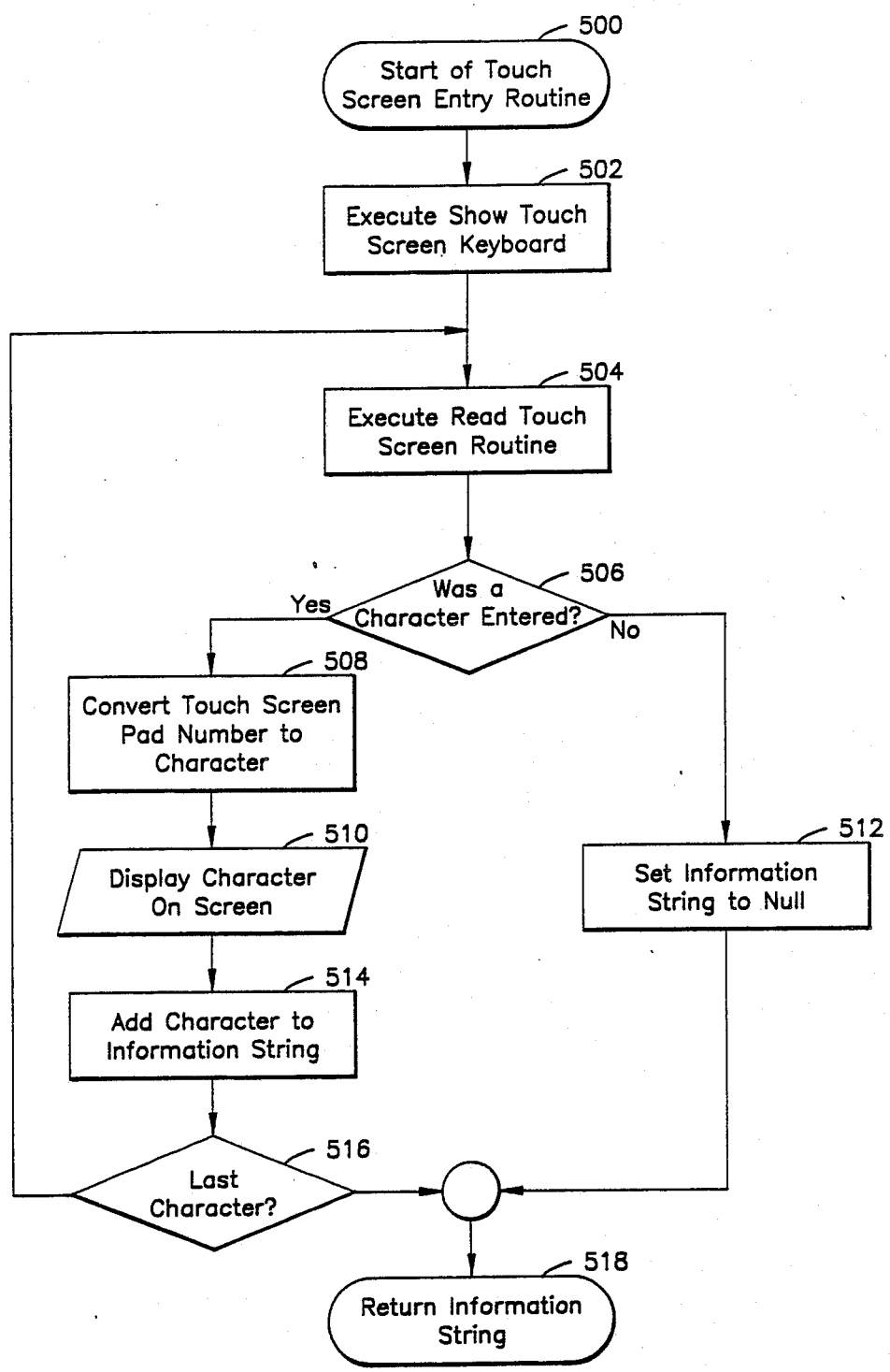
FIG. 24 is a flow chart describing the touch screen entry routine.

FIG. 24 is a flow chart describing the functions of the touch screen entry routine. The touch screen entry routine starts (500) when executed by a higher level program, such as the promotion program described in FIG. 20A and 20B (412). The show routine is executed to display the touch screen keyboard (502). A loop is then entered to await the user input. The read touch screen routine is executed (504) and the results returned from the read touch screen routine are examined to determine if a character was entered (506). If a character was not entered (506), the information screen is set as a null string (512), and the touch screen entry routine terminates (518). If a character was entered (506), then the touch screen pad number is converted to a character (508). The character is displayed on the monitor 14 (510) and is added to the information string (514). If the character is not the last character of user input (516), then the read touch screen routine is executed once again (504). If the last character of user input has been processed (516), then the information string is returned to the calling program (518).

Figure 25:
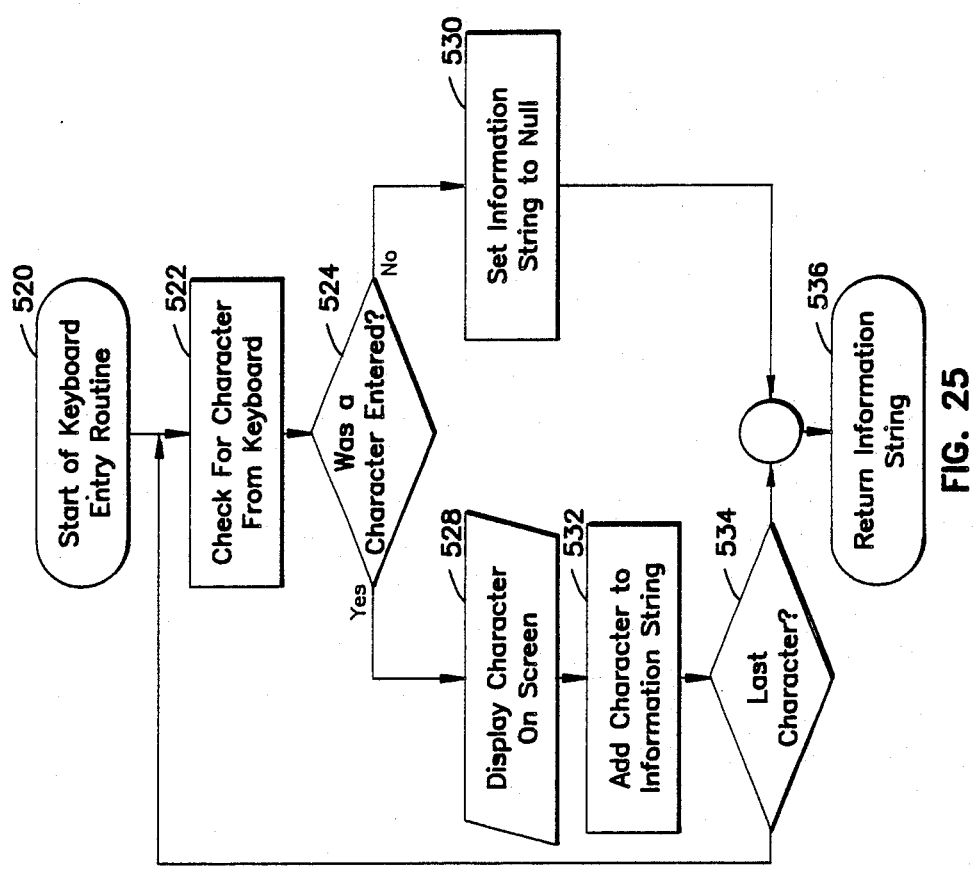
FIG. 25 is a flow chart describing the keyboard entry routine.

FIG. 25 is a flow chart describing the functions of the keyboard entry routine. The keyboard entry routine starts (520) when executed by a higher level routine, for example, the promotion program routine described in FIGS. 20A and 20B (412). The keyboard entry routine is comprised of a control loop that waits for user input from the keyboard 30. The keyboard 30 is checked to determine if a character has been entered (522). If a character was not entered (524), then the information string is set as a null string (530), and the keyboard entry routine terminates (536). If a character was entered (524), then the touch screen pad number is converted to a character (526), the character is displayed on the monitor 14 (528), and the character is added to the information string (532). If the character was not the last character of the user input (534), then the keyboard 30 is checked for input once again (522). If the character was the last character of user input (534), then the keyboard entry routine terminates and returns the information string to the calling in program (536).

Figure 26:
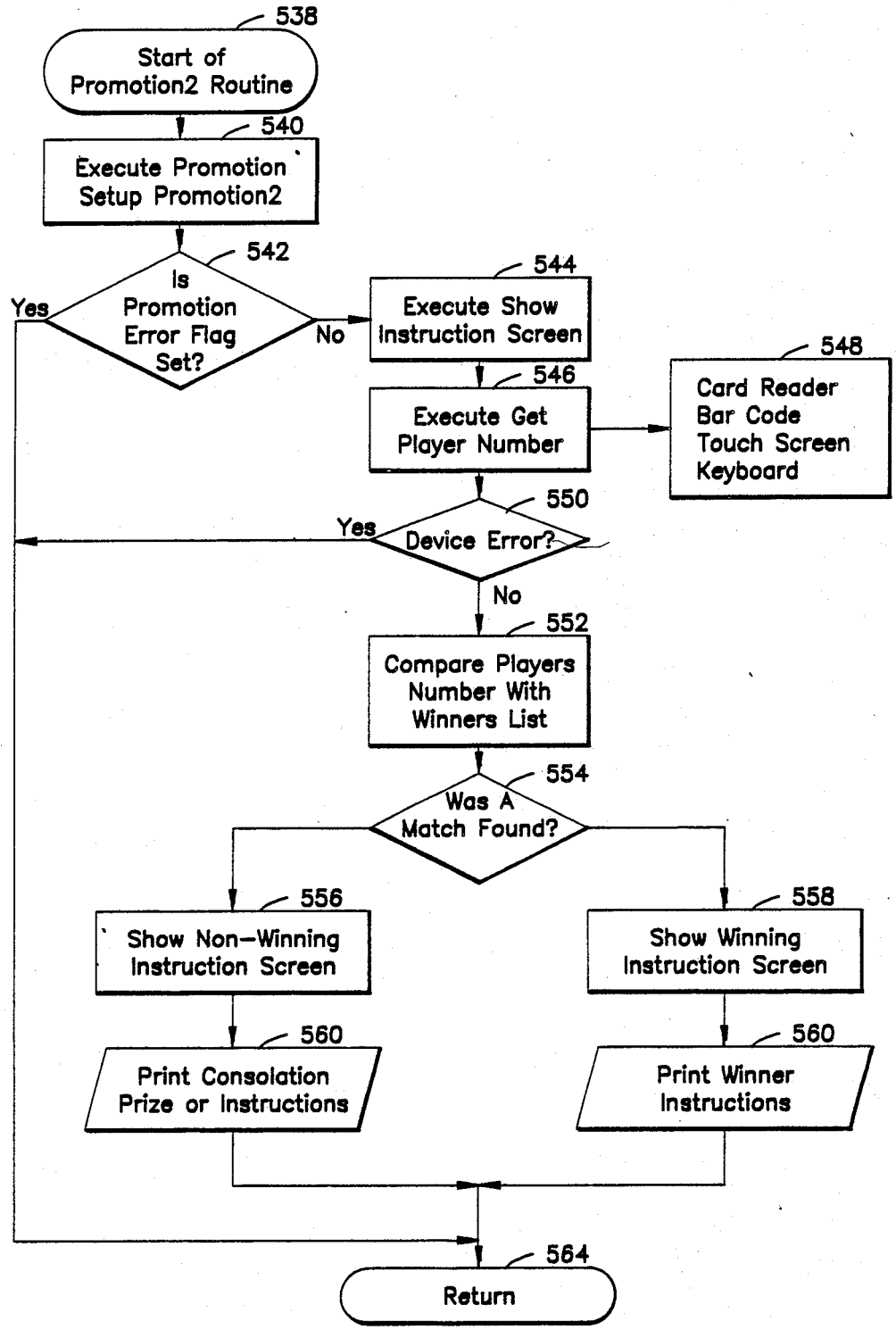
FIG. 26 is a flow chart describing the promotion routine.

FIG. 26 is a flow chart describing the functions of the promotion2 routine. The promotion2 routine starts (538) when executed by the promotion network program as described in FIG. 7 (76). The promotion set-up routine is executed and the promotion2 winners list file name is passed as a parameter (540). Upon return from the promotion set-up routine, the promotion error flag is examined (542). If an error occurred (542), then the promotion2 routine terminates (564). If the promotion error flag is not set (542), then the show routine is executed to display the instruction screen on the monitor 14 (544). The user must input a player number (546) by means of a card reader 24, bar code reader 26, touch screen 28, or keyboard 30 (548). If a device error occurs during user input (550), then the promotion2 routine terminates (564). If no error occurred on the user input (550), then the player number is compared with the sweepstakes numbers 1102 from the promotion winners list (418). If a match is found, then the show routine is executed to display a winner instruction screen on the monitor 14 (558). A list of instructions are also sent to the printer 32 (562). If the player's number did not match any of the sweepstakes numbers 1102 in the promotion winners list (554), then the show routine is executed to display a non-winning instruction screen on the monitor 14 (558). It is possible for the system to send to the printer 32 a consolation prize or a different set of instructions (560). In this promotion2 routine, the player log file is not updated, and the promotion2 routine terminates (564).

Figure 27:
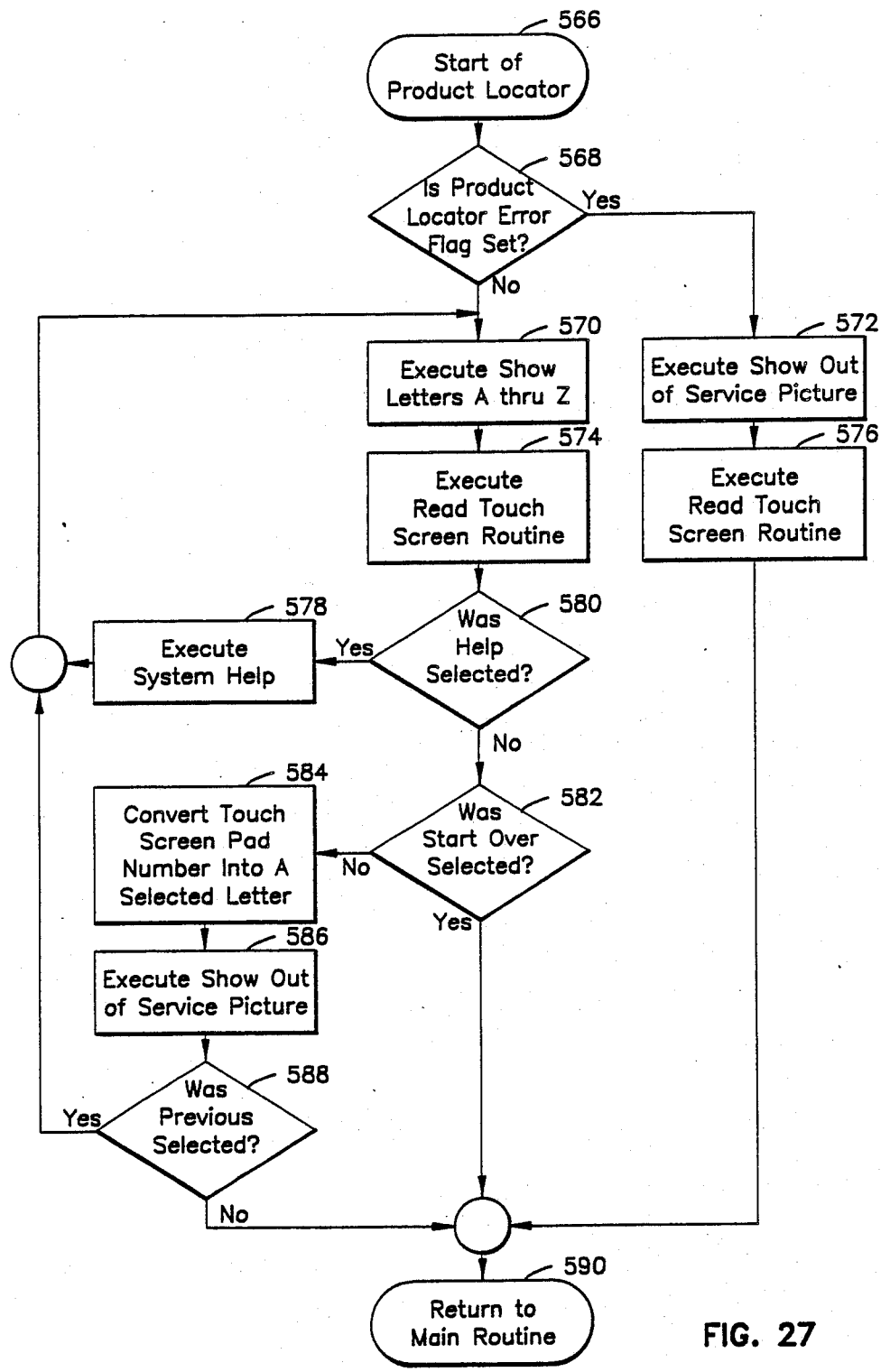
FIG. 27 is a flow chart describing the product locator routine.

FIG. 27 is a flow chart describing the functions of the product locator routine. The product located routine starts (566) when executed by the promotion network program as described in FIG. 7 (76). The product locator error flag is examined to determine if it has been set by the product locator set-up routine described in FIG. 11 (568). If the product locator error flag is set (568), then the show routine is executed to display the "out-of-service" picture on the monitor 14 (572). The touch screen entry routine is executed for its timer function (576) and the product locator routine terminates (590). If the product error flag was not set (568), then a loop is entered to guide the customer through the product locator menu structure. The show routine is executed to display the main product locator menu on the monitor 14 whereby products are located in categories ordered alphabetically (570). The touch screen entry routine is executed to accept user input (574). If the user input is a request for help (580), then the system help routine is executed (578) following which control transfers to the main product locator menu (570). If the user input is a request to restart (582), then the product locator routine terminates (590). In all other cases, it is assumed that the customer has selected a particular category of products. The user input from the touch screen pad is converted into a letter (584). The list products routine is executed according to the user input (586). Upon completion of the list products routine, if the user input is the command "previous" (588), then the main product locator menu is displayed on the monitor 14 again (570). Otherwise, the product locator routine terminates (590).

Figure 28A:
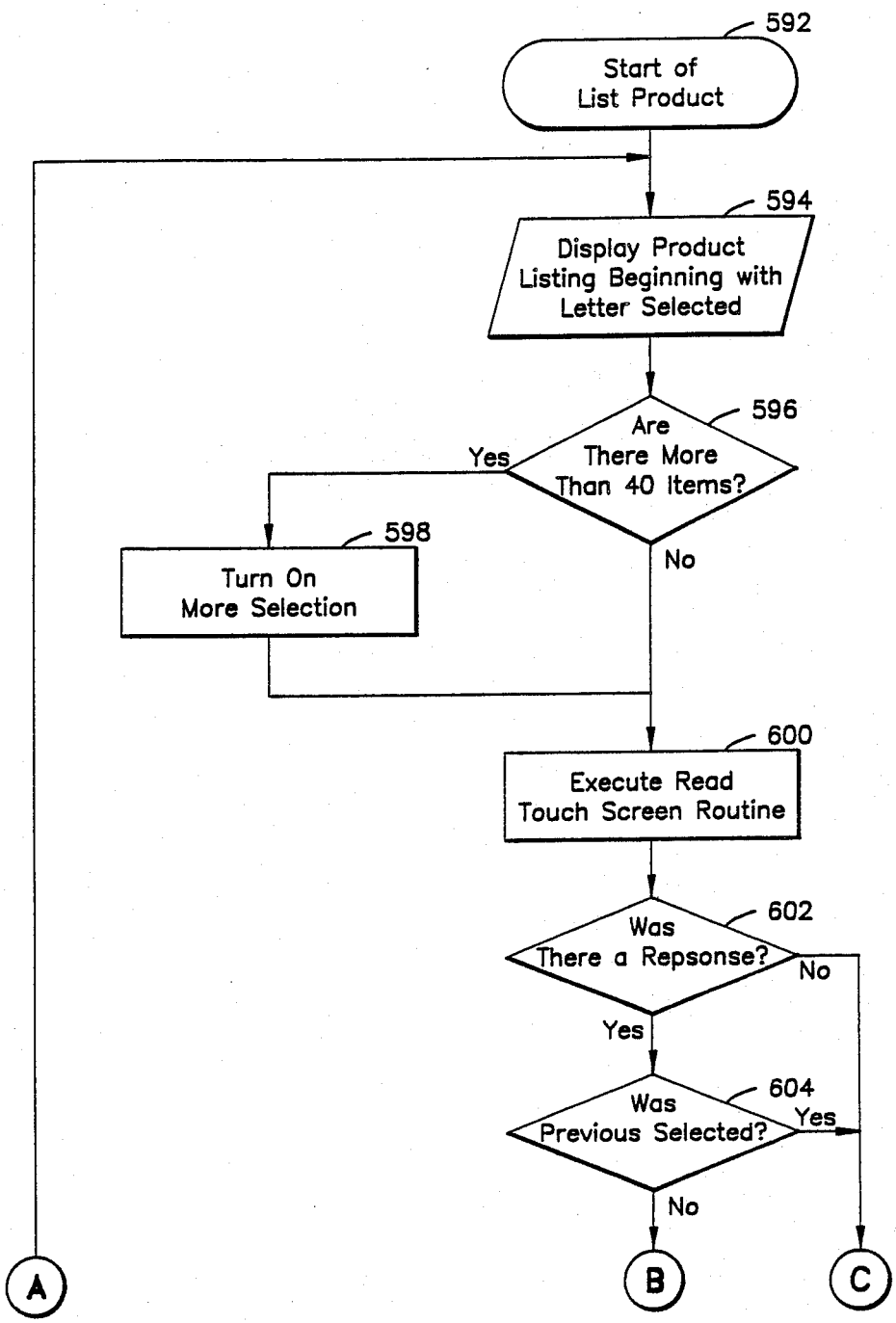
FIGS. 28A and 28B combined are a flow chart describing the list products routine.
Figure 28B:
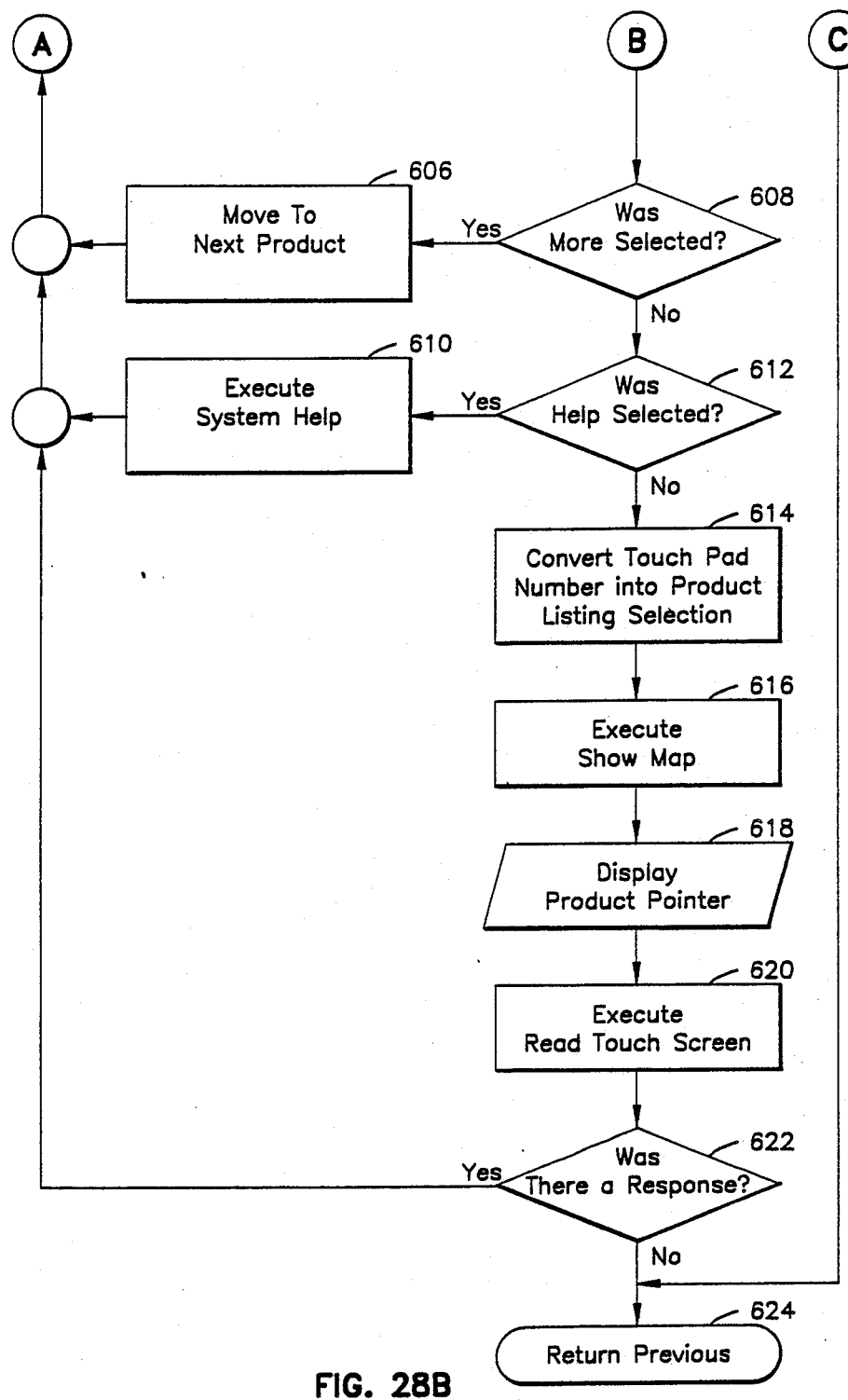

FIGS. 28A and 28B combined are a flow chart describing functions of the list products routine. The list products routine starts (592) when executed by the product locator routine as described in FIG. 27 (586). The list products routine is a loop that allows a customer to browse through product listings according to a selected letter. The initial letter for this browse function is the value passed as a parameter when the list products routine is executed. The product listing beginning with the letter selected is displayed on the monitor 14 (594). If there are more than 40 items in the product listings (596), which is the maximum number of listings that can be displayed on the monitor 14, then a "more" indicator is displayed on the monitor 14 (598). The touch screen entry routine is executed to accept user input (600). If there is no response (602) and the touch screen entry routine terminates because of the timer, then the list products routine terminates (624). If the user input is a "previous" command (604), then the list products routine terminates (624). If the user input is the "more" command (608), then the list products routine moves to the next entry in the product listing (606) and displays the product listing beginning with the letter selected on the monitor 14 (594). If the user input is the "help" command (612), then the system help routine is executed (610) following which the product listing is re-displayed on the monitor 14 (594). In all other cases, the user input is considered to be a product listing selection (614). The show routine is executed to display a map of the retail area on the monitor 14 (616). The product pointer is displayed on the map based on the customer's selection (618). The pointer is located according to the coordinates 1096 and 1098 described in FIG. 52. The read touch screen routine is executed to wait for further user input or a possible time-out condition (620). If there is a time-out from the map display (622) then the list products routine terminates (624). If there is a response from the customer (622), then the product listing is redisplayed according to its last position (594).

Figure 29:
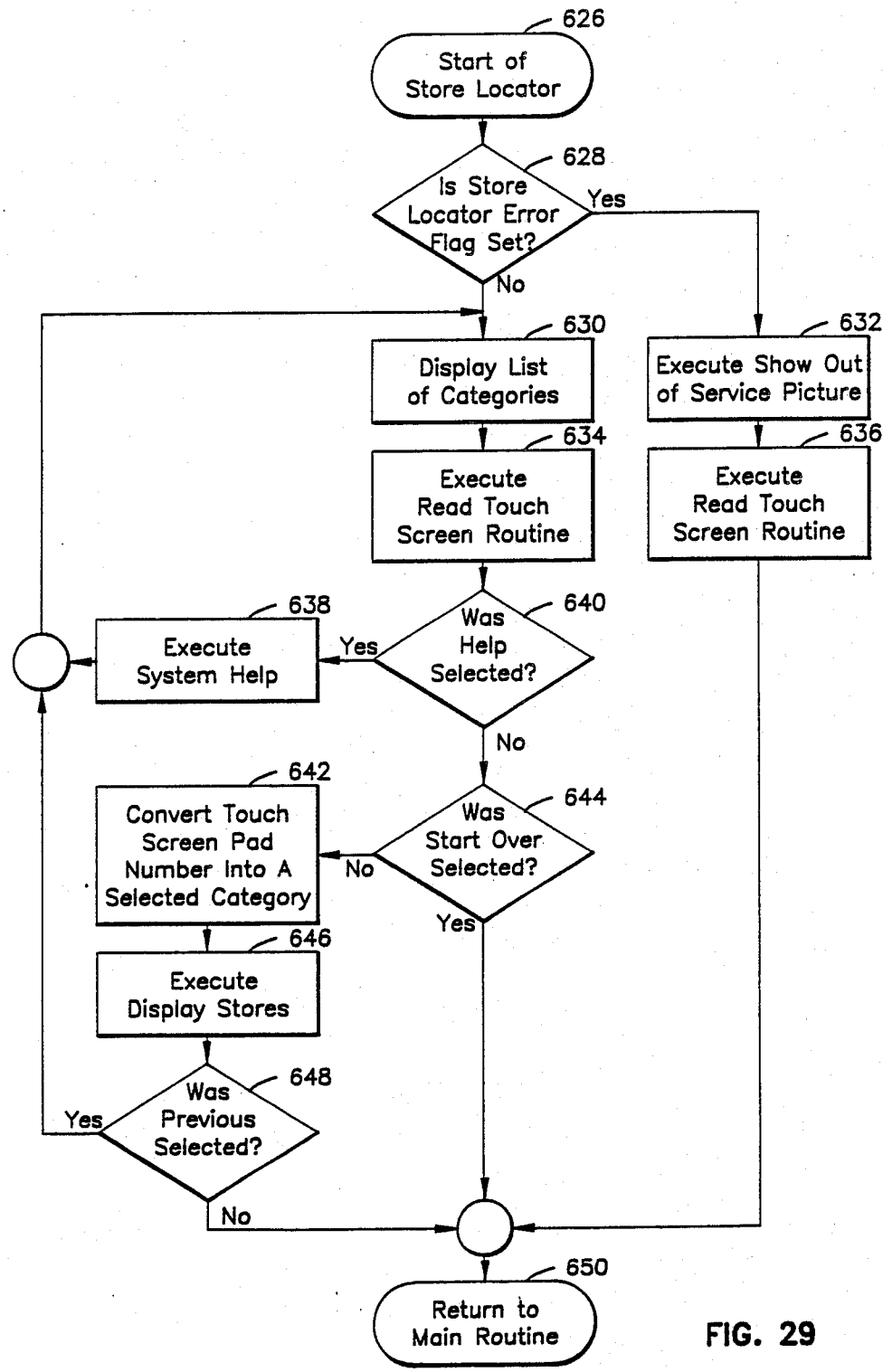
FIG. 29 is a flow chart describing the store to locator routine.

FIG. 29 is a flow chart describing the functions of the store locator routine. The store routine locator starts (626) when executed by the promotion network program as described in FIG. 7 (76). The store locator error flag is examined (628) to determine if an error occurred during the store locator set-up routine. If the store locator error flag is set (628), then the show routine is executed to display the "out-of-service" picture on the monitor 14 (632), the read touch screen routine is executed for its timer function (636), and the store locator routine terminates (650). If the store error flag is not set (628), then a loop is entered to guide the customer through the store locator menu structure. The show routine is executed to display the main store locator menu on the monitor 14 whereby stores are located in categories ordered alphabetically (630). The touch screen entry routine is executed to accept user's input (634). If the user input is a request for help (640), then the system help routine is executed (638) following which control transfers to the main store locator menu (630). If the user input is a request to restart (642), then the store locator routine terminates (650). In all other cases, it is assumed the customer has selected a particular category of stores. The user input from the touch screen pad is converted into a letter (644). The display stores routine is executed according to the user input (646). Upon completion of the display stores routine, if the user input is the command "previous" (648), then the main store locator menu is displayed on the monitor 14 again (630). Otherwise, the store locator routine terminates (590).

Figure 30A:
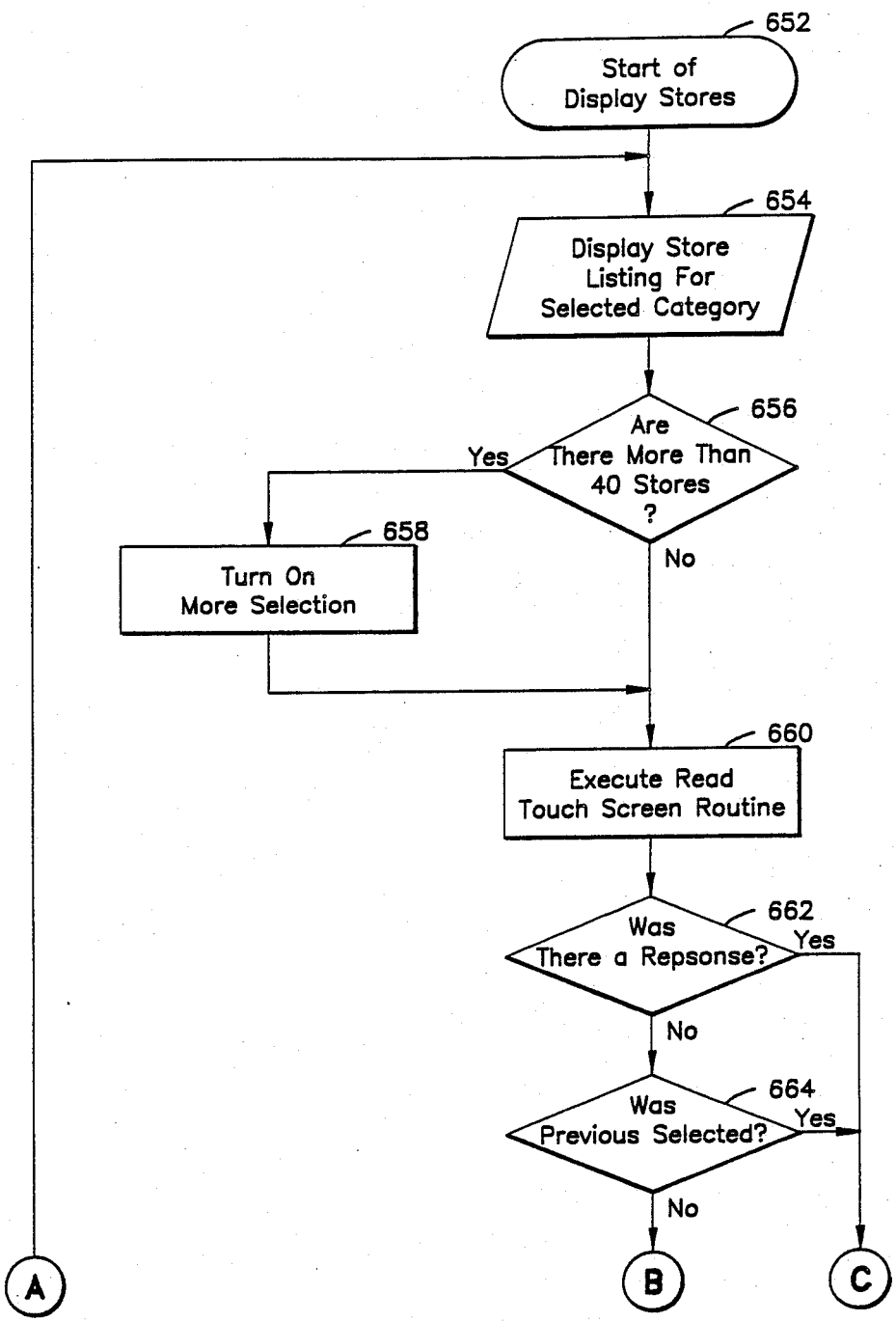
FIG. 30A and 30B combined are a flow chart describing the display stores routine.
Figure 30B:
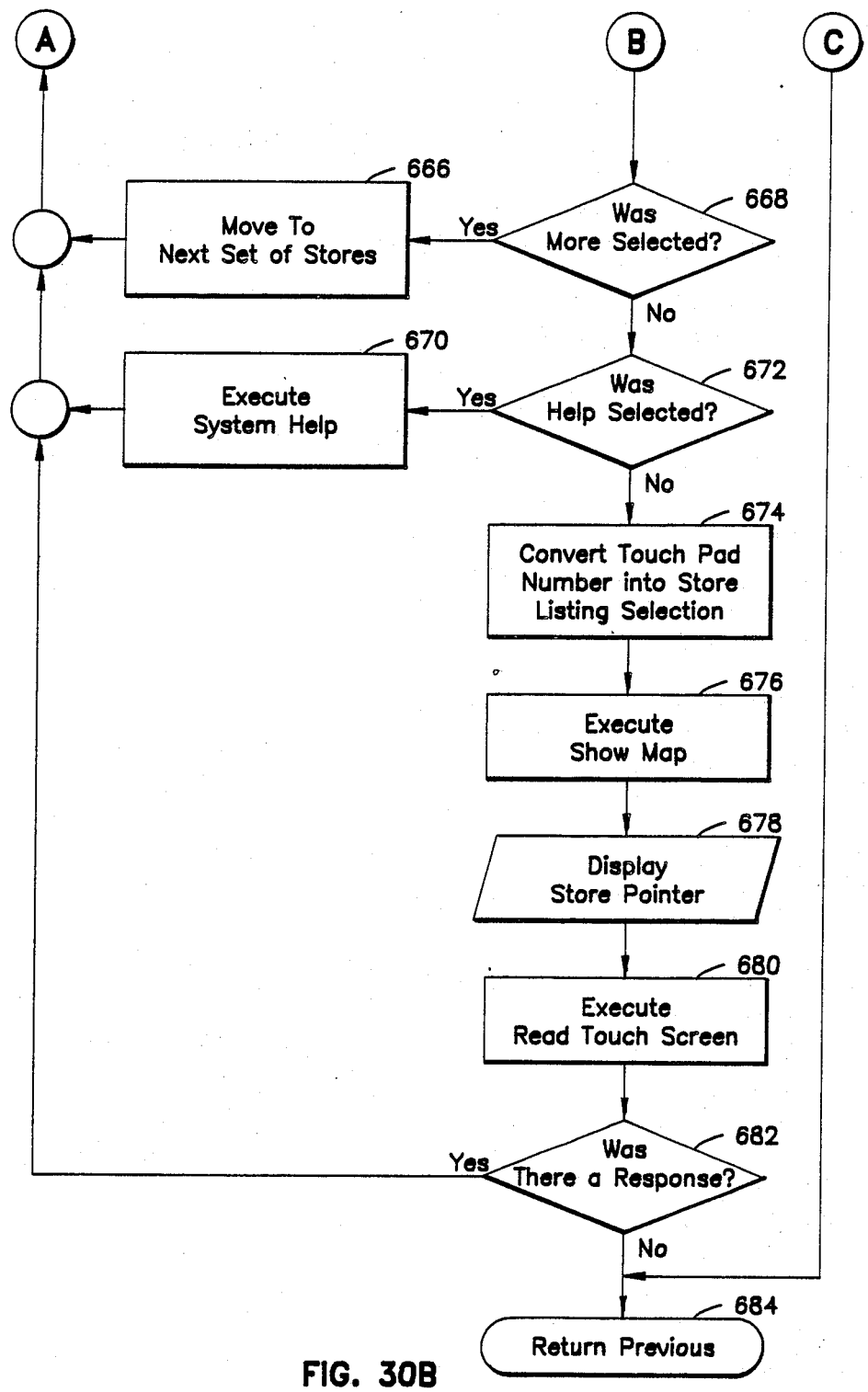

FIGS. 30A and 30B combined are a flow chart describing the functions of the display stores routine. The display stores routine starts (652) when executed by the store locator routine as described in FIG. 29 (646). The display stores routine is a loop that allows a customer to browse through store listings according to a selected letter. The initial letter for this browse function is the value passed as a parameter when the display stores routine is executed. The store listing beginning with the letter selected is displayed on the monitor 14 (654). If there are more than 40 items in the store listings (656), which is the maximum number of listings that can be displayed on the monitor 14, then a "more" indicator is displayed on the monitor 14 (658). The touch screen entry routine is executed to accept user input (660). If there is no response (602) and the touch screen entry routine terminates because of the timer, then the display stores routine terminates (684). If the user input is a "previous" command (664), then the display stores routine terminates (684). If the user input is the "more" command (668), then the display stores routine moves to the next entry in the store listing on the monitor 14 (666) and displays the store listing on the monitor 14 beginning with the letter selected (654). If the user input is the "help" command (672), then the system help routine is executed (670) following which the store listing is re-displayed on the monitor (654). In all other cases, the user input is considered to be a store listing selection (674). The show routine is executed to display a map of the retail area on the monitor 14 (616). The store pointer is displayed on the map based on the customers selection (678). The pointer is located according to the coordinates 1088 and 1090 described in FIG. 51. The read touch screen routine is executed to wait for further user input or a possible time out condition (680). If there is a time-out from the map display (682), then the display stores routine terminates (684). If there is a response from the customer (682), then the store listing is re-displayed according to its last position (654).

Figure 31A:
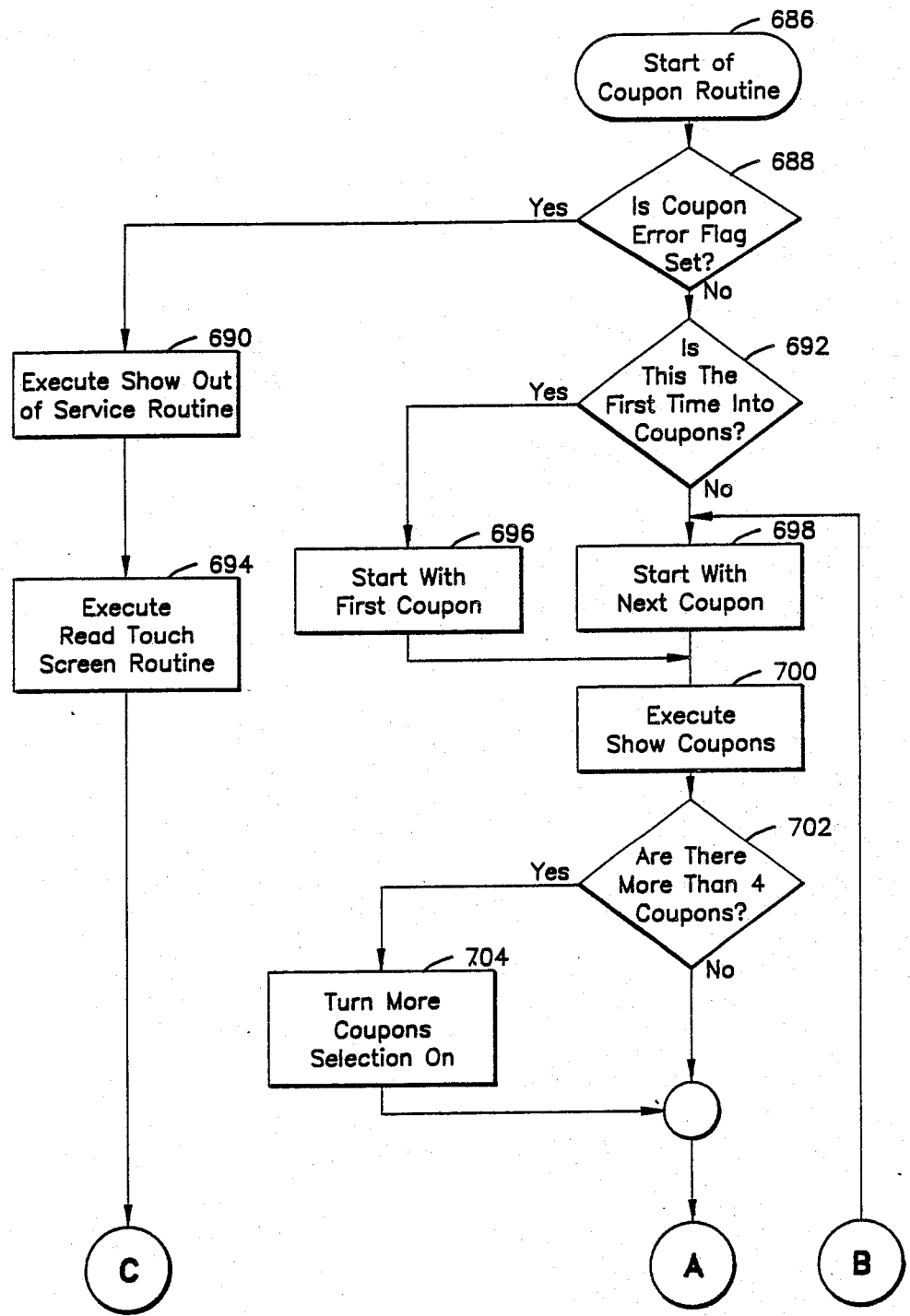
FIG. 31A and 31B combined are a flow chart describing the coupon routine.
Figure 31B:
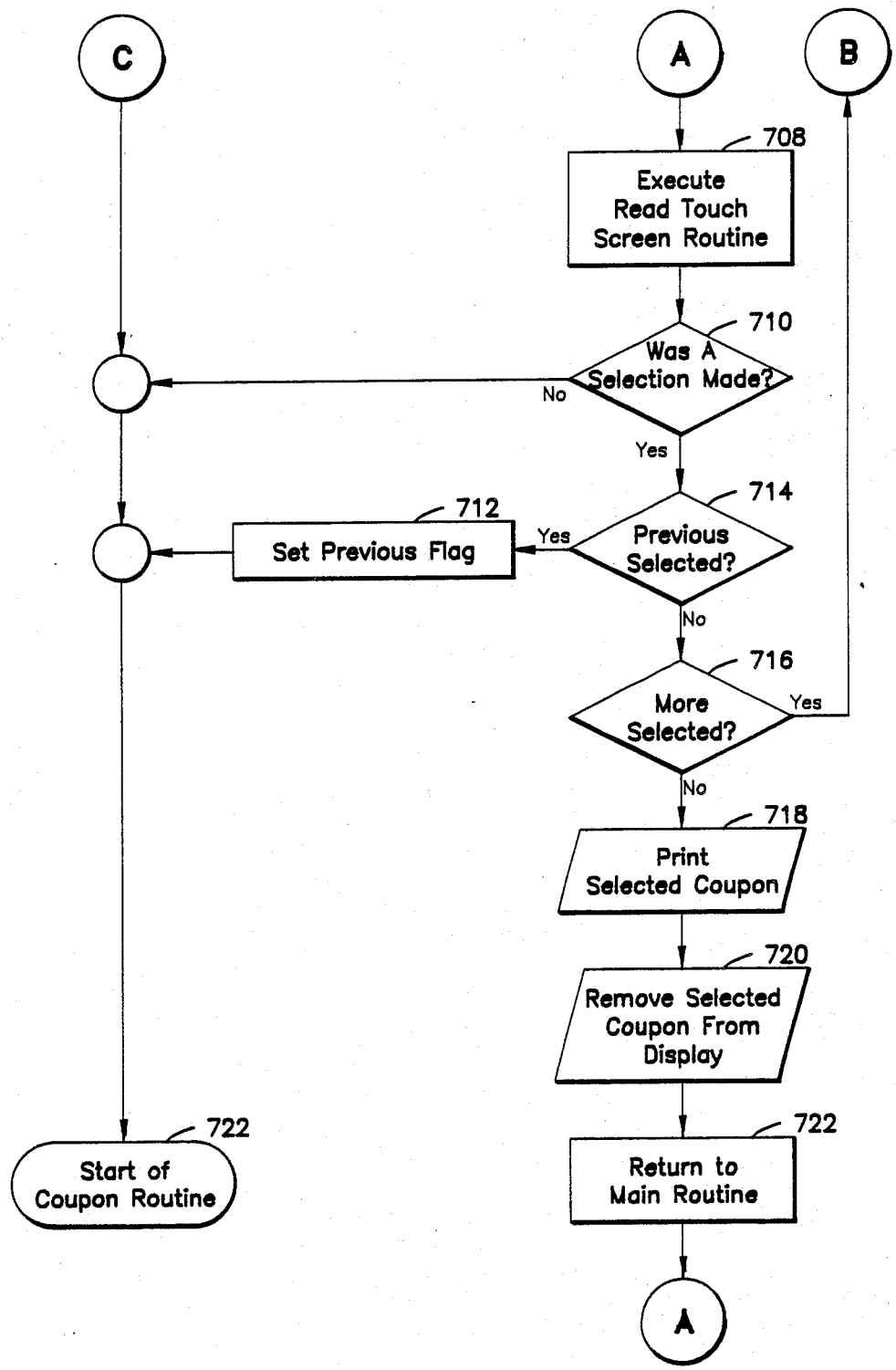

FIG. 31A and 31B combined are a flow chart describing the functions of the coupon routine. The coupon routine starts (686) when executed by the promotion network program as described in FIG. 7 (76). The coupon error flag is examined (688) to determine if an error occurred during the coupon set-up routine. If the coupon error flag is set (688), then the show routine is executed to display the "out-of-service" picture on the monitor 14 (690). The read touch screen routine is executed to provide a timer function (694) and the coupon routine terminates (722). If no error occurred during the coupon set-up routine (688), then a flag is examined (692) to determine if the display should begin with the first coupon (696). In all other cases, the display begins with the next sequential coupon (698). The show routine is executed to display the next 4 coupons in the list on the monitor 14 (700). If more than 4 coupons remain in the list (702), then a "more" indicator is displayed on the monitor 14 to signal that additional coupons may be displayed. The read touch screen routine is executed to await user input (708). Upon return from the read touch screen routine, it first must be determined whether the user entered a selection or if the timer expired (710). If the timer expired (710), then the coupon routine terminates (722). Otherwise, the user input is examined to see if the "previous" command is selected (714). If the "previous" command is selected (714), then the "previous" flag is set (712) and the coupons routine terminates (722). If the user input was the "more" command (716), then the coupon pointer is incremented to the next entry in the coupon list (698) and the next 4 coupons are displayed on the monitor 14 (700). In all other cases, it is assumed that the customer selected a particular coupon and the coupon is sent to the printer 32 (718). The selected coupon is removed from the display on the monitor 14 (720) and control transfers to await additional user input (706).

Figure 32:
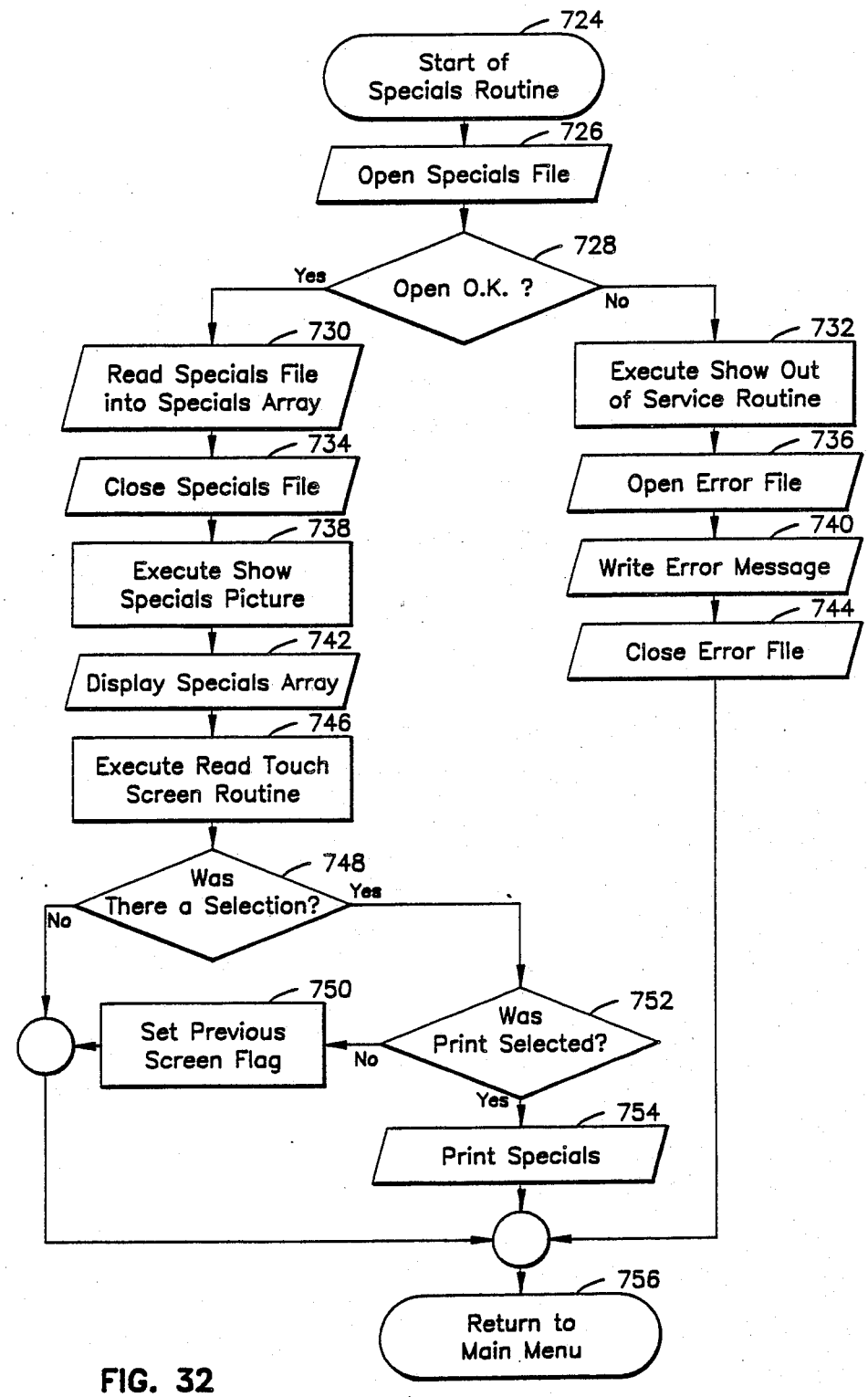
FIG. 32 is a flow chart describing the specials routine.
Figure 45:
FIG. 45 is a block diagram describing the specials file.

FIG. 32 is a flow chart describing the functions of the specials routine. The specials routine starts (724) when it is executed by the promotion network program as described in FIG. 7 (76). The specials routine attempts an open operation against the specials file (726). The structure of the specials file is described in FIG. 45. If the open operation fails (728), then the show routine displays the "out-of-service" picture on the monitor 14 (732). A message is written to the error file (736, 740, and 744) and the specials routine terminates (756). If the specials file opens correctly (728), then the specials text 1018 is read into memory 12 (730) and the file is closed (734). The show routine displays the "specials" picture on the monitor 14 (738). This picture is filled in by the specials text 1018 stored in memory 12 (742). The read touch screen routine is executed to await user input (746). If the timer expires (748), then the specials routine terminates (756). If user input is accepted (748), then the input is examined for a "print" command (752). If the "print" command is not entered (752), then the "previous" flag is set (750) and the specials routine terminates (756). If the "print" command is entered by the customer (752), the specials text 1018 is sent to the printer 32 (754), and the specials routine terminates (756).

Figure 33:
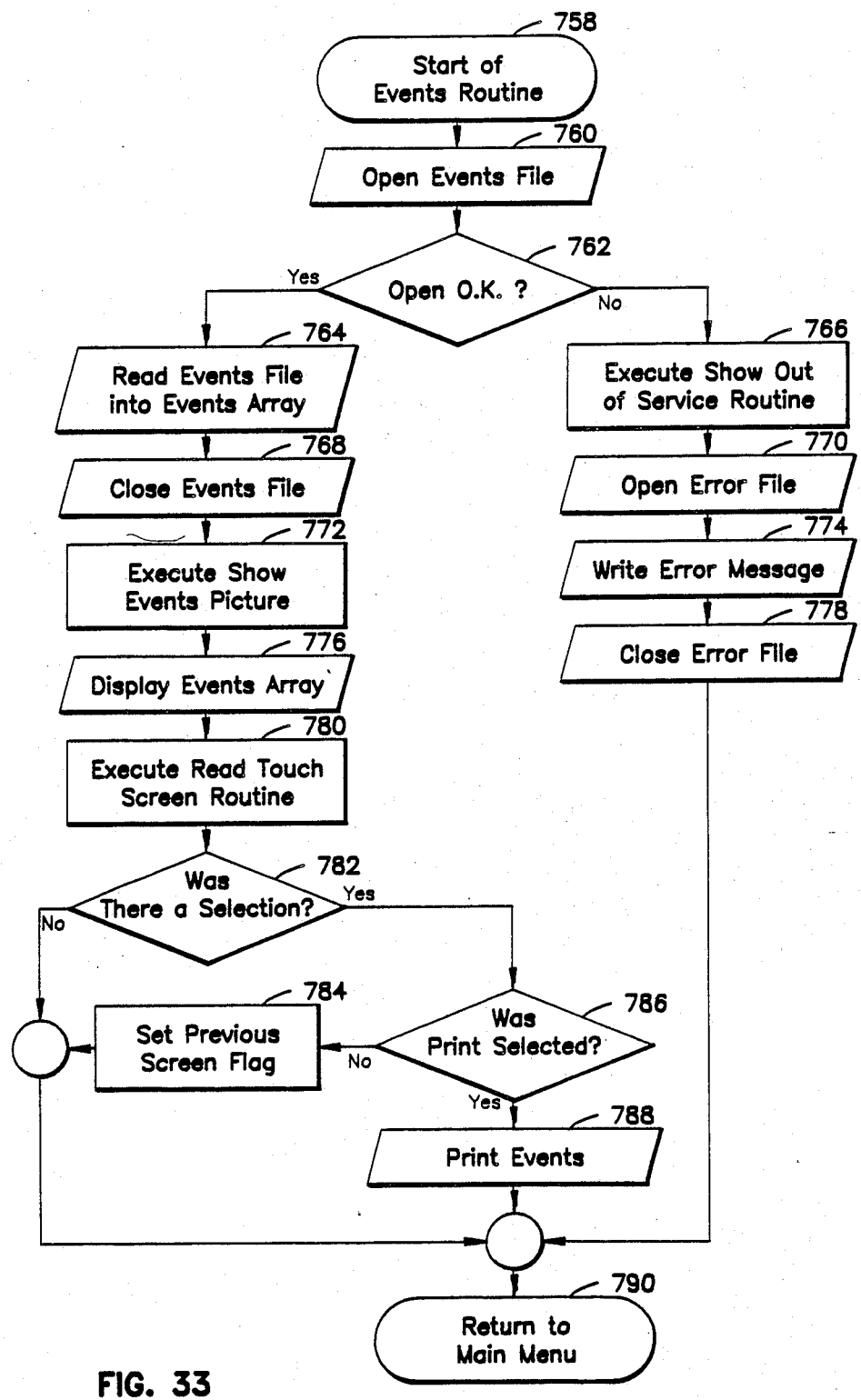
FIG. 33 is a flow chart describing the events routine.
Figure 44:
FIG. 44 is a block diagram describing the events file.

FIG. 33 is a flow chart describing the functions of the events routine. The events routine starts (758), when it is executed by the promotion network program as described in FIG. 7 (76). An open operation occurs against the events file (760). The structure of the events file is described in FIG. 44. If the open operation fails (762), the show routine displays the "out-of-service" picture on the monitor 14 (766). A message is written to the error file (770, 774, and 778) and the events routine terminates (790). If the open operations succeeds (762), the events text 1016 is read into memory 12 (764) and the events file is closed (768). The show routine displays the "events" picture on the monitor 14 (772). The events text 1016 stored in memory 12 fills out the "events" picture (776). The read touch screen routine is executed to await user input (780). Upon completion, the information returned from the read touch screen routine is examined to determine if user input was accepted or if the timer expired (782). If the timer expired (782), then the events routine terminates (790). If user input is accepted (782), then the user input is examined to see if a "print" command was entered (786). If a "print" command was entered (786), the events text 1016 is sent to the printer 32 (788), and the events routine terminates (790). If the "print" command was not entered (786), the "previous" flag is set (784), and the events routine terminates (790).

Figure 34:
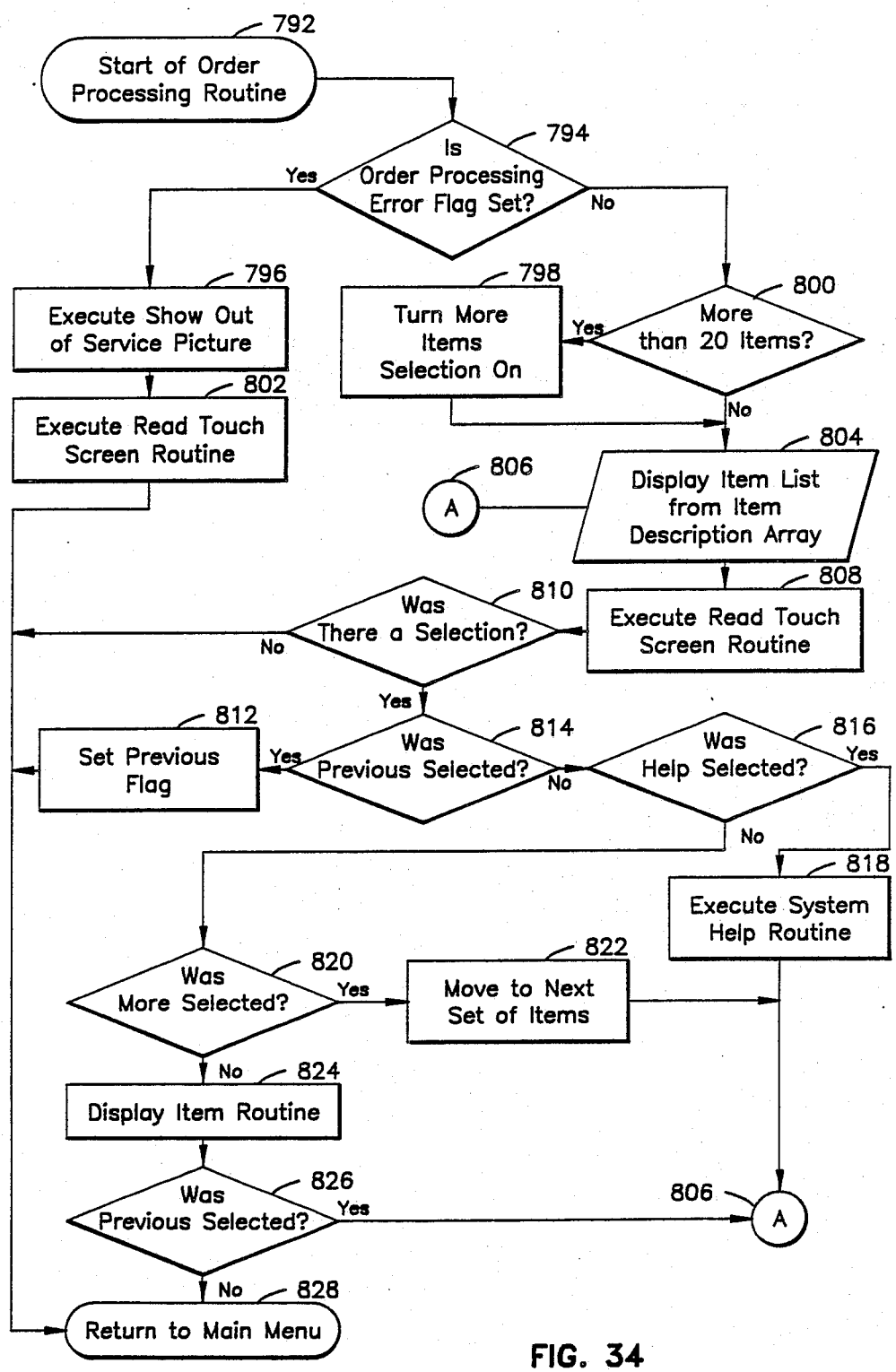
FIG. 34 is a flow chart describing the order processing routine.
Figure 47:
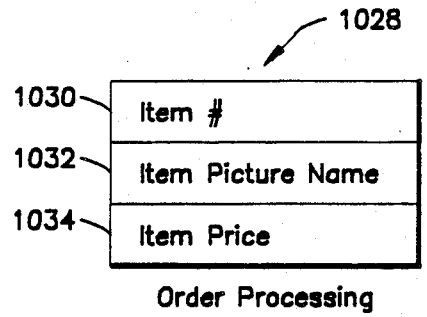
FIG. 47 is a block diagram describing the order processing file.

FIG. 34 is a flow chart describing the functions of the order processing routine. The order processing routine starts (792) when executed by the promotion network program routine as described in FIG. 7 (76). First, the order processing error flag is examined (790) to determine if an error occurred during the order processing set-up routine described in FIG. 15. If an error occurred (794), the show routine displays the "out-of-service" screen (796) on the monitor 14. The read touch screen routine is executed as a timer (802) and the order processing routine terminates (828). If no errors occurred during the order processing set-up (794), then the item list described in FIG. 47 is displayed on the monitor 14. A check is made to determine if there are more than 20 items in the item list (800) which is the maximum number of items that can be displayed at one time. If more than 20 items are in the list (800), then a "more" indicator is displayed on the monitor 14 (798). The item list in memory 12 is displayed on the monitor 14 (804). The read touch screen routine is executed to await user input (808). The value returned from read touch screen routine is examined to determine if user input was accepted or if the timer expired (810). If the timer expired (810), then the order processing routine terminates (828). If user input was accepted (810), then the input is examined for commands. If the "previous" command is entered (814), then the "previous" flag is set (812) and the order processing routine terminates (828). If the "help" command is entered (816), the help routine is executed (818), following which the item list is re-displayed on the monitor 14 (806). If the "more" command is entered (820), then the next 20 items are selected (822), and the item list is re-displayed on a monitor 14 (806). In all other cases, it is assumed that the customer selected a particular item (820), and the display item routine is executed (824). Upon return from the display item routine the last user input is examined to determine if the "previous" command is entered (826). If the "previous" command was entered (826), then the item list is re-displayed on the monitor 14 (806). In all other cases, upon return from the display item routine, the order processing routine terminates (828).

Figure 35A:
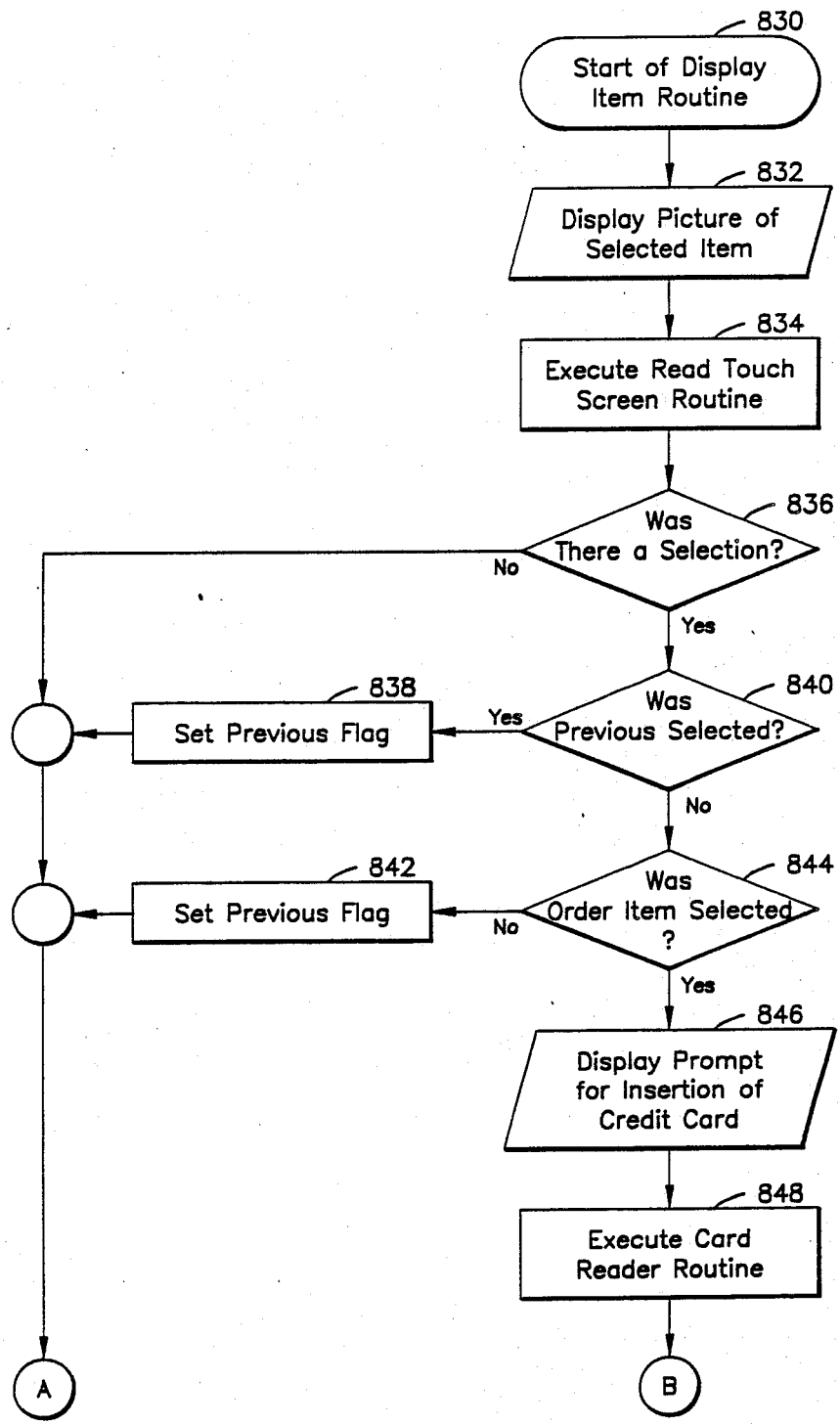
FIG. 35A and 35B combined are a flow chart describing the display item routine.
Figure 35B:
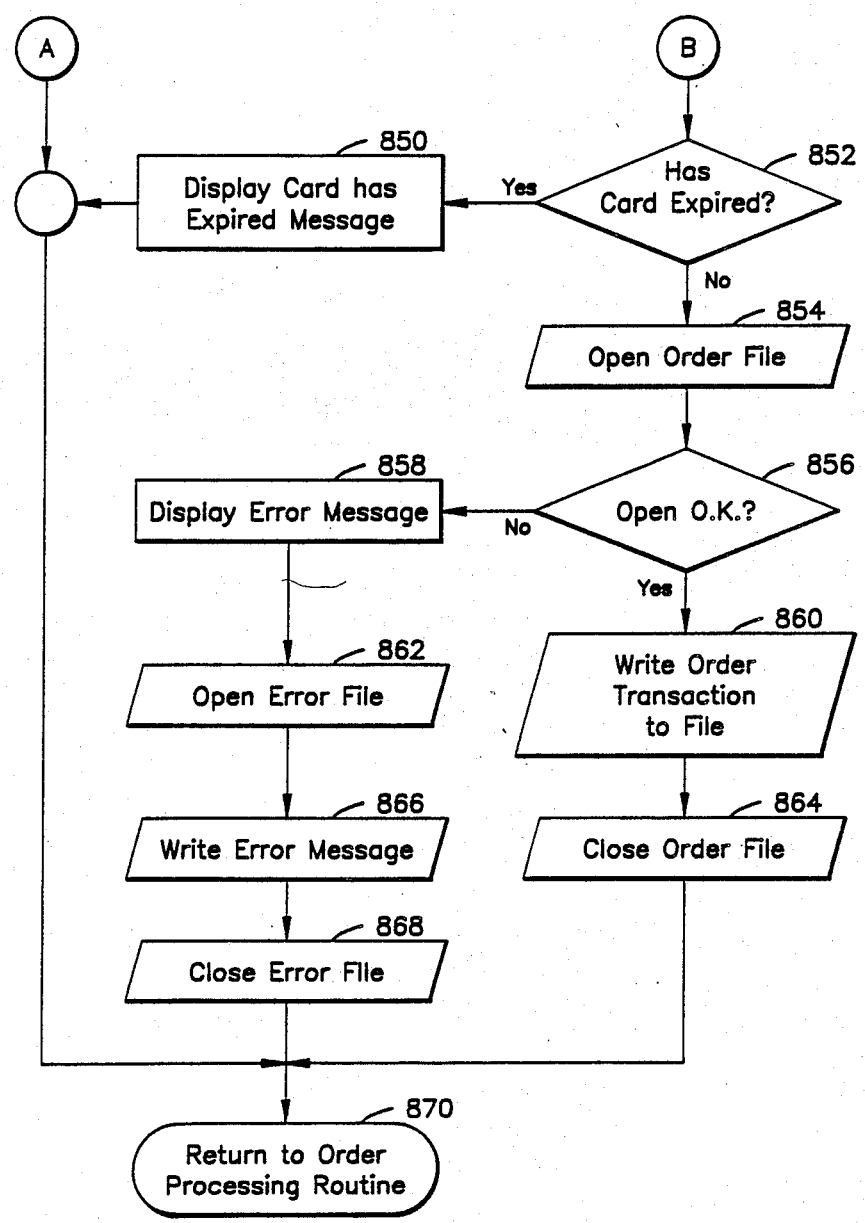
Figure 43:
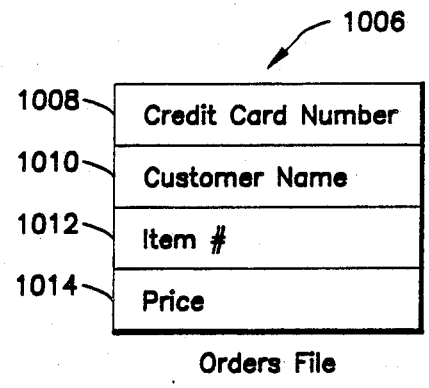
FIG. 43 is a block diagram describing the orders file.

FIGS. 35A and 35B combined are a flow chart describing the functions of the display item routine. The display item routine starts (830) when executed by the order processing routine as described in FIG. 34 (824). Passed as a parameter to this routine is the item picture name 1032, as described in FIG. 47, for the item selected by the customer. The item picture is displayed on the monitor 14 (832). The read touch screen touch routine is executed to await user input (834). Upon completion of the read touch screen routine, it must be determined whether the customer entered a selection or whether the timer expired (836). If the timer expired (836), then the display item routine terminates (870). If the customer entered a command, then the type of command must be determined. If the "previous" command is entered (840), the "previous" flag is set and the display item routine terminates (870). In all other cases, it is assumed that the customer selected an item to order (844). A message is displayed on the monitor 14 asking for insertion into the card reader 24 of the customer's credit card (846). The card reader routine is then executed (848). The card expiration date must first be examined (852). If the card has expired (852), the appropriate message is displayed on the monitor 14 (850). If the card is valid (852), the order transaction is written to the order file (854, 860 and 864), and the display item routine terminates (870). The structure of the order file is described in FIG. 43. Each order file record 1006 includes the credit card number 1008, the customer name 1010, the item number 1012, and the item price 1014. If an error occurs during the order file processing (856), an appropriate message is displayed on the monitor 14 (858) and a message is written to the error file (862, 866, and 868).

Figure 36:
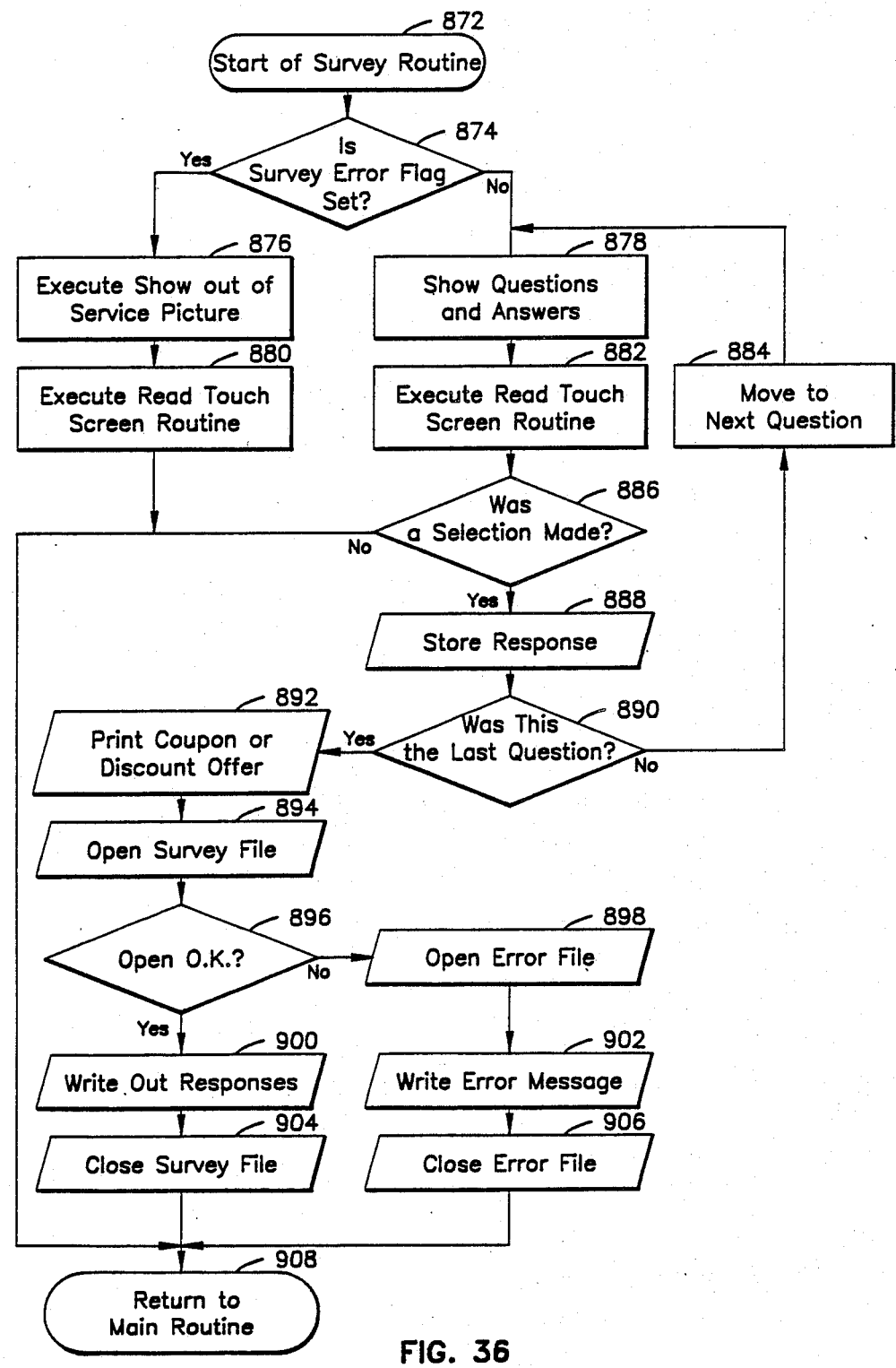
FIG. 36 is a flow chart describing the survey routine.

FIG. 36 is a flow chart describing the functions of the survey routine. The survey routine starts (872) when executed by the promotion network program as described in FIG. 7 (76). The survey error flag is examined (874), to determine if an error occurred during the survey set-up routine. If the survey error flag is set (874), then the show routine displays the "out-of-service" picture (876) on the monitor 14. The read touch screen routine is executed to provide a timer (880) and the survey routine terminates (908). If there were no errors during the survey set-up routine (874), then a loop is entered to display the survey questions. The show routine displays the question and its multiple-choice answers on the monitor 14 (878). The read touch screen routine is executed to await user input (882). Upon completion, it must be determined whether the customer entered a response or whether the timer expired (886). If the timer expired (886), then the survey routine terminates (908). If a response was entered (886), then that response is stored in memory 12 (888). The question is examined to determine if it is the last question in the list (890). If it is not the last question, then the next question is selected (884), and the show routine displays the question and its multiple-choice answers on the monitor 14 (878). When the last question is answered (890), a coupon or other discount offer is sent to the printer 32 (892). The responses are written to the survey log file (894, 900, and 904), and the survey routine terminates (908). If an error occurs while processing the survey file (896), a message is written to the error file (898, 902, and 906).

Figure 42:
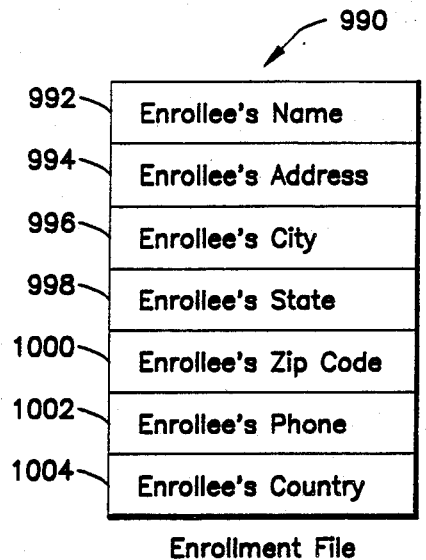
FIG. 42 is a block diagram describing the enrollment file.

FIG. 36 is a flow chart describing the functions of the enrollment routine. The enrollment routine starts (910) when executed by the promotion network program as described in FIG. 7 (80). Initially, the enrollment routine examines the enrollment error flag to determine if an error occurred during a prior attempted enrollment file operation (912). If the enrollment error flag is set (912), the show routine displays the "out-of-service" picture on the monitor 14 (914). The read touch screen routine is executed to provide a timer function (918) and the enrollment routine terminates (938). If there have been no prior enrollment file errors (912), an enrollment instruction screen is displayed on the monitor 14 (916). The participant information is accepted from the customer (920) by means of any of the input devices such as the card reader 24, the touch screen 28, or the keyboard 30 (922). The structure of the enrollment file is described in FIG. 42. Each record 990 in the enrollment file includes the enrollee's name 992, address 994, city 996, state 998, zip code 1000, phone 1002, and country 1004. The participant information is written to the enrollment file (824, 928, and 932) and the enrollment routine terminates (938). If an error occurs during the enrollment file processing (926), then a message is written to the error file (930, 934, and 936).

Figure 37:
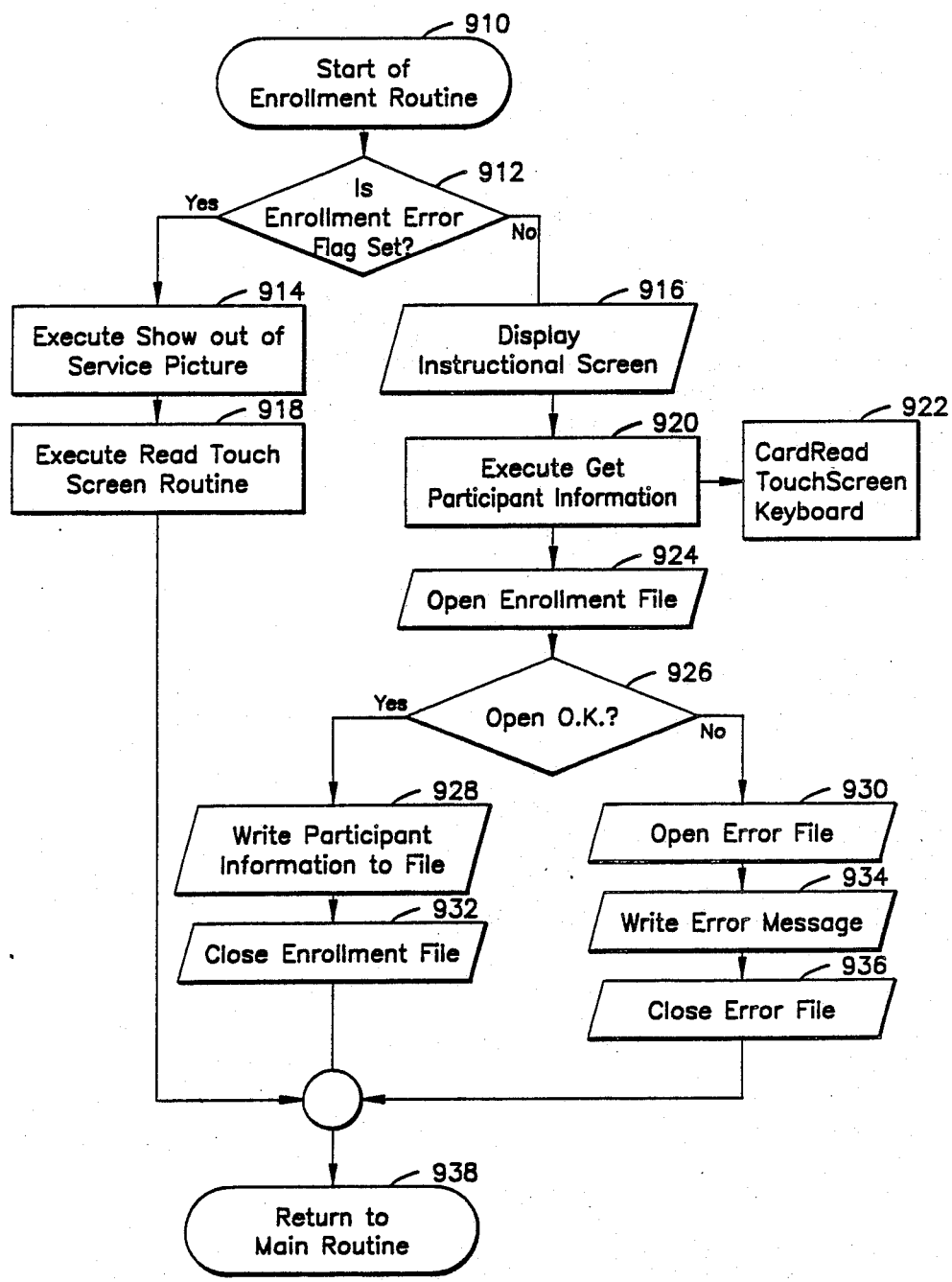
FIG. 37 is a flow chart describing the enrollment routine.
Figure 38:
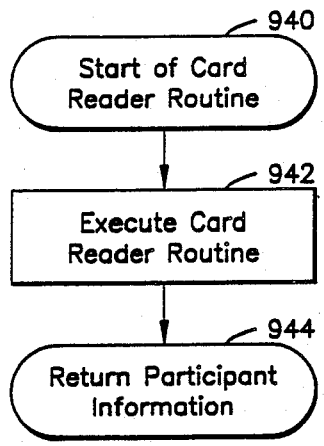
FIG. 38 is a flow chart describing the enrollment card reader routine.

FIG. 38 is a flow chart describing the functions of the enrollment card reader routine. The enrollment card reader routine starts (940) when executed by the enrollment routine as described in FIG. 37 (922). The card reader routine is executed (942) and the participant information read therefrom is returned to the enrollment routine (944).

Figure 39:
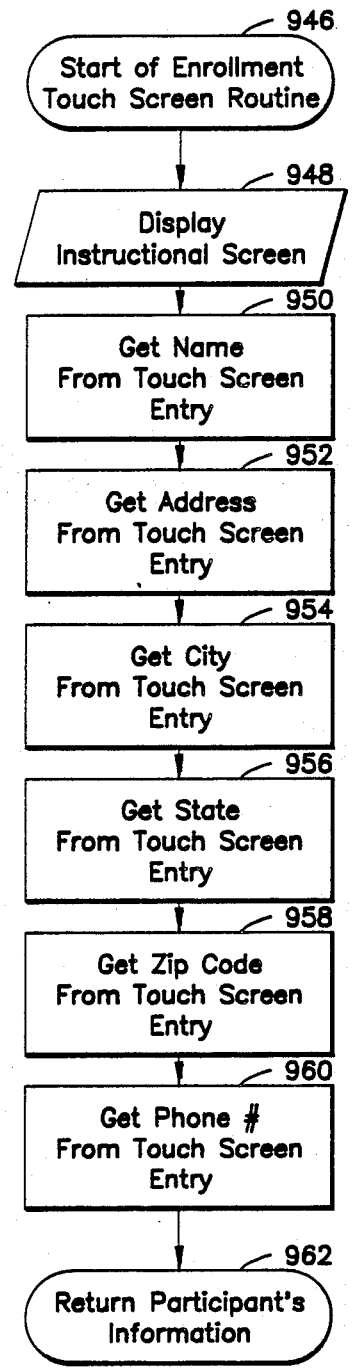
FIG. 39 is a flow chart describing the enrollment touch screen routine.

FIG. 39 is a flow chart describing the functions of the enrollment touch screen routine. The enrollment touch screen routine starts (946) when executed by the enrollment routine as described in FIG. 37 (922). An instructional screen for the customer is first displayed on the monitor 14 (948). The read touch screen routine is executed to accept the customers name (950), address (952), city (954), state (956), zip code (958), and phone number (960). This participant information is then returned to the enrollment routine (962).

Figure 40:
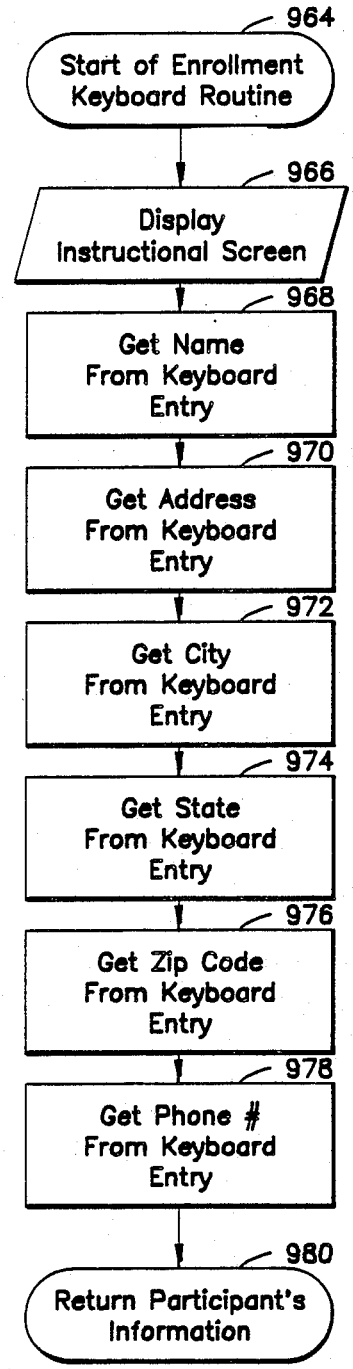
FIG. 40 is a flow chart describing the enrollment keyboard routine.

FIG. 40 is a flow chart describing the functions of the enrollment keyboard routine. The enrollment keyboard routine starts (964) when executed by the enrollment routine as described in FIG. 37 (922). An instructional screen is displayed on the monitor 14 (966). The keyboard entry routine described in FIG. 25 is executed to accept the customer name (968), address (970), city (972), state (974), zip code (976), and phone number (978). This participant information is then returned to the enrollment routine (980).

Figure 41:
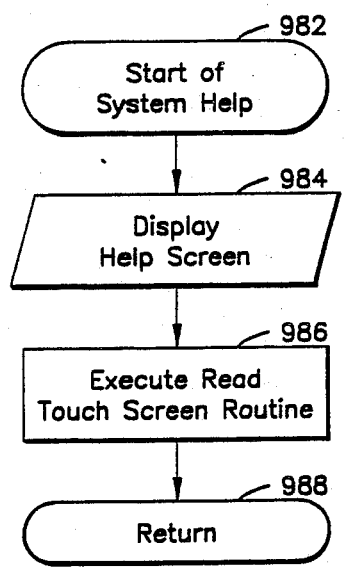
FIG. 41 is a flow chart describing the system help routine.

FIG. 41 is a flow chart describing the functions of the system help routine. The system help routine starts (982) when executed by the promotion network program as described in FIG. 7 (80), the product locator routine as described in FIG. 27 (578), the list products routine as described in FIGS. 28A and 28B (610), the store located routine as described in FIG. 29 (638), and the display stores routine as described in FIGS. 30A and 30B (670). A help screen is displayed on the monitor 14 (984) and the read touch screen routine is executed to await user input or the expiration of the timer (986). Upon completion of the read touch screen routine the system help routine terminates (988).

FIG. 59 has a flow chart describing the functions of the frequent shopper set-up routine. The frequent shopper set-up routine starts (1196) when executed by the set-up routine as described in FIG. 8 (103). The frequent shopper error flag is initialized (1198) and the frequent shopper prize file is opened (1200). The frequent shopper prize file is described in FIG. 58. If the open operation fails (1202), then the frequent shopper prize error flag is set (1204), a message is written to the error file (1208, 1212, and 1218), and the frequent shopper set-up routine terminates (1224). If the frequent shopper prize file opens correctly (1202), then a loop is entered whereby the records 1184 from the frequent shopper prize file are read into the memory 12. The first record 1184 read from the frequent shopper prize file contains the official time 1186 required between visits (1206). An official time 1186 would require, for example, at least one day between visits for a user to qualify as a "frequent shopper". The remaining records 1184 in the frequent shopper prize file describe the prize 1188 (1210) and the number of visits 1190 required before the prize 1188 can be won (1222). The records 1184 are read (1216) until an end-of-file indication occurs (1214). When the end-of-file is indicated, the frequent shopper prize file is closed (1220), and the frequent shopper set-up routine terminates (1224).

FIG. 60 is a flow chart describing the functions of the counts set-up routine. The counts set-up routine starts (1226) when executed by the set-up routine described in FIG. 8 (104). First, the counts file is opened (1228). The structure of the counts file is described in FIG. 56. If the open operation fails (1230), then a message is written to the error file (1232, 1236, and 1240) and the counts set-up routine terminates (1248). If the counts file opens correctly (1230), then a loop is entered whereby the count records 1166 are read into the memory 12. Each record read may be a count title 1168 (1234) or the number of counts 1170 (1246). When an end-of-file indication occurs (1238), the count file is closed (1242) and the counts set-up routine terminates (1248).

Figure 61:
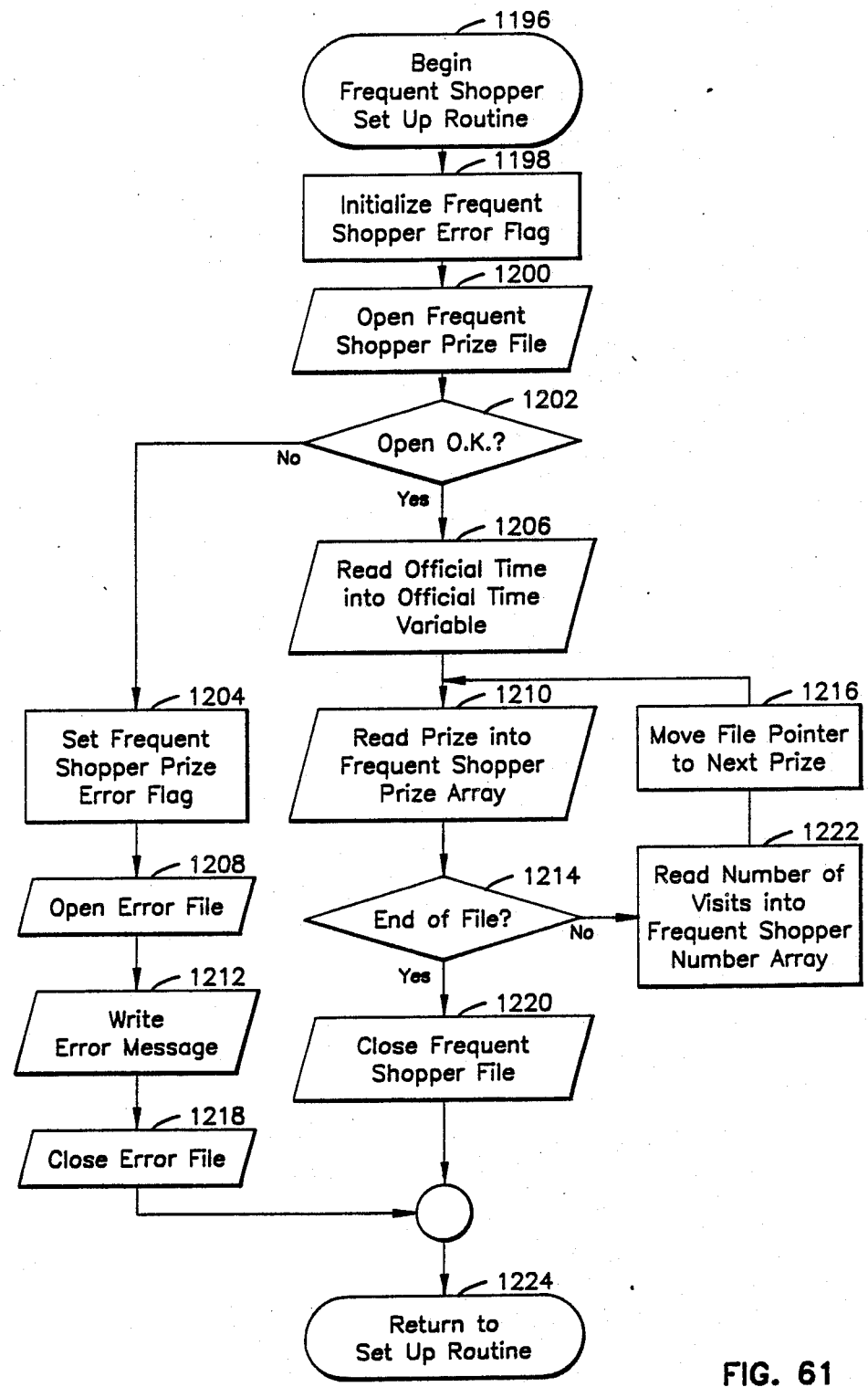
FIG. 61 is a flow chart describing the frequent shopper set-up routine.

FIG. 61 is a flow chart describing the functions of the frequent shopper routine. The frequent shopper routine starts (1250) when executed by the promotion network program described in FIG. 7 (80). If the frequent shopper flag is set (1252), then the show routine is executed to display the "out-of-service" picture (1270), a message is written to the error file (1274, 1280, and 1286), and the frequent shopper routine terminates (1294). If the frequent shopper flag is not set (1252), then the show routine is executed to display the frequent shopper instruction screen on the monitor 14 (1254). The shopper ID is requested (1258), which the user may enter by means of the magnetic stripe card reader 24, bar code reader 26, touchscreen 28, or keyboard 30 (1256). If a device error occurs during the user input (1260), then the show routine is executed to display the "out-of-service" screen on the monitor 14 (1270), a message is written to the error file (1274, 1280, and 1286), and the frequent shopper routine terminates (1294). If no error occurs on the user input (1260), then the read frequent shopper file routine is executed to determine the customer status (1262). If an error occurs (1266), then the show routine is executed to display the "out-of-service" screen on the monitor (1270), a message is written to the error file (1274, 1280, and 1286), and the frequent shopper routine terminates (1294). If there is no error (1266), and the user has returned before the official time 1186 has elapsed, then the frequent shopper status of the user is displayed on the monitor 14 (1282) and sent to the printer 32 (1288). The write frequent shopper file routine is executed (1292) and the frequent shopper routine terminates (1294). If the official time 1186 required between visits has elapsed (1264), then the number of visits is incremented (1268), and the check prize level routine is executed (1272). If a new prize level has not been reached (1276), then the user's frequent shoppers status is displayed on the monitor 14 (1282) and sent to the printer 32 (1288). The write frequent shopper file routine is executed (1292), and the frequent shopper routine terminates (1294). If a new prize level has been reached (1276), then the prize level is incremented (1278). The show routine is executed to display the prize screen on the monitor 14 (1284) and the prize coupon is sent to the printer 32 (1290). The read frequent shopper file routine is executed (1292) and the frequent shopper routine terminates (1294).

Figure 62:
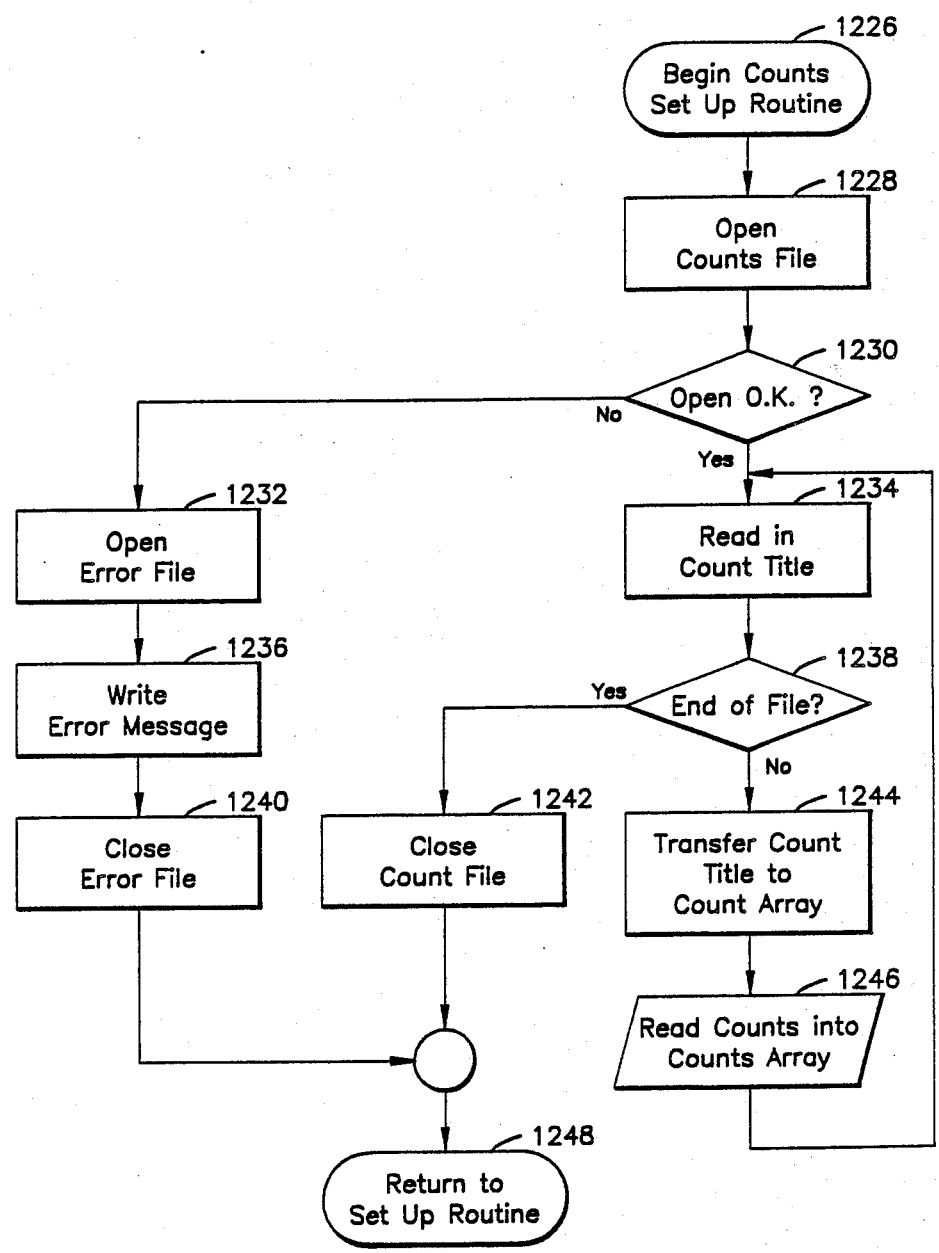
FIG. 62 is a flow chart describing the counts set-up routine.

FIG. 62 is a flow chart describing the functions of the read frequent shopper routine. The read frequent shopper file routine starts (1296) when executed by the frequent shopper routine described in FIG. 61 (1262). First, the frequent shopper file is opened. The structure of the shopper file is described in FIG. 57. Each record 1172 in the frequent shopper file contains the shopper ID 1174, the date of the last visit 1176, the time of the last visit 1178, the total number of visits 1180, and the last prize level 1182. If the frequent shopper file does not open correctly, (1300), the frequent shopper status is set to the file error (1310), and the read frequent shopper file routine terminates (1334). If the frequent shopper file opens correctly (1300), then a loop is entered whereby all records 1172 from the frequent shopper file are read until an end-of-file indication occurs (1306) or until the shopper ID 1174 matches the current user's ID (1308). If an end-of-file indication occurs (1306), the frequent shopper status is set to "first visit" (1314), and the frequent shopper is closed (1322). Because it is the user's "first visit" (1324), the read frequent shopper file routine terminates (1334). If a match is found between the user's entered ID and a shopper ID 1174 (1308), then the contents of the matching record 1172 are stored into the memory 12 (1312, 1316, 1318, and 1320), and the frequent shopper file is closed (1322). The number of visits 1180 is examined to determine if the value is greater than one (1324). If this is not the user's "first time" (1324), the system time is read (1326) and compared to the date 1176 and time 1178 of the last visit (1328). If this time interval is greater than the official time 1186 read from the frequent shopper prize file (1330), then the frequent shopper status is set to an "official visit" (1330), and the read frequent shopper file routine terminates (1334). If the time between visits does not exceed the official time 1186 read from the frequent shopper prize file (1330), then the frequent shopper status is set to "no visit" (1332), and the read frequent shopper file terminates (1334).

Figure 63A:
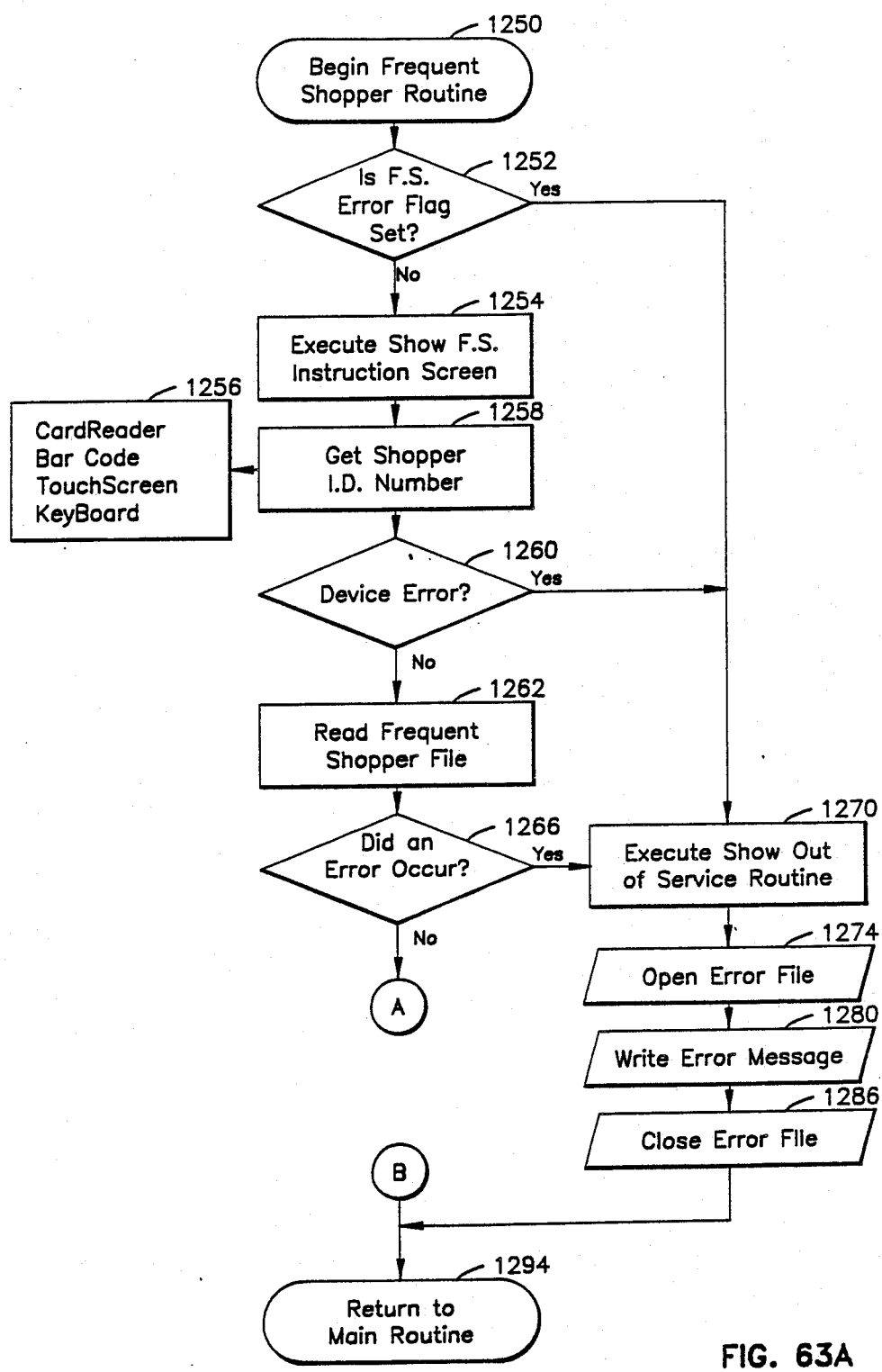
FIG. 63A and 63B combined are a flow chart describing the frequent shopper routine.
Figure 63B:
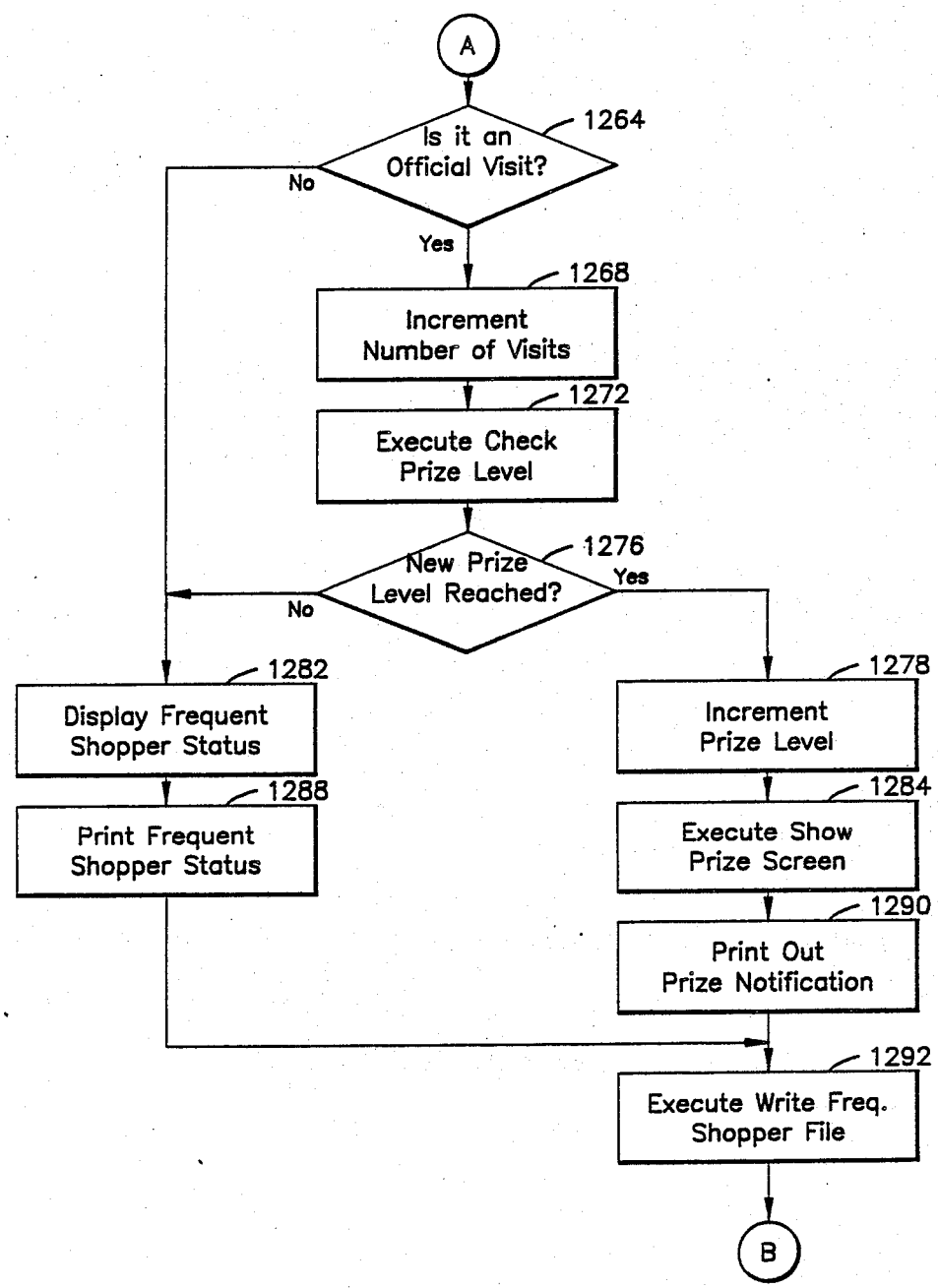

FIGS. 63A and 63B combined are a flow chart describing the functions of the check prize level. The check prize level routine starts (1336) when executed by the frequent shopper routine in FIG. 61 (1272). The check prize level routine compares the information contained in the record 1172 read from the frequent shopper file with the information contained in the record 1184 read from the frequent shopper prize file. A loop is entered whereby the last prize level 1182 of the frequent shopper record 1172 is used to determine the prize level 1188 or 1192 from the frequent shopper prize file. Beginning at the first prize level 1188 (1338), the prize level 1188 or 1192 is compared to the user's last prize level 1182 until the prize level 1188 or 1192 is less than the last prize level 1182 (1340). If the prize level 1188 or 1192 is greater than or equal to the last prize level 1182, then the next lower prize level in the frequent shopper prize file is examined (1342). When the last prize level 1182 is greater than the prize level from 1188 or 1192 (1340), then the number of visits 1190 or 1194 associated with a prize level 1188 or 1192 is compared to the user's number of visits 1180. If the user's number of visits 1180 is greater than or equal to the number of visits 1190 or 1194 (1344), then the user's frequent shopper status is set to "prize level" (1348) and the check prize level routine terminates (1350). If the user's number of visits 1180 is less than the number of visits 1190 and 1194 (1344), then the user's frequent shopper status is set to "no prize" (1346), and the check prize level routine terminates (1350).

Figure 64A:
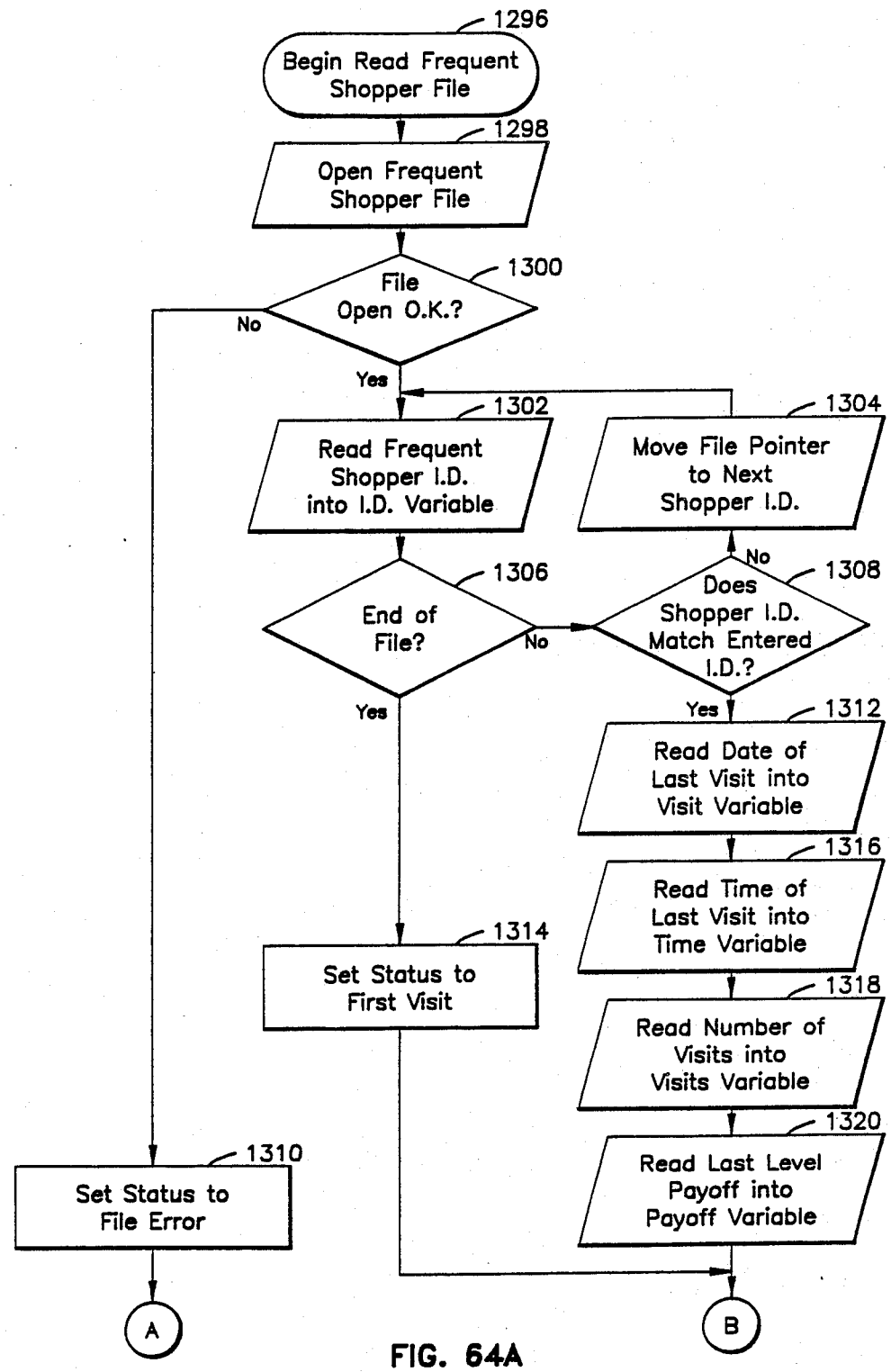
FIG. 64A and 64B is a flow chart describing the read frequent shopper file routine.
Figure 64B:
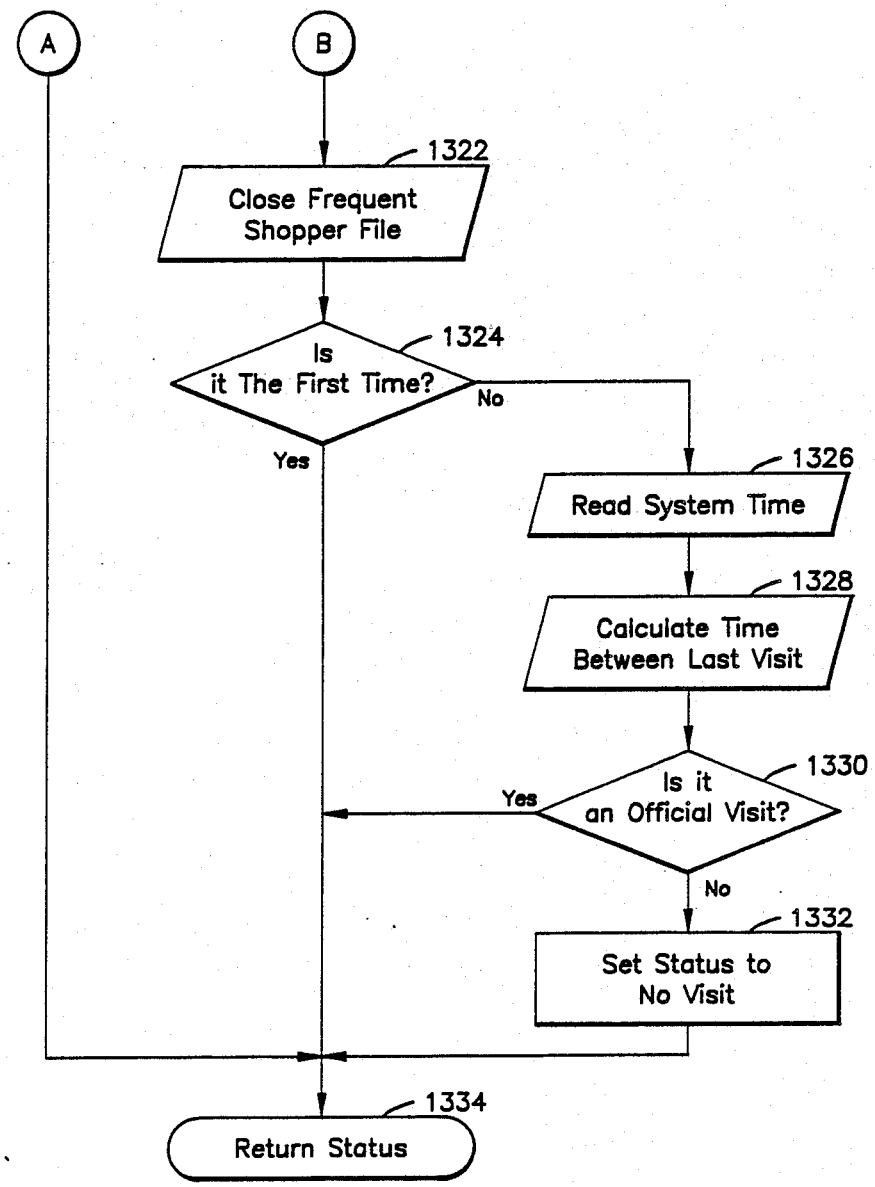
Figure 65:
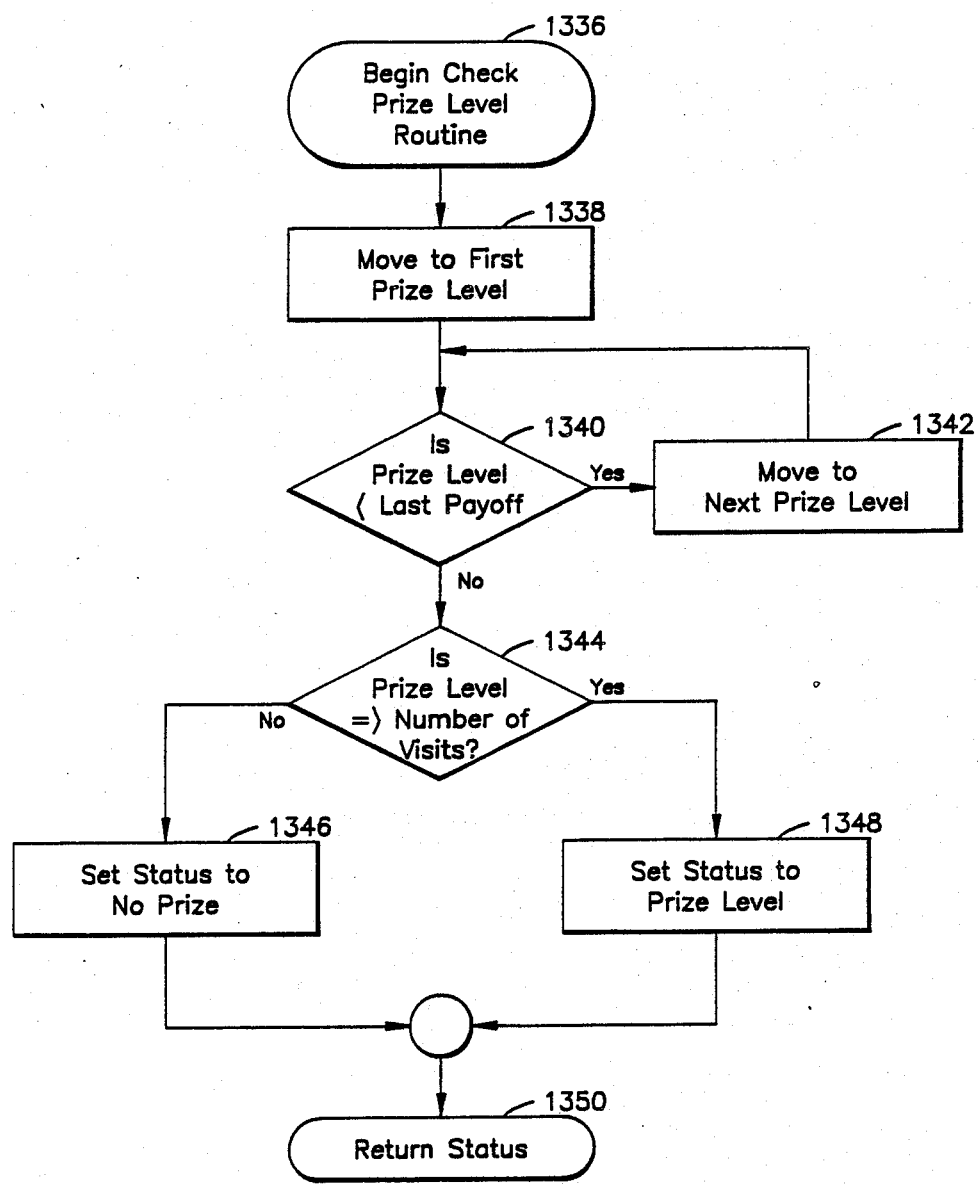
FIG. 65 is a flow chart describing the check prize level routine.
Figure 66:
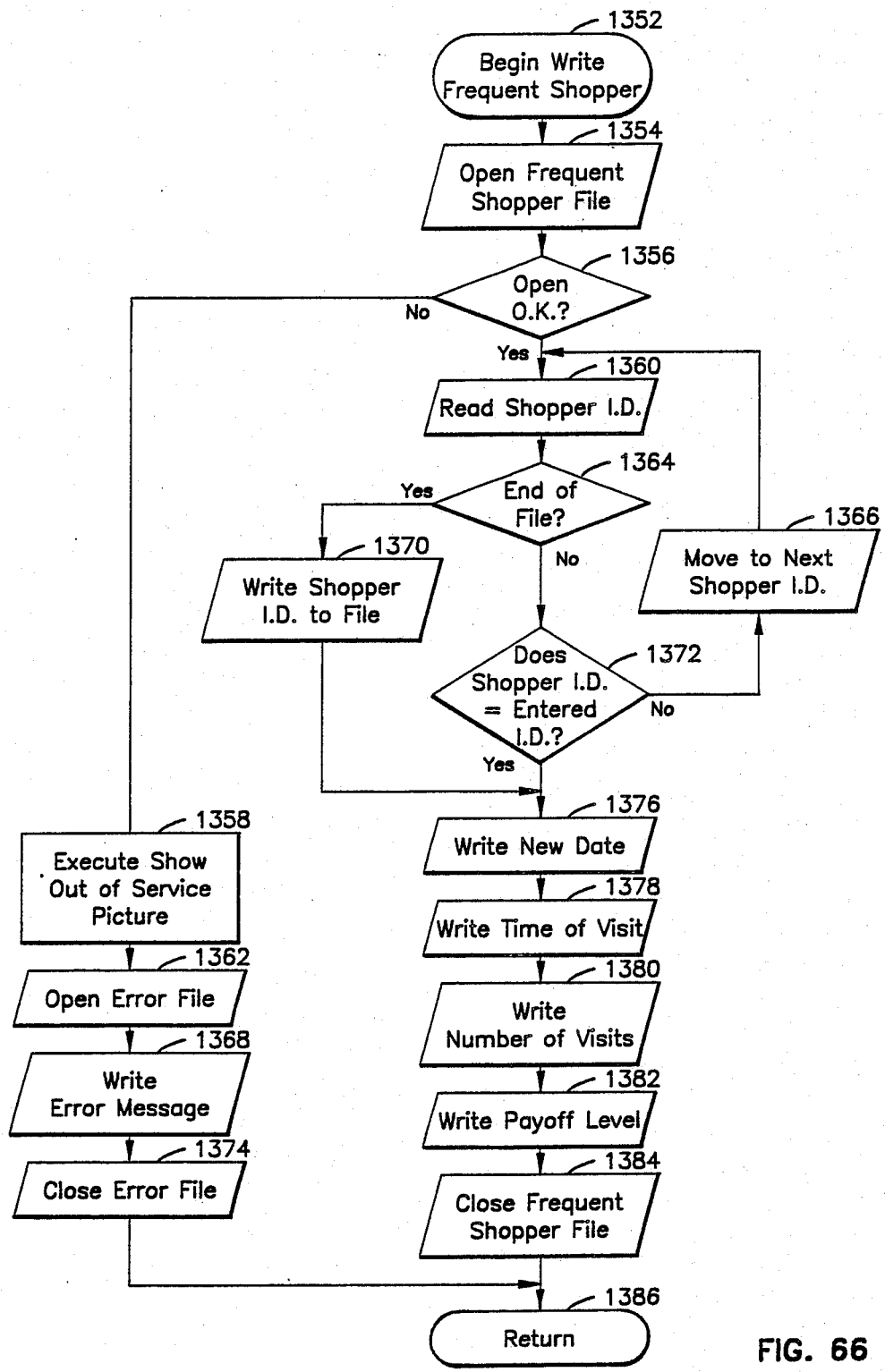
FIG. 66 is a flow chart describing the write frequent shopper file routine.

FIGS. 64A and 64B combined are a flow chart describing the functions of the write frequent shopper routine. The write frequent shopper file routine starts (1352) when executed by the frequent shopper routine in FIG. 61 (1292). First, the frequent shopper file is opened (1354). The structure of the frequent shopper file is described in FIG. 57. If the frequent shopper does not open correctly (1356), then the show routine is executed to display the "out-of-service" picture (1358), a message is written to the error file (1362, 1368, and 1374), and the write frequent shopper file routine terminates (1386). If the frequent shopper file opens correctly (1356), then a loop is entered whereby the records 1172 of the frequent shopper file are read (1360) until an end-of-file indication occurs (1364) or a shopper ID 1174 is found which matches the user's entered ID (1372). If an end-of-file indication occurs (1364), then the user's entered ID is written to the frequent shopper file (1370). Immediately following this new shopper ID 1174, or a matching shopper ID 1174 if found (1372), a new date 1176 (1376), time 1178 (1378), number of visits 1180 (1380), and last payoff level 1182 (1382), are written to the frequent shopper file. Then, the frequent shopper file is closed (1384), and the write frequent shopper file routine terminates (1386).

Figure 69:
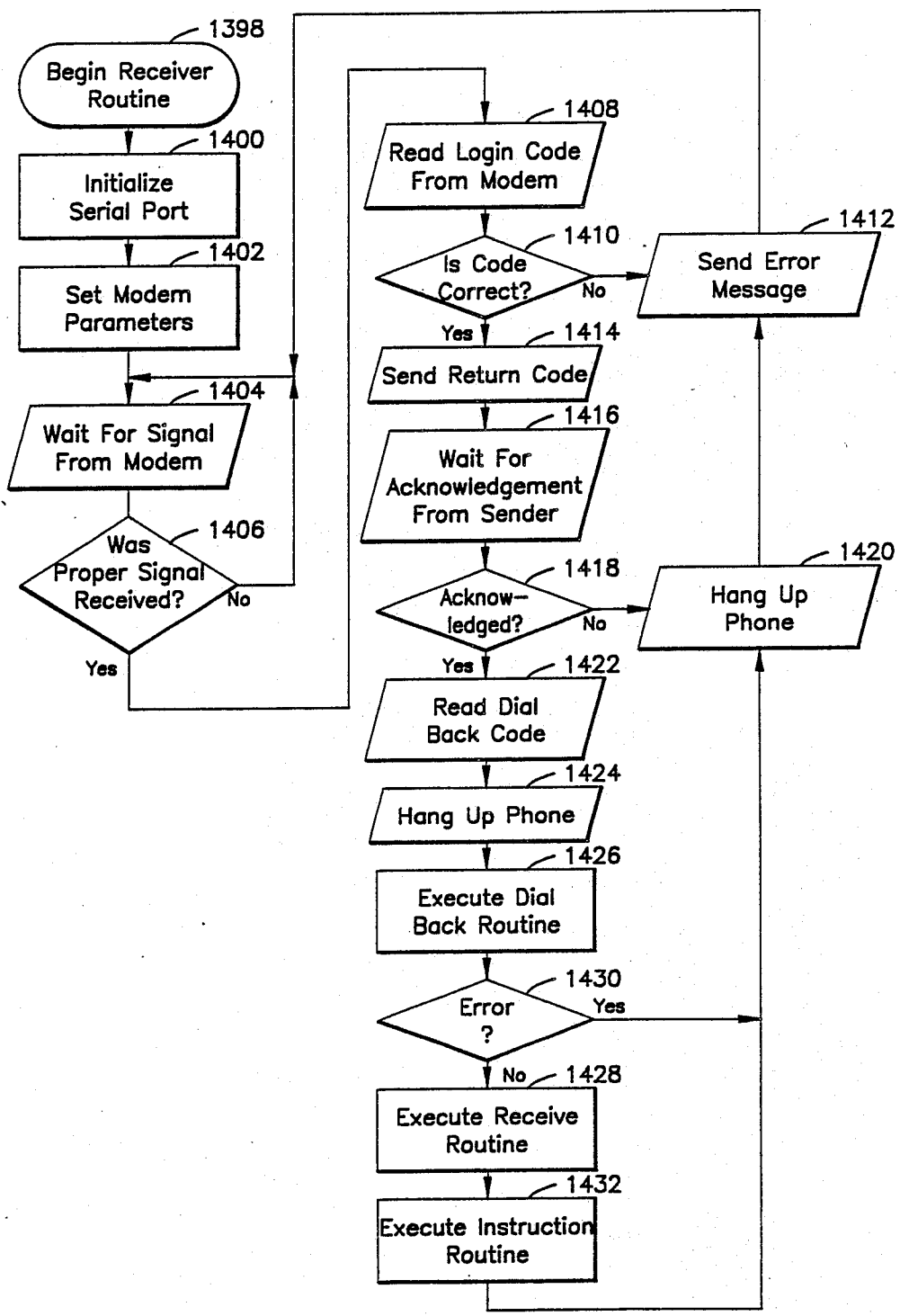
FIG. 69 is a flow chart describing the receiver routine.

FIG. 69 is a flow chart describing the functions of the receiver routine. The receiver routine starts (1398) when executed by the start-up sequence routine as described in FIG. 6 (61). The serial port is initialized (1400) and the modem parameters are set (1402). A loop is entered to await signals from the modem (1404). If the proper signal is not received (1406), then the loop returns to await further signals from the modem (1404). If the proper signal is received (1406), then the login code is read from the modem (1408). If the login code is incorrect (1410), an error message is returned to the caller (1412) and the loop returns to await further signals from the modem (1404). If the login code is correct (1410), a return code is sent to the caller (1414) and the receiver routine waits for an "acknowledgment" signal (1416). If there is no "acknowledgment" signal (1418), then the phone is hung up (1420) and the loop returns to await further signals from the modem (1404). If an "acknowledgment" signal is received (1418), then the dial back code is read (1422), the phone is hung up (1424), and the dial back routine is executed (1426). If an error is returned from the dial back routine (1430), then the loop returns to await further signals from the modem (1404). If there is no error from the dial back routine (1430), then the receive routine (1428) and the instruction routine (1432) are executed, after which the loop returns to await further signals from the modem (1404). Thus the receiver routine never terminates, until the computer 10 is turned off.

Figure 67:
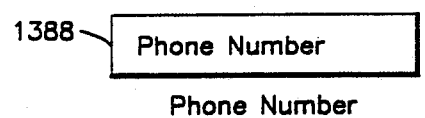
FIG. 67 is a block diagram describing the phone number file.
Figure 70:
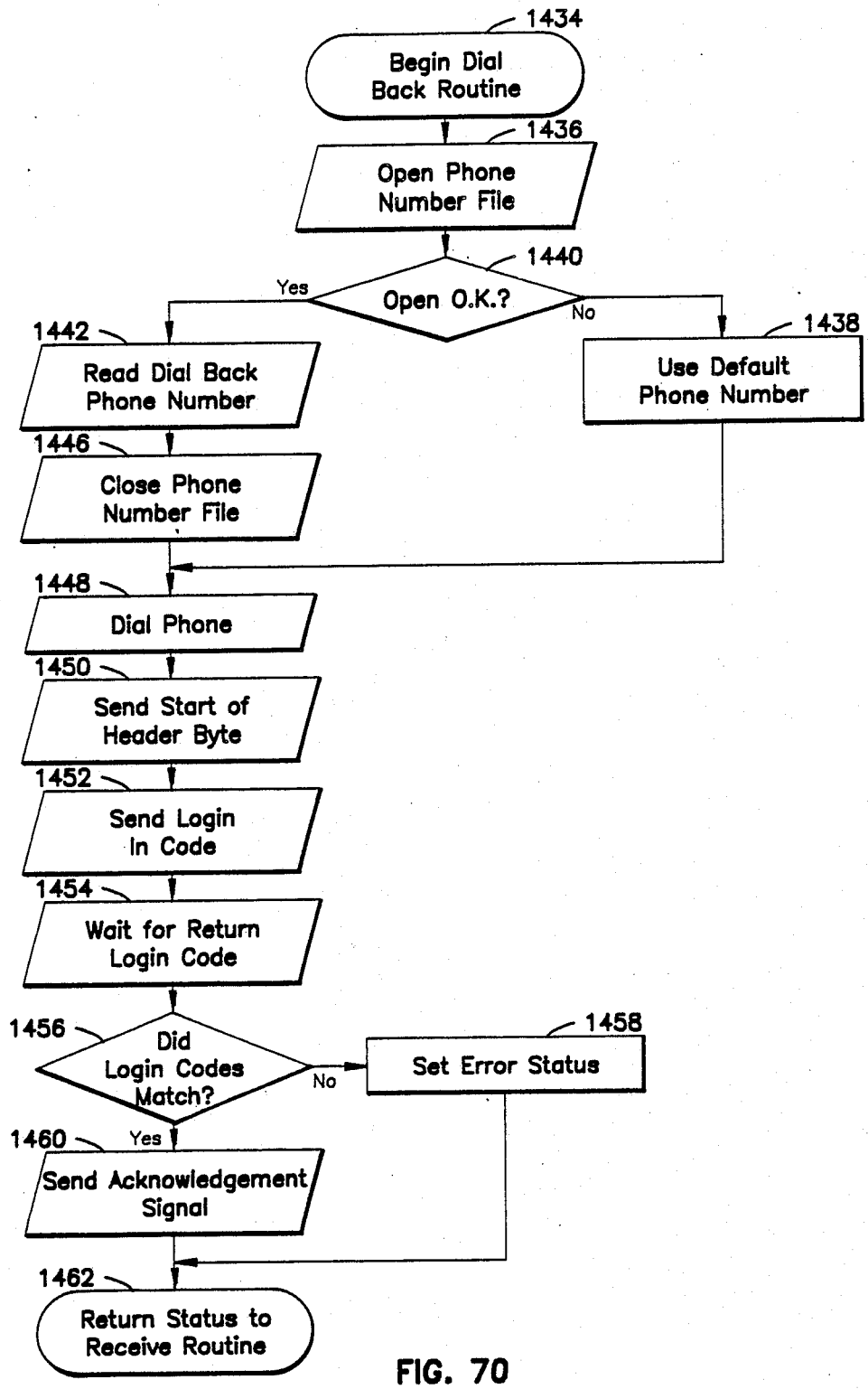
FIG. 70 is a flow chart describing the dial back routine.

FIG. 70 is a flow chart describing the functions of the dial back routine. The dial back routine starts (1434) when executed by the receiver routine as described in FIG. 69 (1426). First, the phone number file is opened (1436). The structure of the phone number file is described in FIG. 67. The phone number file contains a phone number 1388. If the phone number file does not open correctly (1440), then a default phone number is used by the dial back routine (1438). If the phone number file opens correctly (1440), then the dial back phone number 1388 is read from the phone number file (1442) and the phone number file is closed (1446). Regardless of which phone number is used, the dial back phone number is dialed (1448). When the communications link is established, the dial back routine sends the "start of header" byte (1450), login code (1452), and waits for the returning login code (1454). If the login codes do not match (1456), the error status is set (1458), and the dial back routine terminates (1462). If the login codes match (1456), an "acknowledgement" signal is sent (1460) and the dial back routine terminates (1462).

Figure 68:
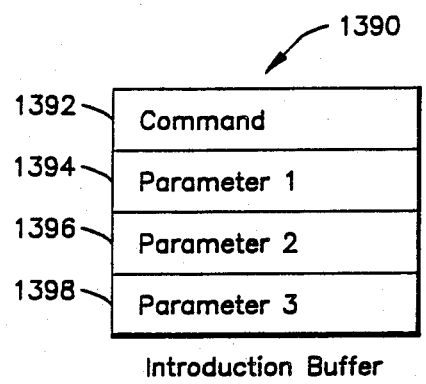
FIG. 68 is a block diagram describing the instruction buffer file.
Figure 71A:
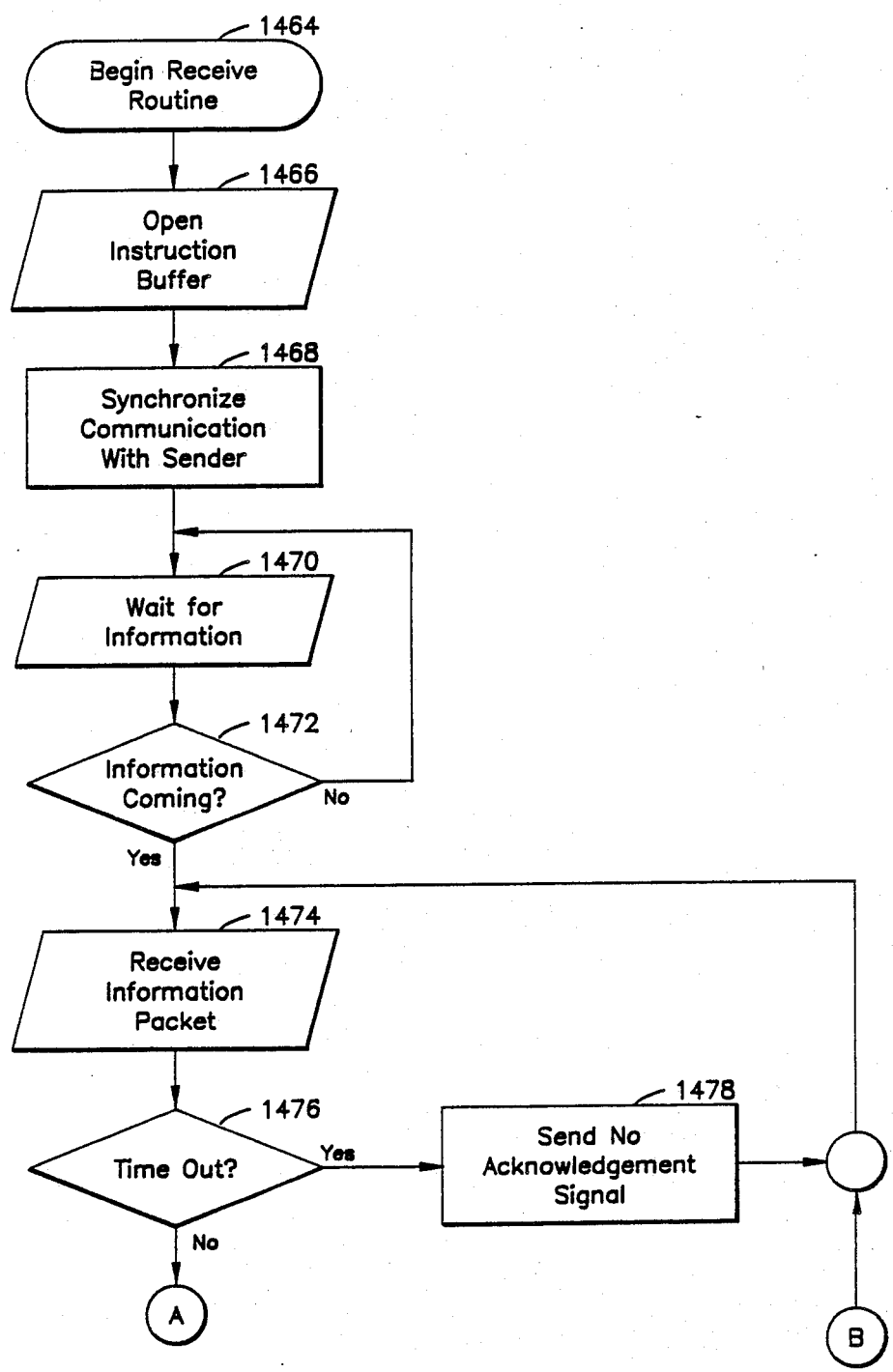
FIG. 71A and 71B are a flow chart describing the receive routine.
Figure 71B:
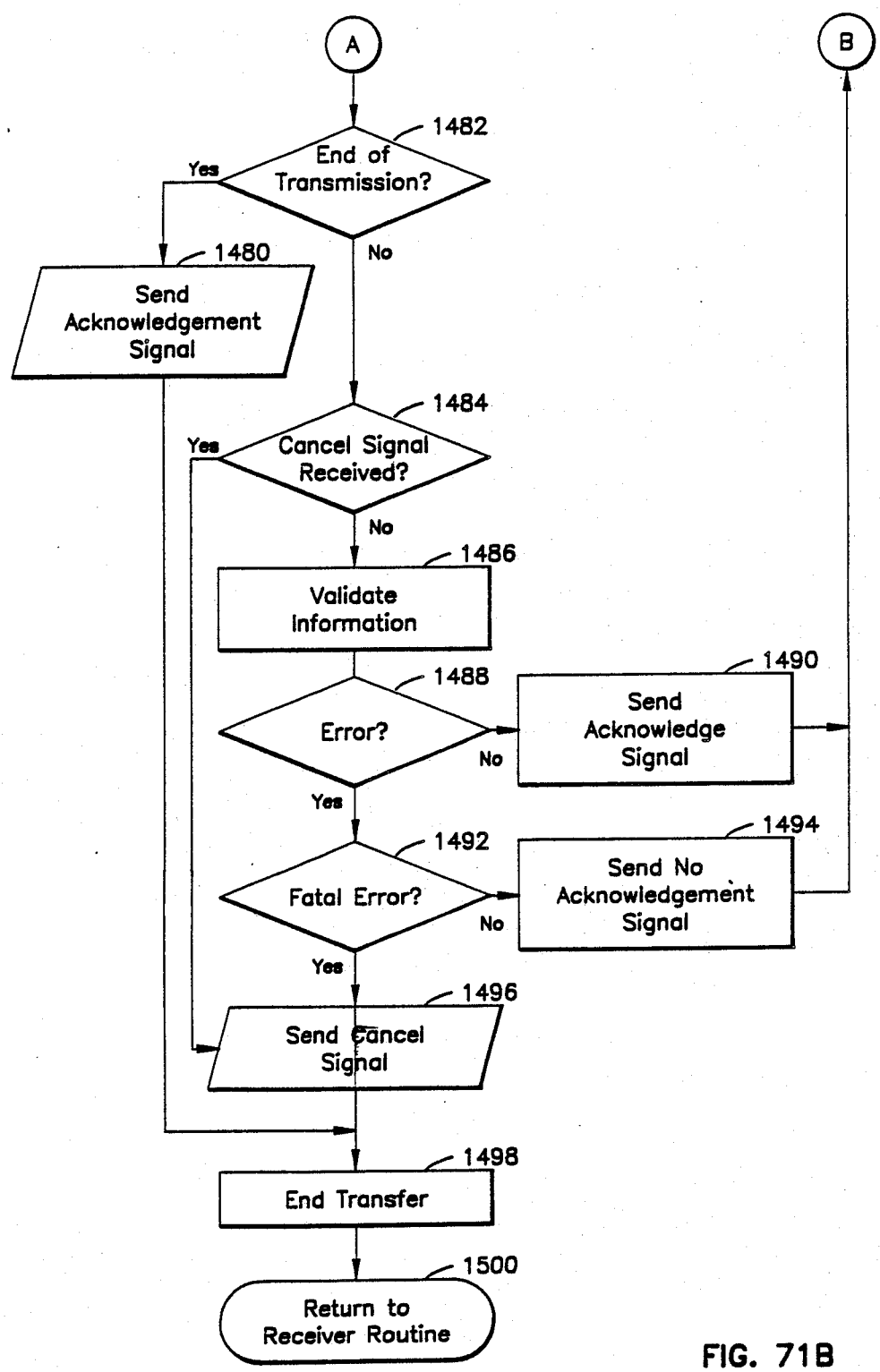

FIGS. 71A and 71B combined are a flow chart describing the functions of the receive routine. The receive routine starts (1464) when executed by the receiver routine as described in FIG. 69 (1428). First, the instruction buffer file is opened (1466). The structure of the instruction buffer file is described in FIG. 68. The instruction records 1390 in the instruction buffer file are comprised of commands 1392, and a maximum of 3 parameters, 1394, 1396, and 1397. After the instruction buffer file opens, the receive routine synchronizes communication with the sender (1468). A loop (1472) is entered to await information from the sender (1470). Once the incoming information is signaled, an information packet is read (1474). If a time-out occurs (1476), a "no acknowledgement" signal is sent (1478), and the loop returns to await further information packets (1474). If the information packet is a "end of transmission" message (1482), an "acknowledgement signal" is sent (1480), the transfer ends (1498), and the receive routine terminates (1500). If a "cancel" signal is received (1484), then the transfer ends (1498), and the receive routine terminates (1500). In all other cases, the information received is validated (1486) and examined for errors (1488). If no error occurs (1488), an "acknowledgement" signal is sent (1490), and the loop returns to await further information packets (1474). If there is an error (1488) then it must be examined (1492). If the error is not fatal (1492), a "no acknowledgement" signal is sent (1494), and the loop returns to await further information packets (1474). If the error is fatal (1492), then a "cancel" signal is sent (1496), the transfer ends (1498), and the receive routine terminates (1500).

Figure 72:
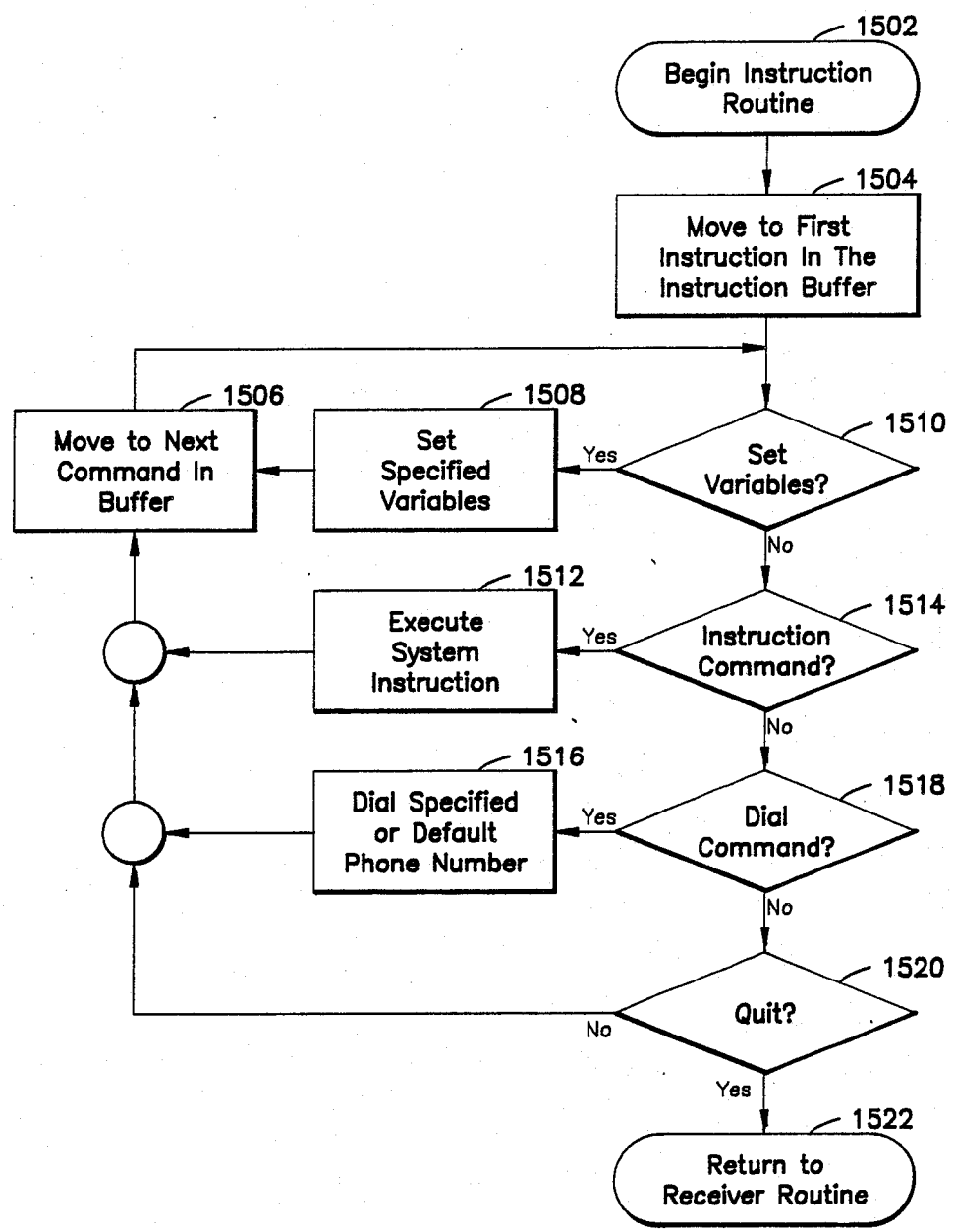
FIG. 72 is a flow chart describing the instruction routine.

FIG. 72 is a flow chart describing the functions of instruction routine. The instruction routine starts (1502) when executed by the receiver routine as described in FIG. 69 (1432). The first instruction is read from the instruction buffer (1504) and a loop is entered to read all remaining commands in the buffer. Each command is examined to determine if it is a "set variables" (1510), "system instruction" (1514), "dial" (1518), or "quit" command (1520). If the command is a "set variables" command (1510), then the variables are set (1508), and the next command of the buffer is examined (1506). If the command is a "system instruction" command (1514), then the system instruction is executed (1512), and the next command in the buffer is examined (1506). If the command is a "dial" command (1518), then the specified or default phone number is dialed (1516), and the next command in the buffer is examined (1506). If the command is unrecognized (1520), it is skipped, and the next command of the buffer is examined (1506). If the command is a "quit" command (1520), then the instruction routine terminates (1522).

Figure 73:
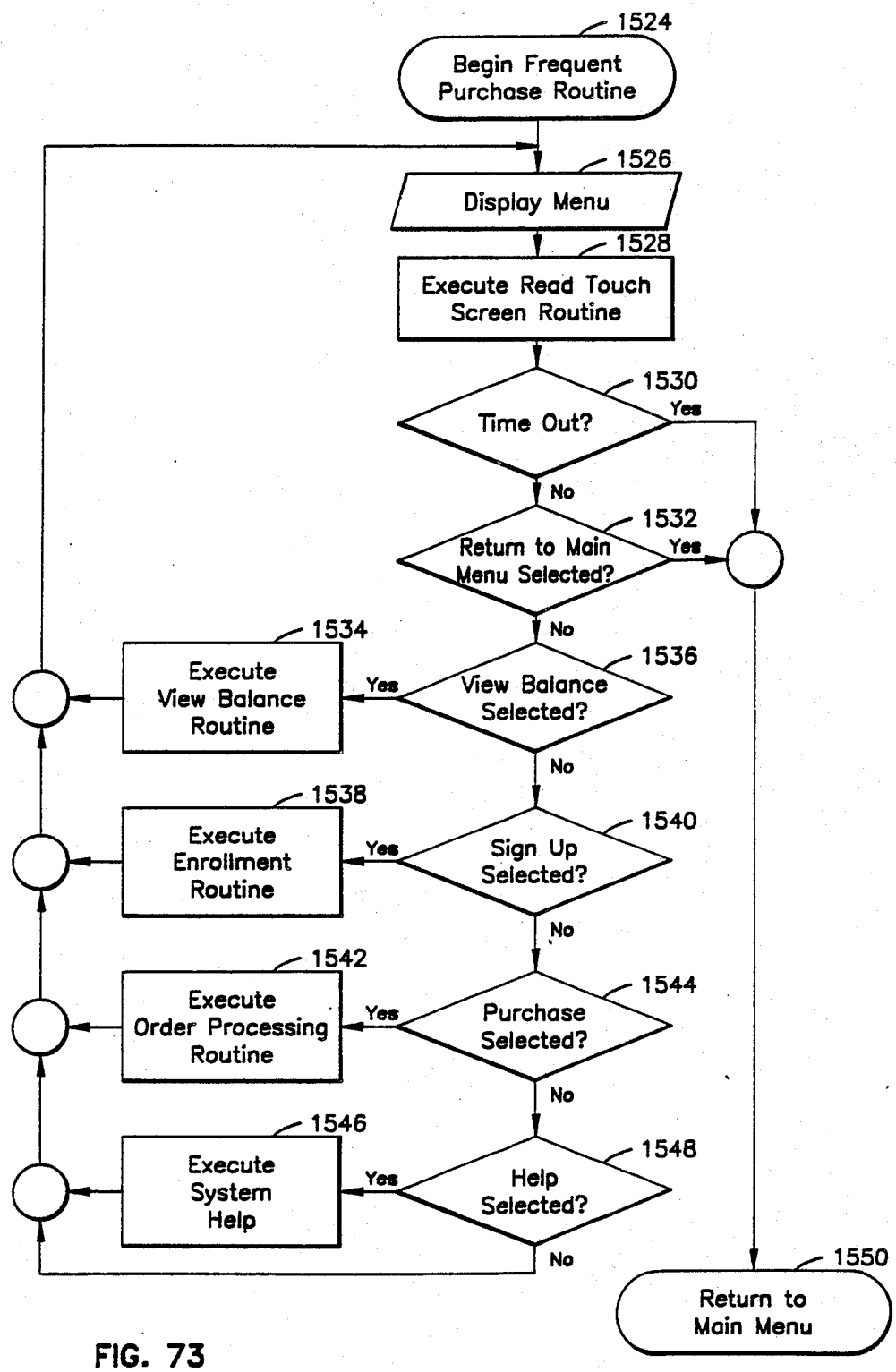
FIG. 73 is a flow chart describing the frequent purchase routine.

FIG. 73 is a flow chart describing the functions of the frequent purchase routine. The frequent purchase routine starts (1524) when executed by the promotion network program as described in FIG. 7 (80). The menu is displayed (1526) and the read touch screen routine is executed to await the customer selection (1528). If a time-out occurs (1530), then the frequent purchase routine terminates (1550). If the customer selects "return" (1532) then the frequent purchase routine terminates (1550). If the customer selects "view balance" (1536), then the view balance routine is executed (1534) and the loop returns to re-display the menu (1526). If the customer selects "sign up" (1540), then the enrollment routine is executed (1538) and the loop returns to re-display the menu (1526). If the customer selects "purchase" (1544), then the order processing routine is executed (1542) and the loop returns to re-display the menu (1526). If the customer selects "help" (1548), then the system help routine is executed (1546) and the loop returns to redash display the menu (1526).

Figure 74:
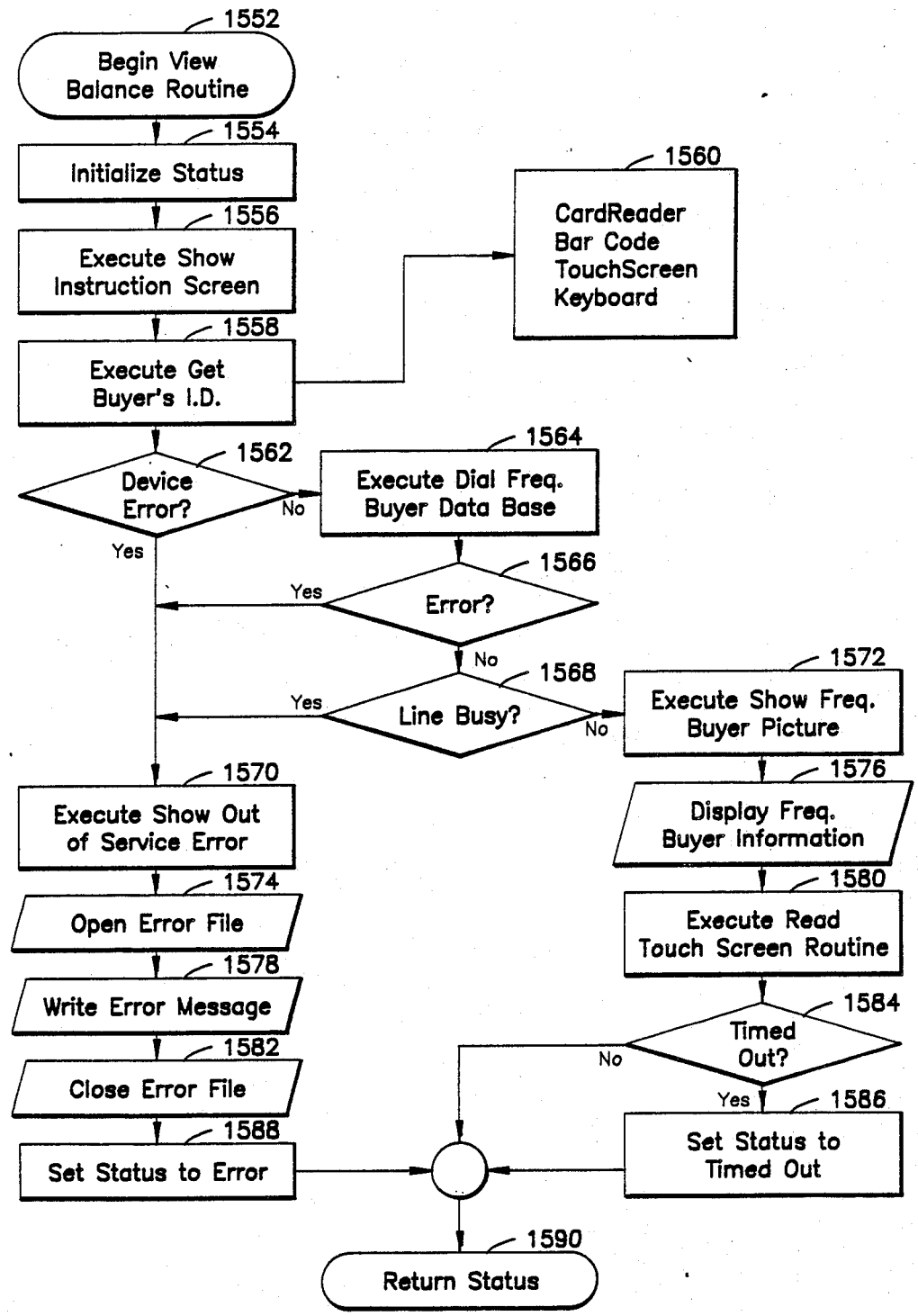
FIG. 74 is a flow chart describing the view balance routine.

FIG. 74 is a flow chart describing the functions of the view balance routine. The view balance routine starts (1552) when executed by the frequent purchase routine as described in FIG. 73 (1534). First, the status is initialized (1554). The show routine is executed to display the instruction screen on the monitor 14 (1556). The buyer's ID is requested (1558) and accepted from the magnetic stripe card reader 24, bar code reader 26, touchscreen 28, or keyboard 30 (1560). If the device error occurs (1562), then the show routine is executed to display the "out-of-service" screen on the monitor 14 (1570), a message is written to the error file (1574, 1578, and 1582), the status is set to the error (1588), and the view balance routine terminates (1590). If no error occurs (1562), then the dial frequent buyer database routine is executed (1564). If an error occurs (1566) or the line is busy (1568), then the same error handling sequence is executed as before (1570, 1574, 1578, 1582, 1588, and 1590). If the dial frequent buyer database routine was successful, then the show routine is executed to display the frequent shopper picture on the monitor 14 (1572). The information from the remote computer system is also displayed on the monitor 14 (1576). The read touch screen routine is executed (1580), and the view balance routine (1590).

Figure 75:
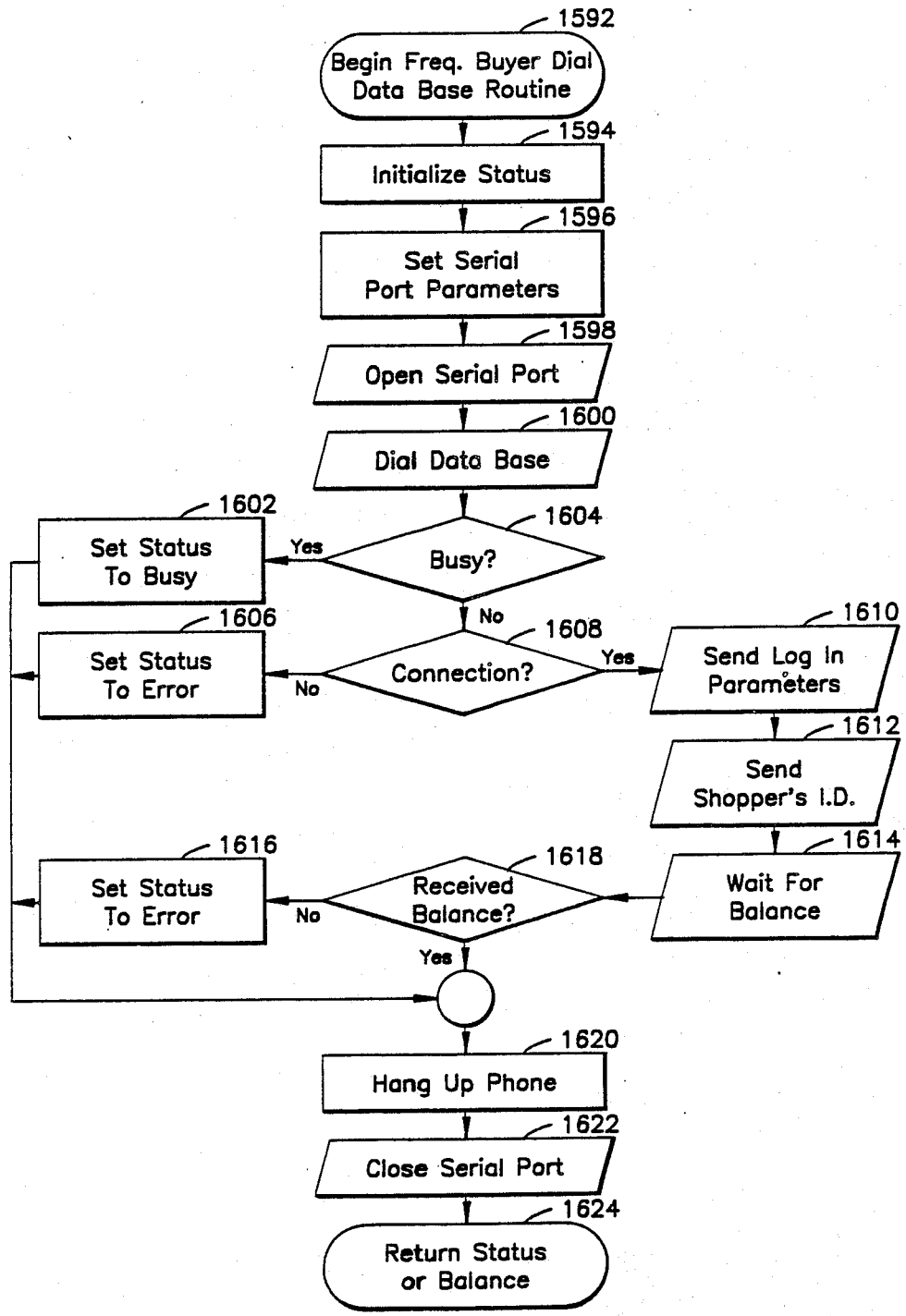
FIG. 75 is a flow chart describing the dial frequent shopper database routine.

FIG. 75 is a flow chart describing the dial frequent buyer database routine. The dial frequent buyer database routine starts (1592) when executed by the view balance routine as described in FIG. 74 (1564). The status is initialized (1594), the port parameters are set (1596), and communications are attempted with the remote database (1598 and 1600). If a busy signal occurs (1604), the status is set the busy (1602). If no connection can be made (1608), then the status is set to the error (1606). If connection is made (1608), then the login (1610) and buyer ID (1612) are sent to the remote computer, and a balance is expected in return (1614). If the balance is not received (1618), then the status is set to the error (1616). The dial frequent buyer database routine terminates (1624) after hanging up the phone (1620) and closing the communications port (1662).

Although a specific embodiment has been illustrated and described herein, it will be appreciated by those of ordinary skill in the art that any arrangement which is calculated to achieve the same purpose may be substituted for the specific embodiment shown. This application is also intended to cover any adaptations or variations of the present invention. It is manifestly intended that this invention be limited only by the claims and the equivalents thereof.

What is claimed is:

1. An automated advertising and promotion system, comprising:
   (a) input means for accepting commands and data from customers using the system, the date including customer identifications;
   (b) display means for selectively presenting data to the customers;
   (c) control program means, executed by a computer operatively connected to the input means and display means, for managing the input means and display means, the control program means comprising:
   (1) advertising means for presenting a plurality of independent advertisements on the display means;
   (2) sweepstakes means, integrated with the advertising means, for managing a promotional sweepstakes, wherein the customer identifications accepted by the input means are used to identify sweepstakes participants, and wherein indications are presented on the display means when the sweepstakes participants win prizes, the promotional sweepstakes thereby enhancing the effectiveness of the advertisements presented on the display means by attracting customers into using the system.

2. The system of claim 1, wherein the control program means further comprises frequent shopper means, integrated with the sweepstakes means, for increasing the probability that the sweepstakes participants win prizes as the frequency of their use of the system increases, thereby increasing the effectiveness of the advertisements by increasing the frequency that the sweepstakes participants use the system.

3. The system of claim 2, wherein the frequent shopper means comprises:
   (i) acceptance means for accepting a frequent shopper identification via the input means;
   (ii) retrieval means for retrieving a customer record from a database, the customer record corresponding to the customer identification accepted by the input means, the customer record including the customer identification, a frequent shopper field and demographic data.
   (iii) update means for updating the frequent shopper field in the customer record in response to accepting the frequent shopper identification; and
   (iv) award means for awarding prizes to the sweepstakes participant based on a comparison by the control program means of the updates of the frequent shopper field and a schedule stored in the computer means.

4. The system of claim 3, wherein the frequent shopper means further comprises means for determining if an official time period has elapsed between usage of the system by the sweepstakes participant and for preventing updates of the frequent shopper field if the official time period has not elapsed.

5. The system of claim 3, wherein the frequent shopper means further comprises means for maintaining a plurality of prize levels for comparison with the frequent shopper field so that as the frequency of use by the sweepstakes participant exceeds each prize level a different prize may be awarded.

6. The system of claim 3, wherein the frequent shopper means further comprises status means for presenting the status of the frequent shopper field on the display means.

7. The system of claim 1, wherein the control program means further comprises demographic means, integrated with the sweepstakes means, for gathering demographic data from the sweepstakes participant.

8. The system of claim 1, wherein the control program means further comprises award means, integrated with the sweepstakes means, for awarding a consolation prize when the sweepstakes participant is not awarded a prize.

9. The apparatus of claim 1, wherein said control program means further comprises enrollment means, integrated with the sweepstakes means, for enrolling customers in the sweepstakes promotions and gathering demographic information as a result thereof.

* * * * *